(12) United States Patent
Adcock et al.

(10) Patent No.: US 8,392,320 B2
(45) Date of Patent: Mar. 5, 2013

(54) ROUTING OF ORDERS IN EQUITY OPTIONS BY MEANS OF A PARAMETERIZED RULES-BASED ROUTING TABLE

(75) Inventors: Paul Adcock, Burr Ridge, IL (US); Thomas Haller, Longwood, FL (US)

(73) Assignee: NYSE Group, Inc., New York, NY (US)

( * ) Notice: Subject to any disclaimer, the term of this patent is extended or adjusted under 35 U.S.C. 154(b) by 0 days.

(21) Appl. No.: 13/453,745

(22) Filed: Apr. 23, 2012

(65) Prior Publication Data
US 2012/0209758 A1    Aug. 16, 2012

Related U.S. Application Data

(62) Division of application No. 11/880,840, filed on Jul. 24, 2007, now Pat. No. 8,195,557.

(60) Provisional application No. 60/834,327, filed on Jul. 28, 2006.

(51) Int. Cl.
*G06Q 40/00* (2012.01)

(52) U.S. Cl. ............................. 705/37; 705/35

(58) Field of Classification Search ................ 705/35–45
See application file for complete search history.

(56) References Cited

U.S. PATENT DOCUMENTS

| | | | |
|---|---|---|---|
| 5,101,353 A | 3/1992 | Lupien et al. | |
| 5,845,266 A | 12/1998 | Lupien et al. | |
| 5,905,974 A | 5/1999 | Fraser et al. | |
| 5,950,176 A | 9/1999 | Keiser et al. | |
| 6,012,046 A | 1/2000 | Lupien et al. | |
| 6,098,051 A | 8/2000 | Lupien et al. | |
| 6,278,982 B1 | 8/2001 | Korhammer et al. | |
| 6,343,278 B1 | 1/2002 | Jain et al. | |
| 6,377,940 B2 | 4/2002 | Tilfors et al. | |
| 6,405,180 B2 | 6/2002 | Tilfors et al. | |
| 6,408,282 B1 | 6/2002 | Buist | |
| 6,505,174 B1 | 1/2003 | Keiser et al. | |
| 6,505,175 B1 | 1/2003 | Silverman et al. | |
| 6,615,188 B1 | 9/2003 | Breen et al. | |
| 6,618,707 B1 | 9/2003 | Gary | |
| 6,714,948 B1 | 3/2004 | Richards | |
| 6,829,589 B1 | 12/2004 | Saliba | |
| 6,832,210 B1 | 12/2004 | Li | |
| 6,850,907 B2 | 2/2005 | Lutnick et al. | |

(Continued)

FOREIGN PATENT DOCUMENTS

| | | |
|---|---|---|
| AU | 2006/244499 | 1/2006 |
| AU | 2006/244483 | 11/2006 |

(Continued)

OTHER PUBLICATIONS

For U.S. Appl. No. 11/122,689, Office Action dated Feb. 26, 2008.

(Continued)

*Primary Examiner* — Jason M Borlinghaus
*Assistant Examiner* — Hao Fu
(74) *Attorney, Agent, or Firm* — Milbank, Tweed, Hadley & McCloy LLP

(57) ABSTRACT

An enhanced system and method for the "smart" routing of orders in an electronic options environment is disclosed. The method of routing includes different rules and protocols for orders that are allowed to route using a traditional intermarket linkage than for orders that are allowed to route using an alternative private direct connection or third-party service provider. The system and method of routing has at its basis a configurable, rules-based routing table that allows orders to be routed using different protocols based on the account type of the incoming order.

3 Claims, 25 Drawing Sheets

U.S. PATENT DOCUMENTS

| | | | |
|---|---|---|---|
| 6,963,856 B2 | 11/2005 | Lutnick et al. | |
| 6,983,260 B2 | 1/2006 | Hummelgren | |
| 7,162,448 B2 | 1/2007 | Madoff et al. | |
| 7,184,982 B1 | 2/2007 | Howorka et al. | |
| 7,197,483 B2 | 3/2007 | Brady et al. | |
| 7,209,896 B1 | 4/2007 | Serkin et al. | |
| 7,225,153 B2 | 5/2007 | Lange | |
| 7,242,669 B2 | 7/2007 | Bundy et al. | |
| 7,246,090 B1 | 7/2007 | Thomas | |
| 7,246,093 B1 | 7/2007 | Katz | |
| 7,249,086 B2 | 7/2007 | Bloom et al. | |
| 7,356,498 B2 | 4/2008 | Kaminsky et al. | |
| 7,383,220 B1 | 6/2008 | Keith | |
| 7,467,110 B2 | 12/2008 | Muller et al. | |
| 7,685,057 B2 * | 3/2010 | Chiulli et al. | 705/37 |
| 7,765,137 B1 | 7/2010 | Adcock et al. | |
| 7,873,561 B1 | 1/2011 | Adcock et al. | |
| 7,912,775 B1 | 3/2011 | Brill et al. | |
| 2001/0037284 A1 | 11/2001 | Finkelstein et al. | |
| 2002/0010672 A1 | 1/2002 | Waelbroeck et al. | |
| 2002/0010673 A1 | 1/2002 | Muller et al. | |
| 2002/0019795 A1 | 2/2002 | Madoff et al. | |
| 2002/0019799 A1 | 2/2002 | Ginsberg et al. | |
| 2002/0042765 A1 | 4/2002 | Dawson | |
| 2002/0062273 A1 | 5/2002 | Perkel et al. | |
| 2002/0082979 A1 | 6/2002 | Sands et al. | |
| 2002/0091617 A1 | 7/2002 | Keith | |
| 2002/0091621 A1 | 7/2002 | Conklin et al. | |
| 2002/0120511 A1 | 8/2002 | Hanes | |
| 2002/0128951 A1 | 9/2002 | Kiron et al. | |
| 2002/0128955 A1 | 9/2002 | Brady et al. | |
| 2002/0128958 A1 | 9/2002 | Slone | |
| 2002/0143676 A1 | 10/2002 | Kiron et al. | |
| 2002/0147670 A1 | 10/2002 | Lange | |
| 2002/0161687 A1 | 10/2002 | Serkin et al. | |
| 2002/0169703 A1 | 11/2002 | Lutnick et al. | |
| 2002/0184135 A1 | 12/2002 | Zakaria | |
| 2002/0184136 A1 | 12/2002 | Cleary et al. | |
| 2002/0198815 A1 | 12/2002 | Greifeld et al. | |
| 2002/0198816 A1 | 12/2002 | Gilbert et al. | |
| 2003/0004851 A2 | 1/2003 | Kiron et al. | |
| 2003/0004858 A1 | 1/2003 | Schmitz et al. | |
| 2003/0009400 A2 | 1/2003 | Kiron et al. | |
| 2003/0009412 A1 | 1/2003 | Furbush et al. | |
| 2003/0009413 A1 | 1/2003 | Furbush et al. | |
| 2003/0009414 A1 | 1/2003 | Furbush et al. | |
| 2003/0014351 A1 | 1/2003 | Neff et al. | |
| 2003/0023536 A1 | 1/2003 | Hollerman et al. | |
| 2003/0040955 A1 | 2/2003 | Anaya et al. | |
| 2003/0041006 A1 | 2/2003 | Bunda | |
| 2003/0083974 A1 | 5/2003 | Bunda | |
| 2003/0093343 A1 | 5/2003 | Huttenlocher et al. | |
| 2003/0097328 A1 | 5/2003 | Lundberg et al. | |
| 2003/0115131 A1 | 6/2003 | Heaton et al. | |
| 2003/0130920 A1 | 7/2003 | Freund | |
| 2003/0130925 A1 | 7/2003 | Malitzis | |
| 2003/0130926 A1 | 7/2003 | Moore et al. | |
| 2003/0135443 A1 | 7/2003 | Moore et al. | |
| 2003/0139998 A1 | 7/2003 | Gilbert et al. | |
| 2003/0172024 A1 | 9/2003 | Kokis et al. | |
| 2003/0177082 A1 | 9/2003 | Buckwalter | |
| 2003/0191703 A1 | 10/2003 | Chen et al. | |
| 2003/0216932 A1 | 11/2003 | Foley | |
| 2003/0229557 A1 | 12/2003 | Richmann et al. | |
| 2003/0233307 A1 | 12/2003 | Salvadori et al. | |
| 2004/0030630 A1 | 2/2004 | Tilfors et al. | |
| 2004/0044610 A1 | 3/2004 | Fraser et al. | |
| 2004/0059666 A1 | 3/2004 | Waelbroeck et al. | |
| 2004/0088242 A1 | 5/2004 | Ascher et al. | |
| 2004/0143538 A1 | 7/2004 | Korhammer et al. | |
| 2004/0143542 A1 | 7/2004 | Magill et al. | |
| 2004/0177024 A1 | 9/2004 | Bok et al. | |
| 2004/0177026 A1 | 9/2004 | Balabon | |
| 2004/0210508 A1 | 10/2004 | Bohnenberger et al. | |
| 2004/0210511 A1 | 10/2004 | Waelbroeck et al. | |
| 2004/0215538 A1 | 10/2004 | Smith et al. | |
| 2004/0225592 A1 | 11/2004 | Churquina | |
| 2004/0236662 A1 | 11/2004 | Korhammer et al. | |
| 2004/0236669 A1 | 11/2004 | Horst et al. | |
| 2004/0243502 A1 | 12/2004 | Slowik et al. | |
| 2004/0254804 A1 | 12/2004 | Peterffy et al. | |
| 2004/0254877 A1 | 12/2004 | Buckwalter et al. | |
| 2004/0267655 A1 | 12/2004 | Davidowitz et al. | |
| 2005/0010481 A1 | 1/2005 | Lutnick et al. | |
| 2005/0075963 A1 | 4/2005 | Balabon | |
| 2005/0096999 A1 | 5/2005 | Newell et al. | |
| 2005/0119964 A1 | 6/2005 | Brady et al. | |
| 2005/0125316 A1 | 6/2005 | Levering et al. | |
| 2005/0137962 A1 | 6/2005 | Penney et al. | |
| 2005/0160024 A1 | 7/2005 | Soderborg et al. | |
| 2005/0171887 A1 | 8/2005 | Daley et al. | |
| 2005/0171888 A1 | 8/2005 | Daley et al. | |
| 2005/0171889 A1 * | 8/2005 | Daley et al. | 705/37 |
| 2005/0171890 A1 | 8/2005 | Daley et al. | |
| 2005/0171891 A1 | 8/2005 | Daley et al. | |
| 2005/0171895 A1 | 8/2005 | Howorka et al. | |
| 2005/0197916 A1 | 9/2005 | Newell et al. | |
| 2005/0222936 A1 | 10/2005 | Panariti et al. | |
| 2005/0228739 A1 | 10/2005 | Leibowitz | |
| 2005/0240510 A1 | 10/2005 | Schweickert et al. | |
| 2005/0273407 A1 | 12/2005 | Black et al. | |
| 2005/0273408 A1 | 12/2005 | Bandman et al. | |
| 2005/0273419 A1 | 12/2005 | Ogg et al. | |
| 2005/0283415 A1 | 12/2005 | Studnitzer et al. | |
| 2005/0283421 A1 | 12/2005 | Hatheway et al. | |
| 2005/0283426 A1 | 12/2005 | Krashnasami et al. | |
| 2005/0283427 A1 | 12/2005 | Owens et al. | |
| 2006/0020536 A1 | 1/2006 | Renton et al. | |
| 2006/0031157 A1 | 2/2006 | Gianakouros et al. | |
| 2006/0089898 A1 | 4/2006 | Durkin et al. | |
| 2006/0089899 A1 | 4/2006 | Durkin et al. | |
| 2006/0136318 A1 | 6/2006 | Rafieyan et al. | |
| 2006/0136326 A1 | 6/2006 | Heckman et al. | |
| 2006/0149659 A1 | 7/2006 | Carone et al. | |
| 2006/0161494 A1 | 7/2006 | Littlewood | |
| 2006/0184444 A1 | 8/2006 | McConaughy et al. | |
| 2006/0206404 A1 | 9/2006 | Hatheway et al. | |
| 2006/0206407 A1 | 9/2006 | Troxel et al. | |
| 2006/0235786 A1 | 10/2006 | DiSalvo | |
| 2006/0253374 A1 | 11/2006 | Addock et al. | |
| 2006/0253375 A1 | 11/2006 | Adcock et al. | |
| 2006/0253378 A1 | 11/2006 | Adcock et al. | |
| 2006/0253379 A1 | 11/2006 | Adcock et al. | |
| 2006/0253380 A1 | 11/2006 | Adcock et al. | |
| 2006/0253381 A1 | 11/2006 | Adcock et al. | |
| 2006/0253382 A1 | 11/2006 | Adcock et al. | |
| 2006/0259391 A1 | 11/2006 | Schoen et al. | |
| 2006/0277137 A1 | 12/2006 | Claus et al. | |
| 2006/0277138 A1 | 12/2006 | Ross et al. | |
| 2007/0022041 A1 | 1/2007 | Durkin et al. | |
| 2007/0043647 A1 | 2/2007 | Bickford | |
| 2007/0055607 A1 | 3/2007 | Wunsch et al. | |
| 2007/0073611 A1 | 3/2007 | Drake et al. | |
| 2007/0078753 A1 | 4/2007 | Cormack et al. | |
| 2007/0112693 A1 | 5/2007 | Cushing | |
| 2007/0198391 A1 | 8/2007 | Dreyer et al. | |
| 2007/0244792 A1 | 10/2007 | Couperier et al. | |
| 2008/0228622 A1 | 9/2008 | Adcock et al. | |
| 2008/0228623 A1 | 9/2008 | Adcock et al. | |
| 2009/0070250 A1 | 3/2009 | Adcock et al. | |
| 2009/0125431 A1 | 5/2009 | Armstrong et al. | |
| 2009/0157539 A1 | 6/2009 | Adcock et al. | |
| 2010/0030704 A1 * | 2/2010 | Griffin et al. | 705/36 R |
| 2010/0121759 A1 | 5/2010 | Waelbroeck et al. | |
| 2010/0332374 A1 | 12/2010 | Adcock et al. | |
| 2011/0082784 A1 | 4/2011 | Adcock et al. | |
| 2011/0231298 A1 | 9/2011 | Adcock et al. | |

FOREIGN PATENT DOCUMENTS

| | | |
|---|---|---|
| AU | 2006/244562 | 11/2006 |
| AU | 2006/244563 | 11/2006 |
| AU | 2006/244564 | 11/2006 |
| EP | 1321870 | 6/2003 |
| WO | 01/22322 | 3/2001 |
| WO | 01/22339 | 3/2001 |
| WO | 01/52166 | 7/2001 |
| WO | 01/75733 | 10/2001 |

| WO | 01/90925 | 11/2001 |
| WO | 02/07039 | 1/2002 |
| WO | 02/09008 | 1/2002 |
| WO | 2004/008296 | 1/2004 |
| WO | 2005/010790 | 2/2005 |
| WO | 2005/036354 | 4/2005 |
| WO | 2006/121687 | 11/2006 |
| WO | 2006/121688 | 11/2006 |
| WO | 2006/121689 | 11/2006 |
| WO | 2006/121691 | 11/2006 |
| WO | 2006/121792 | 11/2006 |
| WO | 2006/121796 | 11/2006 |
| WO | 2006/121812 | 11/2006 |
| WO | 2007/038084 | 4/2007 |
| WO | 2007/038218 | 4/2007 |
| WO | 2008/013776 | 1/2008 |
| WO | 2008/013828 | 1/2008 |
| WO | 2008/013916 | 1/2008 |
| WO | 2008/013917 | 1/2008 |
| WO | 2008/024172 | 2/2008 |
| WO | 2008/027124 | 3/2008 |
| WO | 2008/073252 | 6/2008 |

OTHER PUBLICATIONS

For U.S. Appl. No. 11/122,689, Response dated Aug. 29, 2008.
For U.S. Appl. No. 11/122,689, Office Action dated Nov. 18, 2008.
For U.S. Appl. No. 11/122,689, Response dated Mar. 17, 2009.
For U.S. Appl. No. 11/122,689, Interview dated Apr. 13, 2009.
For U.S. Appl. No. 11/122,689, Office Action dated Apr. 27, 2009.
For U.S. Appl. No. 11/122,689, Interview dated Aug. 18, 2009.
For U.S. Appl. No. 11/122,689, Response dated Aug. 27, 2009.
For U.S. Appl. No. 11/122,689, Allowance dated Dec. 14, 2009.
For U.S. Appl. No. 11/122,689, Allowance dated Jan. 26, 2010.
For U.S. Appl. No. 11/122,689, Allowance dated Mar. 1, 2010.
For U.S. Appl. No. 11/122,679, Office Action dated Apr. 1, 2008.
For U.S. Appl. No. 11/122,679, Response dated Oct. 6, 2008.
For U.S. Appl. No. 11/122,679, Office Action dated Jan. 5, 2009.
For U.S. Appl. No. 11/122,679, Response dated Apr. 6, 2009.
For U.S. Appl. No. 11/122,679, Interview dated May 4, 2009.
For U.S. Appl. No. 11/122,679, Interview dated May 12, 2009.
For U.S. Appl. No. 11/122,679, Response dated Jun. 17, 2009.
For U.S. Appl. No. 11/122,679, Allowance dated Aug. 21, 2009.
For U.S. Appl. No. 11/122,679, Interview dated Sep. 9, 2009.
For U.S. Appl. No. 11/122,679, Allowance dated Jan. 15, 2010.
For U.S. Appl. No. 11/122,679, Allowance dated Aug. 16, 2010.
For U.S. Appl. No. 11/122,679, Allowance dated Oct. 14, 2010.
For U.S. Appl. No. 11/122,679, Allowance dated Dec. 15, 2010.
For U.S. Appl. No. 11/345,420, Office Action dated Dec. 9, 2008.
For U.S. Appl. No. 11/345,420, Response dated Mar. 16, 2009.
For U.S. Appl. No. 11/345,420, Allowance dated Jul. 23, 2009.
For U.S. Appl. No. 11/345,420, Allowance dated Nov. 16, 2009.
For U.S. Appl. No. 11/345,420, Allowance dated Sep. 7, 2010.
For U.S. Appl. No. 11/122,498, Office Action dated Feb. 12, 2008.
For U.S. Appl. No. 11/122,498, Response dated Aug. 14, 2008.
For U.S. Appl. No. 11/122,498, Office Action dated Sep. 19, 2008.
For U.S. Appl. No. 11/122,498, Response dated Jan. 9, 2009.
For U.S. Appl. No. 11/122,498, Office Action dated Apr. 15, 2009.
For U.S. Appl. No. 11/122,498, Interview dated Aug. 18, 2009.
For U.S. Appl. No. 11/122,498, Response dated Sep. 15, 2009.
For U.S. Appl. No. 11/122,498, Interview dated Jan. 21, 2010.
For U.S. Appl. No. 11/122,498, Office Action dated Jan. 21, 2010.
For U.S. Appl. No. 11/122,498, Response dated Jun. 16, 2010.
For U.S. Appl. No. 11/122,498, Allowance dated Jul. 1, 2010.
For U.S. Appl. No. 11/122,498, Allowance dated Aug. 31, 2010.
For U.S. Appl. No. 11/122,498, Allowance dated Sep. 14, 2010.
For U.S. Appl. No. 11/122,498, Allowance dated Sep. 29, 2010.
For U.S. Appl. No. 11/122,498, Allowance dated Oct. 13, 2010.
For U.S. Appl. No. 11/345,421, Office Action dated Jun. 27, 2008.
For U.S. Appl. No. 11/345,421, Response dated Sep. 22, 2008.
For U.S. Appl. No. 11/345,421, Office Action dated Jan. 26, 2009.
For U.S. Appl. No. 11/345,421, Response dated May 22, 2009.
For U.S. Appl. No. 11/345,421, Office Action dated Oct. 7, 2009.
For U.S. Appl. No. 11/345,421, Response dated Nov. 23, 2009.
For U.S. Appl. No. 11/345,421, Allowance dated Apr. 2, 2010.
For U.S. Appl. No. 11/345,421, Allowance dated Aug. 4, 2010.
For U.S. Appl. No. 11/345,421, Allowance dated Dec. 9, 2010.
For U.S. Appl. No. 11/345,421, Allowance dated Feb. 17, 2011.
For U.S. Appl. No. 11/416,942, Office Action dated Jul. 22, 2008.
For U.S. Appl. No. 11/416,942, Response dated Aug. 29, 2008.
For U.S. Appl. No. 11/416,942, Office Action dated Sep. 30, 2008.
For U.S. Appl. No. 11/416,942, Response dated Jan. 12, 2009.
For U.S. Appl. No. 11/416,942, Office Action dated Apr. 23, 2009.
For U.S. Appl. No. 11/416,942, Response dated Sep. 30, 2009.
For U.S. Appl. No. 11/416,942, Response dated Oct. 7, 2009.
For U.S. Appl. No. 11/416,942, Interview dated Oct. 14, 2009.
For U.S. Appl. No. 11/416,942, Allowance dated Dec. 29, 2009.
For U.S. Appl. No. 11/416,942, Allowance dated Jan. 26, 2010.
For U.S. Appl. No. 11/416,942, Allowance dated Feb. 24, 2010.
For U.S. Appl. No. 11/416,942, Allowance dated Jun. 16, 2010.
For U.S. Appl. No. 11/416,942, Allowance dated Sep. 20, 2010.
For U.S. Appl. No. 11/416,942, Allowance dated Nov. 9, 2010.
For U.S. Appl. No. 11/416,942, Allowance dated Dec. 28, 2010.
For U.S. Appl. No. 11/416,710, Office Action dated Apr. 4, 2008.
For U.S. Appl. No. 11/416,710, Response dated Aug. 4, 2008.
For U.S. Appl. No. 11/416,710, Notice dated Sep. 11, 2008.
For U.S. Appl. No. 11/416,710, Response dated Sep. 19, 2008.
For U.S. Appl. No. 11/416,710, Office Action dated Dec. 30, 2008.
For U.S. Appl. No. 11/416,710, Response dated Mar. 27, 2009.
For U.S. Appl. No. 11/416,710, Office Action dated Aug. 17, 2009.
For U.S. Appl. No. 11/416,710, Response dated Nov. 2, 2009.
For U.S. Appl. No. 11/416,710, Allowance dated Mar. 22, 2010.
For U.S. Appl. No. 11/416,710, Allowance dated Jun. 15, 2010.
For U.S. Appl. No. 11/416,710, Allowance dated Sep. 27, 2010.
For U.S. Appl. No. 11/416,913, Office Action dated Dec. 29, 2008.
For U.S. Appl. No. 11/416,913, Response dated Mar. 25, 2009.
For U.S. Appl. No. 11/416,913, Office Action dated Aug. 3, 2009.
For U.S. Appl. No. 11/416,913, Response dated Oct. 13, 2009.
For U.S. Appl. No. 11/416,913, Office Action dated Jan. 22, 2010.
For U.S. Appl. No. 11/416,913, Response dated Jun. 22, 2010.
For U.S. Appl. No. 11/416,913, Office Action dated Sep. 15, 2010.
For U.S. Appl. No. 11/416,913, Response dated Jan. 18, 2011.
For U.S. Appl. No. 11/416,756, Office Action dated Mar. 27, 2009.
For U.S. Appl. No. 11/416,756, Response dated Apr. 27, 2009.
For U.S. Appl. No. 11/416,756, Office Action dated Aug. 4, 2009.
For U.S. Appl. No. 11/416,756, Response dated Nov. 4, 2009.
For U.S. Appl. No. 11/416,756, Office Action dated Apr. 27, 2010.
For U.S. Appl. No. 11/416,943, Office Action dated Sep. 3, 2008.
For U.S. Appl. No. 11/416,943, Response dated Dec. 5, 2008.
For U.S. Appl. No. 11/416,943, Office Action dated Mar. 17, 2009.
For U.S. Appl. No. 11/416,943, Interview dated Mar. 31, 2009.
For U.S. Appl. No. 11/416,943, Response dated Jun. 17, 2009.
For U.S. Appl. No. 11/416,943, Office Action dated Sep. 30, 2009.
For U.S. Appl. No. 11/416,943, Interview dated Nov. 30, 2009.
For U.S. Appl. No. 11/416,943, Response dated Dec. 15, 2009.
For U.S. Appl. No. 11/416,943, Office Action dated Mar. 23, 2010.
For U.S. Appl. No. 11/416,943, Response dated Jun. 23, 2010.
For U.S. Appl. No. 11/416,943, Office Action dated Aug. 26, 2010.
For U.S. Appl. No. 11/416,943, Office Action dated Jun. 7, 2011.
For U.S. Appl. No. 11/416,943, Response dated Sep. 6, 2011.
For U.S. Appl. No. 11/525,363, Office Action dated May 19, 2009.
For U.S. Appl. No. 11/525,363, Response dated Nov. 16, 2009.
For U.S. Appl. No. 11/525,363, Allowance dated Sep. 24, 2010.
For U.S. Appl. No. 11/527,797, Office Action dated Sep. 15, 2008.
For U.S. Appl. No. 11/527,797, Response dated Dec. 15, 2008.
For U.S. Appl. No. 11/527,797, Office Action dated Mar. 30, 2009.
For U.S. Appl. No. 11/527,797, Response dated May 19, 2009.
For U.S. Appl. No. 11/527,797, Office Action dated Aug. 12, 2009.
For U.S. Appl. No. 11/527,797, Response dated Nov. 17, 2009.
For U.S. Appl. No. 11/527,797, Office Action dated Jan. 25, 2010.
For U.S. Appl. No. 11/634,020, Office Action dated Nov. 12, 2008.
For U.S. Appl. No. 11/634,020, Response dated Feb. 17, 2009.
For U.S. Appl. No. 11/634,020, Office Action dated Jun. 24, 2009.
For U.S. Appl. No. 11/634,020, Response dated Sep. 29, 2009.
For U.S. Appl. No. 11/634,020, Office Action dated Dec. 28, 2009.
For U.S. Appl. No. 11/634,020, Response dated Mar. 16, 2010.
For U.S. Appl. No. 11/634,020, Office Action dated Apr. 28, 2010.
For U.S. Appl. No. 11/634,020, Response dated Jul. 28, 2010.

For U.S. Appl. No. 11/634,020, Allowance dated Oct. 27, 2010.
For U.S. Appl. No. 11/634,020, Allowance dated Dec. 29, 2010.
For U.S. Appl. No. 11/880,840, Office Action dated Mar. 17, 2010.
For U.S. Appl. No. 11/880,840, Response dated Mar. 26, 2010.
For U.S. Appl. No. 11/880,840, Office Action dated Jul. 6, 2010.
For U.S. Appl. No. 11/880,840, Response dated Nov. 4, 2010.
For U.S. Appl. No. 11/880,840, Allowance dated Dec. 7, 2010.
For U.S. Appl. No. 11/880,840, Allowance dated Mar. 29, 2012.
For U.S. Appl. No. 11/880,686, Office Action dated Nov. 6, 2009.
For U.S. Appl. No. 11/880,686, Response dated May 3, 2010.
For U.S. Appl. No. 11/880,686, Office Action dated Jul. 21, 2010.
For U.S. Appl. No. 11/880,686, Response dated Nov. 15, 2010.
For U.S. Appl. No. 11/880,852, Office Action dated Dec. 1, 2009.
For U.S. Appl. No. 11/880,852, Response dated Jun. 1, 2010.
For U.S. Appl. No. 11/880,852, Office Action dated Aug. 18, 2010.
For U.S. Appl. No. 11/880,852, Response dated Nov. 18, 2010.
For U.S. Appl. No. 11/881,064, Office Action dated Mar. 25, 2010.
For U.S. Appl. No. 11/881,064, Response dated Apr. 6, 2010.
For U.S. Appl. No. 11/881,064, Office Action dated Jun. 30, 2010.
For U.S. Appl. No. 11/881,064, Response dated Dec. 28, 2010.
For U.S. Appl. No. 11/881,064, Office Action dated Mar. 22, 2011.
For U.S. Appl. No. 11/881,789, Office Action dated Dec. 1, 2009.
For U.S. Appl. No. 11/881,789, Response dated Mar. 19, 2010.
For U.S. Appl. No. 11/881,789, Office Action dated Aug. 20, 2010.
For U.S. Appl. No. 11/881,789, Response dated Sep. 2, 2010.
For U.S. Appl. No. 11/881,789, Office Action dated Feb. 2, 2011.
For U.S. Appl. No. 11/881,789, Response dated May 2, 2011.
For U.S. Appl. No. 11/881,788, Office Action dated Mar. 17, 2010.
For U.S. Appl. No. 11/881,788, Response dated Mar. 26, 2010.
For U.S. Appl. No. 11/881,788, Office Action dated Jun. 29, 2010.
For U.S. Appl. No. 11/881,788, Response dated Sep. 29, 2010.
For U.S. Appl. No. 11/881,788, Allowance dated Nov. 15, 2010.
For U.S. Appl. No. 11/881,788, Allowance dated Jan. 6, 2011.
For U.S. Appl. No. 12/807,338, Office Action dated Apr. 4, 2011.
For U.S. Appl. No. 12/807,338, Response dated Jul. 5, 2011.
For U.S. Appl. No. 12/807,338, Allowance dated May 21, 2012.
For U.S. Appl. No. 13/068,881, Office Action dated Nov. 28, 2011.
For U.S. Appl. No. 13/068,881, Response dated Feb. 23, 2012.
For U.S. Appl. No. 13/068,881, Office Action dated Apr. 13, 2012.
For PCT/US06/16683, International Search Report dated Aug. 29, 2007.
For PCT/US06/16684, International Search Report dated Aug. 9, 2007.
For PCT/US06/16685, International Search Report dated Sep. 17, 2007.
For PCT/US06/16701, International Search Report dated Aug. 29, 2007.
For PCT/US06/17249, International Search Report dated Sep. 5, 2007.
For PCT/US06/17296, International Search Report dated Aug. 7, 2007.
For PCT/US06/17253, International Search Report dated Sep. 12, 2007.
For PCT/US06/36461, International Search Report dated Jun. 17, 2008.
For PCT/US06/36878, International Search Report dated May 18, 2007.
For PCT/US07/16571, International Search Report dated Jun. 17, 2008.
For PCT/US07/16572, International Search Report dated Jul. 2, 2008.
For PCT/US07/16682, International Search Report dated Jun. 17, 2008.
For PCT/US07/16718, International Search Report dated Mar. 20, 2008.
For PCT/US07/16856, International Search Report dated Sep. 18, 2008.
For PCT/US07/16857, International Search Report dated Sep. 5, 2008.
For PCT/US07/24921, International Search Report dated May 12, 2008.
A Taxonomy of Automated Trade Execution Systems, Ian Domowitz, Journal of International Money and Finance, (1993), 12, pp. 607-631.
Nasdaq launches Liquidity Tracker; Intelligent order routing system allows market participants to find and increase liquidity, Dec. 5, 2002.
Dana Corp could lose NYSE Listing in Takeover Battle, Aug. 3, 2003.
Headstrong buys assets of Elind software provider, Nov. 1, 2004.
Rising tide lifts all boats in institutional equities, Mar. 26, 1994.
Phlx allows floor broker corssing, Feb. 24, 2003.
Fragmented dealing under fire, May 1, 2000.
Directed order decision polarizes exchanges, Jun. 13, 2005.
Call and continuous trading mechanisms under asymmetric information; an experimental investigation, Jun. 1996.
Supermontage as a New Trading System of NASDAQ, Mar. 2005.
Price discovery in tick time, Dec. 2009.
Tick size, bid-ask spreads and market structure, Feb. 8, 2001.
For SG 200716681-2, Search Report, Written Opinion and Examination Report, Oct. 26, 2009.
For SG 200716675-4, Search Report, Written Opinion and Examination Report, Oct. 8, 2009.
For SG 200716677-0, Search Report and Written opinion, Mar. 6, 2009.
For SG 200716678-8, Search Report and Written opinion, Jan. 6, 2009.
For SG 200716679-6, Search Report and Written opinion, Feb. 13, 2009.
For SG 200716680-4, Search Report and Written opinion, Mar. 13, 2009.
For PCT/US07/24921, International Search Report and Written Opinion, May 12, 2008.
For PCT/US07/24921, International Preliminary Report on Patentability, Jun. 10, 2009.
For PCT/US07/16571, International Search Report and Written Opinion, Jun. 17, 2008.

* cited by examiner

Routing of Outbound Orders Based on Exemplary Routing Table Rules for Account Capacity 42c and 44c

| Routing Table Rules | | | | | | |
|---|---|---|---|---|---|---|
| Destination | Capacity = C | Capacity = MM | Capacity = BD | Capacity = F | Capacity = FARM | Routing Protocol |
| Away Market A | Y | Y | | | | LINKAGE |
| Away Market A | Y | Y | Y | | | DIRECT |
| Away Market B | Y | Y | | | | LINKAGE |
| Away Market B | Y | Y | | Y | | DIRECT |
| Away Market C | Y | Y | | | | LINKAGE |
| Away Market C | Y | Y | | | | DIRECT |
| Away Market D | Y | Y | | | | LINKAGE |
| Away Market D | Y | Y | Y | Y | Y | DIRECT |

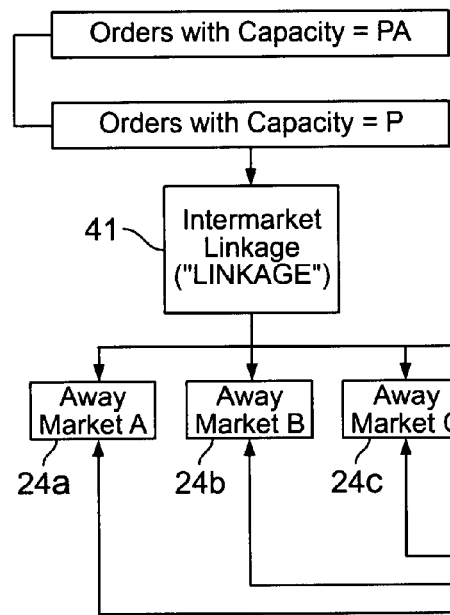

29e — Orders Routed Using an Intermarket Linkage

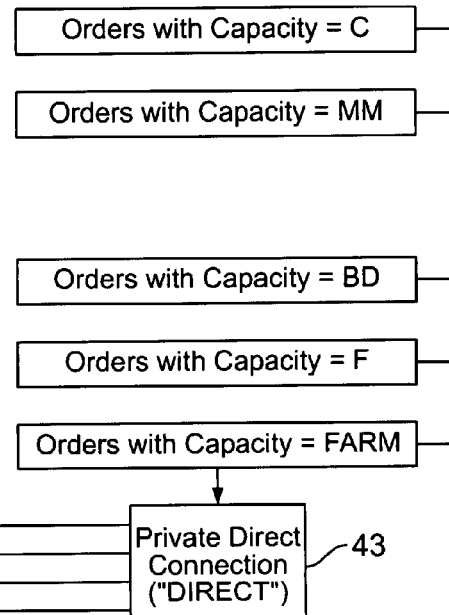

29f — Orders Routed Using a Direct Network Connection

FIG. 3B

ROUTING OF ORDERS IN EQUITY OPTIONS BY MEANS OF A PARAMETERIZED RULES-BASED ROUTING TABLE

CROSS-REFERENCE TO RELATED APPLICATIONS

This application claims priority from and claims the benefit of U.S. Provisional Application No. 60/834,327, filed Jul. 28, 2006, entitled "Electronic Equity Options Order Execution and Routing System," and U.S. application Ser. No. 11/880,840, filed Jul. 24, 2007, entitled "Routing of Orders in Equity Options by Means of a Parameterized Rules-Based Routing Table", which issued on Jun. 5, 2012 as U.S. Pat. No. 8,195,557, the disclosures of which are hereby incorporated by reference.

BACKGROUND

Nearly all actively-traded equity options trade on multiple exchanges today. However, such widespread trading has been practiced only recently. From 1977 until 1999, most options were listed only on a single exchange and traded on the floor, so there was no choice as to where to send a customer's order for execution. As options exchanges have only routed orders to each other using the Intermarket Linkage since 2003, the marketplace did not employ nor require complex routing algorithms.

As the options market structure has evolved to more closely resemble the equities market structure in the past few years, there is an increasing need for more sophisticated routing models and methodologies. For example, certain options have recently been allowed to trade in pennies as part of a penny pilot program. As quotes move around more quickly in a marketplace where issues trade in pennies, one of the consequences could be more routing. As liquidity becomes spread among more price points, market participants may be unable to obtain immediate and complete execution at the NBBO, and may need to execute at multiple price points to be filled.

As the current intermarket linkage plan was developed so that market makers could access liquidity on other exchanges, there is a need for a faster, alternative "direct" routing protocol with fewer restrictions and greater speed. A "direct" routing protocol may be especially advantageous for issues that do not require market maker participation, such as highly-active options that trade in pennies. The "direct" connection may be a single third-party order delivery provider; may be multiple direct network connection providers accessed in a round robin fashion; or may be any other linkage alternative, including private direct pipelines.

There is accordingly a need for a rules-based options order routing model that can accommodate both legacy and new routing protocols concurrently. Such a rules-based routing model must be able to automatically choose, on an order-by-order basis, the appropriate routing destination and the appropriate routing protocol to reach that destination, depending on the characteristics of the order to be routed and the eligibility of the receiving market centers. The routing decisions must be immediate, anonymous, and fully electronic.

Additionally, there is a need for a system and method that minimizes the impact of away market best bid and offer quote traffic on the other components of the system, especially if the away market quotes are at prices that are inferior to the NBBO and do not result in execution opportunities.

SUMMARY

According to one aspect of the present invention, a method for options order routing includes providing a market center which lists a plurality of options series, wherein the market center has an order book for each option series and a market maker quote book for each option series, and wherein the market center has intermarket linkages and direct connections to a plurality of away market centers and receives a top-of-book best bid and offer disseminated quotation from the plurality of away market centers for each option series and wherein the market center has at least one configurable routing table including a set of routing rules that specify intermarket linkage and direct connection parameters for each away market center. The method further includes receiving an incoming order and determining if the order can execute at the NBBO or better, wherein if the order can execute at the NBBO or better, retrieving the best bid and offer disseminated quotation from each away market center.

The method further includes determining if a disseminated quotation of any away market center is superior to the orders and market maker quotes resident on the market center and wherein if the disseminated quotation of any away market center is superior, retrieving the set of routing rules from the routing table for the away market center having the superior disseminated quotation. The method further includes determining if the incoming order can be routed to the away market center having the superior disseminated quotation; and wherein if the incoming order can be routed to the away market center having the superior disseminated quotation, determining an appropriate routing protocol and generating an outbound order based on the routing rules for the specified away market center; and routing the generated outbound order to the away market center having the superior disseminated quotation over the selected routing protocol.

According to another aspect of the present invention, the incoming order of the method may be a buy order or a sell order, and the routing protocol of the method may specify an intermarket linkage or a direct network connection. According to another aspect of the invention, the method may include determining if the market center can override the intermarket linkage designation and route the order to the away market center using a direct network connection. Further, where a direct network connection is specified, the method may include having a set of intermarket linkage routing rules that govern intermarket linkage routing between the market center and the away market centers, wherein orders routed over a direct network connection are routed so as not to violate the intermarket linkage rules, for instance, by not allowing the routed order to trade through a better priced away market center or by not allowing the routed order to lock or cross the NBBO so as not to violate the intermarket linkage rules.

According to yet another aspect of the present invention, the method may include determining if only options series with assigned market makers are allowed to route using the intermarket linkage and determining if the incoming order is in an option series with an assigned market maker; and wherein if it is determined that the incoming order is in an option series with an assigned market maker, routing the incoming order to the away market center using the intermarket linkage routing protocol.

According to another aspect of the present invention, wherein the incoming order has a specified account capacity and wherein, in determining if the incoming order can be routed to the away market center having the superior disseminated quotation, the method may include determining the account capacity of the incoming order; and determining if the away market center can accept an order with the specified account capacity. The method may include determining if prior routed orders fully satisfied the obligation to route the incoming order to the away market center having the superior disseminated quotation. The method may also include wherein the user specified that the order is on behalf of a customer account, then setting the outbound order capacity to "C" and electing to route the order using a direct network connection or wherein the user specified that the order is on behalf of a market maker account, then setting the outbound order capacity to "MM" and electing to route the order using a direct network connection or wherein the user specified that the order is on behalf of a broker/dealer account, then setting the outbound order capacity to "BD" and electing to route the order using a direct network connection or wherein the user specified that the order is on behalf of a firm account, then setting the outbound order capacity to "F" and electing to route the order using a direct network connection or wherein the user specified that the order is on behalf of a specialist or market maker on an away market center, then setting the outbound order capacity to "FARM" and electing to route the order using a direct network connection.

According to another aspect of the present invention, the method may include determining if there is more than one away market center quoting at the NBBO, wherein if there is more than one away market center quoting at the NBBO, ranking the away market centers from best to worst; retrieving the disseminated quotation from the highest-ranked away market center, retrieving the routing rule for the highest-ranked away market center; and based on the retrieved routing rule, determining if this away market center is eligible to receive an order routed with the specified account capacity. The method may further include wherein, if after routing to all eligible away market centers at the NBBO, if the incoming order still has quantity remaining, determining how to process the excess quantity.

DESCRIPTION OF THE DRAWINGS

These and other features, aspects and advantages of the present invention will become better understood with regard to the following description, appended claims and accompanying drawings where:

FIG. 3B is a block diagram illustrating exemplary rules for the routing of orders based on their account capacities;

DETAILED DESCRIPTION

Figure 1:
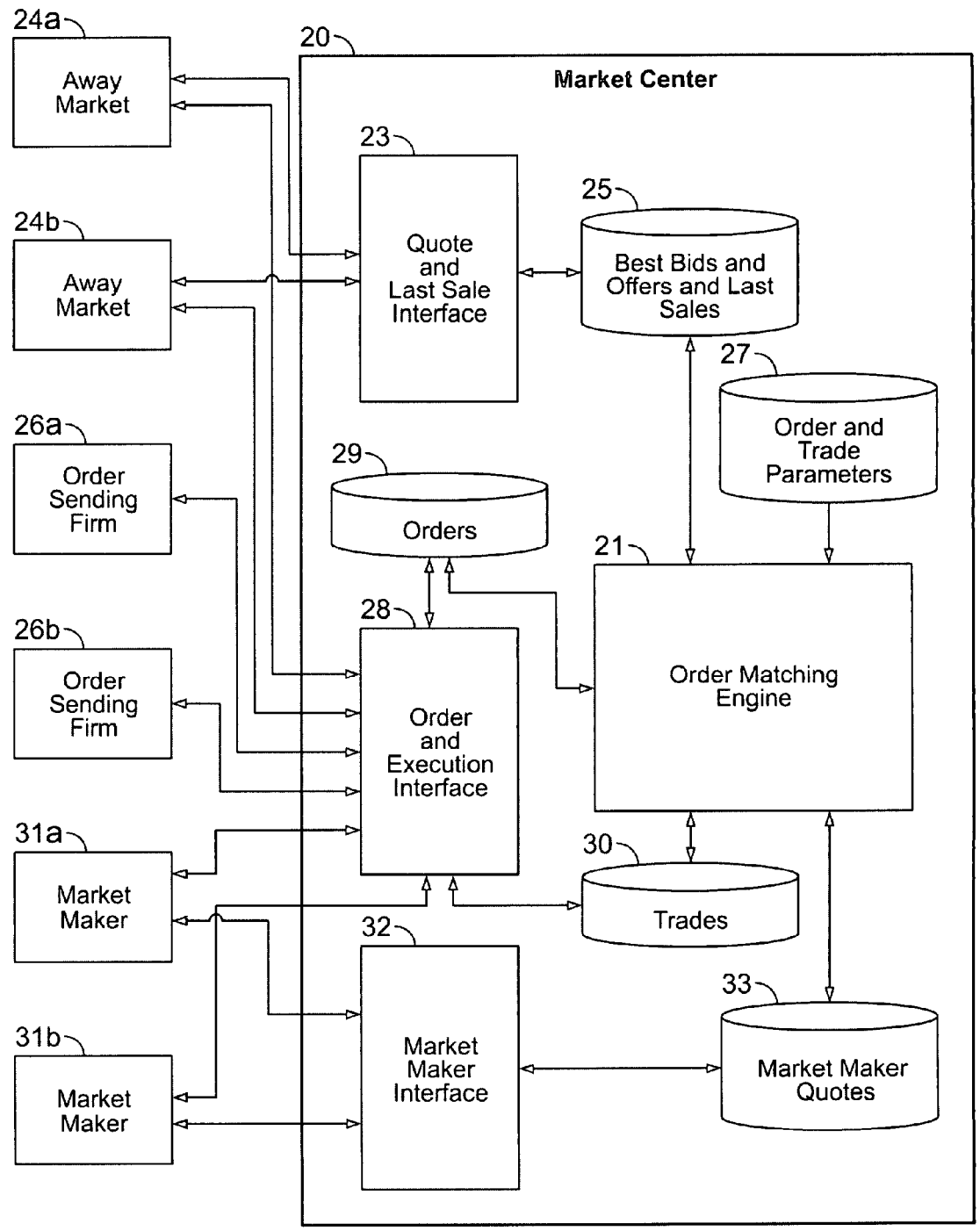
FIG. 1 is a block diagram illustrating the trading environment in which an embodiment of the present invention operates.

Referring to FIG. 1, a trading environment in which an embodiment of the system and method of the present invention operates is depicted. The examples discussed herein describe the use and application of the present invention in an equity options market center environment, but it should be understood that the present invention could be used in any type of financial instrument market center environment (e.g., equities, futures, bonds, etc.). This embodiment of the invention has multiply-listed single-leg equity options as the basis of its business model, whereby contracts for a specified underlying security can be bought (if the option type is a Call) or sold (if the option type is a Put) at a specific strike price prior to a specific exercise date. The functionality described herein is generally applicable to all standard options products (including near-term options and LEAPs) in all underlying securities, including but not limited to exchange-listed stocks, Exchange-Traded Funds (ETFs), Holding Company Depository Receipts (HOLDRs), American Depository Receipts (ADRs), and commonly traded indices.

The trading environment of this embodiment includes a market center 20 which interacts with a number of other market centers 24 (i.e. away markets) and traders at order sending firms 26 and market makers 31. It should be understood that the trading environment of this embodiment supports but does not require market makers 31, a market maker interface 32, or market maker quotes 33. It should also be understood that the market center 20 referred to herein refers to a computing system having sufficient processing and memory capabilities and does not refer to a specific physical location. In fact, in certain embodiments, the computing system may be distributed over several physical locations. It should also be understood that any number of traders 26 or market makers 31 or away market centers 24 can interact with the market center 20. The market center 20 is the market center on which a specific trader 26 posts a specific order, and on which a specific market maker 31 posts a specific quote. The market center 20 includes an order matching engine 21, which validates, maintains, ranks, executes and/or routes all orders on the market center 20, and which executes marketable quotes on the market center 20. In this embodiment, the code for the order matching engine 21 is stored in the market center 20's memory.

The market center 20 may also include a quote and last sale interface 23 that interacts with the away market centers 24 to capture quote and last sale information. This information is stored to a best bids and offers and last sales data structure 25. This data structure 25 is where the market best bid and offer (NBBO) information is stored. This data structure 25 is also where the market trade reports (prints) are stored. The market center 20 may also include an order and trade parameters data structure 27. The order and trade parameters data structure 27 stores pre-defined trading parameters and rules that are used by the order matching engine 21 in matching orders and executing trades. The market center 20 may also include an order and execution interface 28 which interacts with the traders 26, the market makers 31, the away market centers 24 and the order matching engine 21 in the order execution process.

The market center 20 may also include an order information data structure 29 where order information is stored and a trade information data structure 30 where completed trade information is stored. The market center 20 may also include a market maker interface 32 that interacts with market makers 31 to capture market maker bids and offers in assigned issues. These bids and offers are logically depicted in a market maker quotes structure 33 in this illustration.

Throughout the discussion herein, it should be understood that the details regarding the operating environment, data structures, and other technological elements surrounding the market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Figure 2:
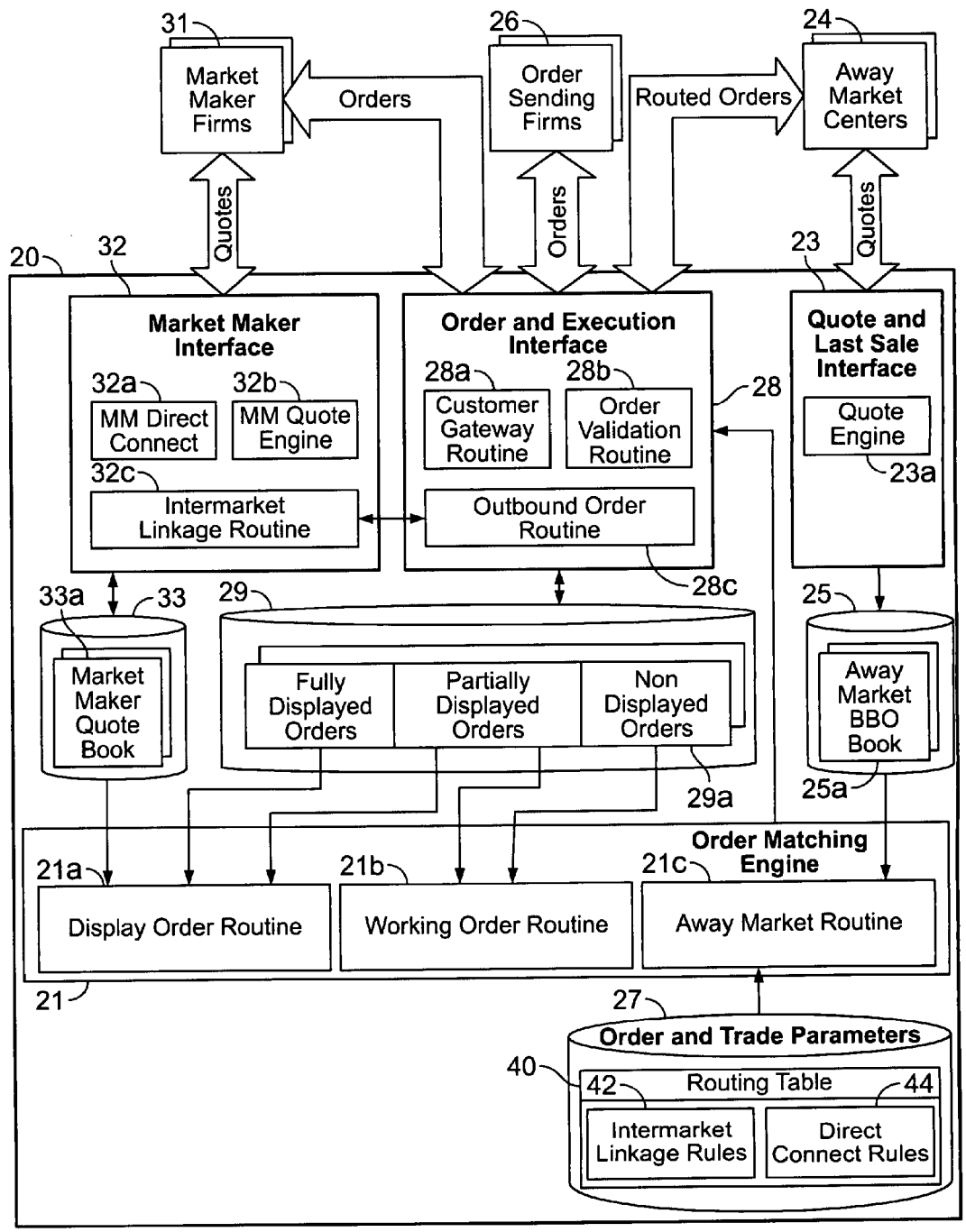
FIG. 2 is a block diagram illustrating the routing of orders to away market centers using an intermarket linkage and/or a direct connection.

Referring now to FIG. 2, the routing of outbound orders to the away market centers 24 is illustrated. The market maker interface 32 includes a market maker direct connect routine 32a, and also includes a market maker quote engine 32b, which, when executed, initiates a process that receives and analyzes market maker quotes. Market makers 31 can also use the market maker direct connect routine 32a to input principal orders (capacity=P) in issues to which they are assigned, for delivery to a specific designated away market 24, using an intermarket linkage routine 32c that forwards the principal orders directly to the outbound order routine 28c. Market makers 31 can also send orders (capacity=MM) to the market center 20 for execution. Such orders enter a process 28a for receiving incoming orders in the order and execution interface 28. The order and execution interface 28 forwards the market makers' orders to the order matching engine 21. If the order matching engine 21 cannot execute the order on the market center 20, then it may route the order to one or more away markets 24 using a process 28c for routing outbound orders, as described later.

Order sending firms 26 send orders on behalf of customers, broker/dealers, firms, and market professionals on other exchanges (capacity=C, BD, F, and FARM, respectively) to the market center 20 for execution. Such orders enter a process 28a for receiving incoming orders in the order and execution interface 28. The order and execution interface 28 forwards the order sending firms' orders to the order matching engine 21.

The best bids and offers (top of book quotes) from each away market 24 are received by the quote and last sale interface 23, which maintains an away market BBO book 25a for each issue. The quote and last sale interface 23 also includes a quote engine 23a which, when executed, initiates a process that retrieves and analyzes away market BBO quotes and the consolidated NBBO quote and notifies the order matching engine 21 when it detects that an away market center best bid or offer touches (i.e. equals or overlaps with) the price of an order in the order book 29a.

The order and trade parameters data structure 27 also includes a Routing Table 40, which is used by the order matching engine 21 to determine whether, and how, to construct and route each outbound order, on an order-by-order basis. The Routing Table 40 includes intermarket linkage routing rules 42 and direct connection routing rules 44. It should be noted that this document describes intermarket linkage routing and direct routing from the standpoint of the market center's business rules, and does not describe the systems, data communications networks, or devices by which the market centers actually send and receive orders and messages.

In this embodiment, the order matching engine 21 includes a display order routine 21a, a working order routine 21b and an away market routine 21c. The display order routine 21a receives and processes fully-displayed orders and partially-displayed orders when activated ("Display Order Process"). The working order routine 21b receives and processes partially-displayed orders and nondisplayed orders when activated ("Working Order Process"). As illustrated in FIG. 2, although market maker quotes are maintained in a separate market maker quote book 33a, they are retrieved and integrated with displayed orders and partially-displayed orders in the Display Order Process. As also illustrated in FIG. 2, although away market quotes are maintained in a separate best bids and offers book 25a, they are retrieved and integrated with orders 29a and market maker quotes 33a when the order matching engine 21 evaluates matching opportunities and when its away market routine 21c ("Routing Process") evaluates routing opportunities. If the order matching engine 21, upon evaluating the prices in the marketplace, determines that an away market 24 has the best price in the marketplace, i.e., it cannot match an incoming order in the Display Order Process 21a or the Working Order Process 21b at the same or better price than an away market's quote, then it attempts to execute the order in the Routing Process 21c instead.

Once the Routing Process 21c has constructed the outbound order, it releases the order to the process for routing outbound orders 28c of the order and execution interface 28. The process 28c delivers P/A orders, i.e., intermarket linkage orders sent on behalf of a customer, and Principal orders 29e to the intermarket linkage, which in turn delivers the order to the intended away market center 24. Similarly, the process 28c delivers orders with all other account capacities 29f (C, MM, BD, F, or FARM) directly to the intended away market center 24 using a private direct connection or else by using a third-party service provider which in turn delivers the order to the intended away market center 24.

Figure 3A:
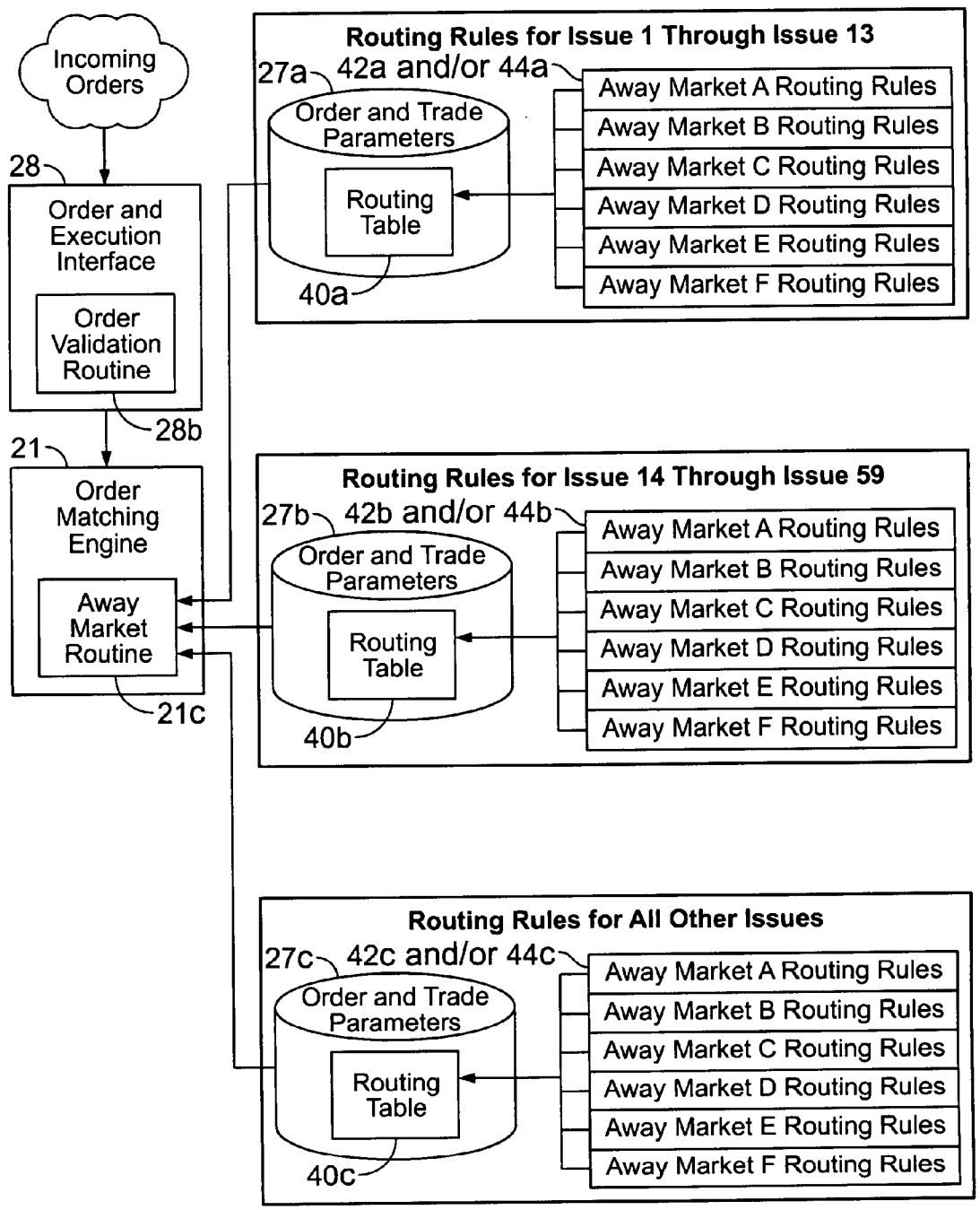
FIG. 3A is a block diagram illustrating the way multiple Routing Tables can be configured independently for different issues.

Referring now to FIG. 3A, an embodiment depicting multiple copies of the order and trade parameters structure 27 is shown. As shown in this example, the market center 20 can maintain multiple copies of the order and trade parameters structure as depicted in 27a, 27b, and 27c, and each of these structures can be associated with its own Routing Table as depicted in 40a, 40b, and 40c. Each Routing Table contains the rules that determine the manner in which the market center 20 routes electronically to each of the away market centers. In this example, six away market centers 24 (Away Market A through Away Market F) are eligible routing destinations.

Each Routing Table can be associated with or linked to a different set of options series, as determined by the business rules of the market center 20. By way of example, the market center 20 could define a set as being comprised of its most actively traded issues, or all issues that trade in pennies, or issues whose underlying stock name begins with the letters A through G, or issues that do not have a lead market maker, or any criteria of its choosing. A single option series could also be associated with its own Routing Table. This allows the market center 20 to configure its routing rules differently according to the business requirements of the options series with which it is associated or linked.

In the example shown in FIG. 3A, when an incoming order is received by the order and execution interface 28, the process for receiving incoming orders 28b releases the validated order to the order matching engine 21. In this example, the market center 20 has defined routing rules for three sets of issues. Thirteen issues (referred to as "Issue 1" through "Issue 13" in this example) represent the first set. If the incoming order specifies any of these thirteen issues, and the order matching engine 21 determines that it should route the order, then the Routing Process 21c retrieves and evaluates Routing Table 40a, which contains the routing rules 42a and/or 44a that have been defined and configured for these thirteen issues.

The second set of issues consists of "Issue 14" through "Issue 59." If the incoming order specifies any of these issues, and the order matching engine 21 determines that it should route the order, it retrieves and evaluates Routing Table 40b, which contains the routing rules 42b and/or 44b that have been defined and configured for this second set of issues. The routing rules in Routing Table 40b may be the same as, or different from, the routing rules in Routing Table 40a.

The third set of issues includes all other issues, i.e., all issues other than "Issue 1" through "Issue 59." If the incoming order specifies any of these issues, and the order matching engine 21 determines that it should route the order, it retrieves and evaluates Routing Table 40c, which contains the routing rules 42c and/or 44c that have been defined and configured for this third set of issues. The routing rules in Routing Table 40c may be the same as, or different from, the routing rules in Routing Table 40a and/or Routing Table 40b. By way of explanation, the market center 20 may choose to maintain multiple Routing Tables with the same routing rules for reasons such as system performance.

Referring now to FIG. 3B, an exemplary set of Routing Table rules that includes two routing rules for each of four away markets 24 (Away Markets A, B, C, and D) is illustrated. In this example, issue XYZ, which has an assigned lead market maker, is included in the set of issues that is associated with the exemplary Routing Table rules. As indicated in this example, orders received for Issue XYZ can be routed to the away markets using either an intermarket linkage (routing rules 42c) or alternatively using a direct connection (routing rules 44c), depending on the account capacity specified on the incoming order.

In the examples of this document, an exemplary intermarket linkage is referred to by the generic routing protocol name "LINKAGE" while an exemplary private direct connection or service provider is referred to by the generic routing protocol name "DIRECT." The market center 20 can actually support multiple private direct connections, e.g., as backup routes in case a primary connection is lost, or as alternative connections that may be utilized for business reasons. Each different connection would be assigned its own routing protocol name and have its own routing rules in the Routing Table.

As specified in the exemplary Routing Table rules, if an incoming order for issue XYZ must be routed, the Routing Process can route it using either an intermarket linkage protocol 41 or a direct connection protocol 43, depending on the account capacity specified on the incoming order and whether the eligible away market accepts orders with that account capacity or not. As illustrated in FIG. 3B, all four away markets accept customer orders (Capacity=C) and market maker orders (Capacity=MM). In this example, the market center's business rules stipulate that orders in XYZ should be routed using the intermarket linkage protocol 41 first, and should be routed using the direct connection protocol 43 only if the intermarket linkage cannot accept the order. Accordingly, the exemplary Routing Table rules show that, for each of the four away markets, the routing rule 42c for Routing Protocol=LINKAGE has been configured to precede the routing rule 44c for Routing Protocol=DIRECT, as the Routing Process 21c reads the rules sequentially in this embodiment. If, however, the routing rule for Routing Protocol=DIRECT were configured to precede the routing rule for Routing Protocol=LINKAGE for any, or all, of the away markets, then the Routing Process 21c would attempt to route using the direct connection protocol 43 first, and would only route using the intermarket linkage protocol 41 if the direct connection 43 was not available. In this embodiment, a given order may be routed to a given away market center using a given routing protocol, but is not routed contemporaneously to the same away market center using both protocols. However, a given order may be routed to different away market centers using different routing protocols.

As shown in the exemplary Routing Table rules, all four away markets accept orders on behalf of customers (Capacity=C) and orders on behalf of market makers (Capacity=MM). As shown in 29e, customer orders are sent with Capacity=PA and market maker orders are sent with Capacity=P when routed using the intermarket linkage 41. However, as shown in 29f, they are sent with their original account capacities (i.e., Capacity=C or Capacity=MM) when routed using the direct connection 43. According to the exemplary Routing Table rules, in this illustration, Away Market A 24a also accepts orders on behalf of broker/dealer accounts (Capacity=BD); Away Market B 24b also accepts orders on behalf of firm accounts (Capacity=F); and Away Market D 24d also accepts orders on behalf of broker/dealers, firms, and market professionals on other exchanges (Capacity=BD, F, and FARM, respectively).

According to the exemplary routing rules, if an incoming order for issue XYZ with Capacity=BD must be routed, the Routing Process can only route it to Away Market A 24a and/or Away Market D 24d, using the direct connection 43, as Away Market B 24b and Away Market C 24c do not accept orders with Capacity=BD. Similarly, if an incoming order for issue XYZ with Capacity=F must be routed, the Routing Process can only route it to Away Market B 24b and/or Away Market D 24*d* as Away Market A 24*a* and Away Market C 24*c* do not accept orders with Capacity=F. Similarly, if an incoming order for issue XYZ with Capacity=FARM must be routed, the Routing Process can only route it to Away Market D 24*d*, as no other away market accepts orders with Capacity=FARM. However, an order will not route to an away market that accepts the account capacity if it would cause a trade-through of a superior away market that does not accept the account capacity. In this embodiment of the invention, the Routing Process only routes to away markets if they are quoting at the NBBO.

When an order enters the Routing Process, the Routing Process checks the Routing Table rules, and based on the parameters of the order, determines the optimal collection of routes. Each away market is assigned a numerical "Routing Priority" which ranks it as a preferred routing destination according to the market center's business rules. When multiple away markets are quoting at the same price and are eligible to receive a routed order, the Routing Priority serves as a "tiebreaker" for determining the sequence in which the order will route. The Routing Process generally routes to the "best" away market, up to its disseminated quotation size, before routing to the "next-best" away market, in the ranked sequence of their assigned Routing Priorities, until the incoming order is depleted or until all the eligible away markets at the NBBO have been satisfied. If any given away market at the NBBO is not eligible to receive the routed order, then the Routing Process proceeds to the next-best away market at the NBBO instead. The Routing Process generally "decrements" each away market's disseminated quote size in local memory as it routes orders to it, reducing the obligation to each disseminated quote.

After the incoming order has been routed to all the eligible away markets quoting at the NBBO, if the order still has quantity available to trade, then the process must determine how to treat the excess (oversize) quantity of the order based on the rules of the order type and the rules in effect in the options marketplace. If an order type that is normally displayed publicly cannot be posted because it is not allowed to lock the NBBO, (for example, an order that is routed using a connection other than the Intermarket Linkage) then in this embodiment of the invention, the market center 20 will hide the order as a "dark" order instead, wherein it is inserted in the internal order book 29*a* but is not disseminated to the public order book. The "dark" order is capped at the NBBO if necessary (to prevent it from crossing the market, even though such cross would not be displayed publicly) and is then ranked according to price/time priority in the Display Order Process like any other displayed order, even though the order is temporarily not displayed to the marketplace. If an incoming order or quote is executable against the "dark" order, the match is executed at the "dark" order's price, just as it would be if the "dark" order were displayed. A "dark" order is subsequently displayed to the marketplace at such time as the NBBO changes so that the "dark" order would no longer lock the market if it were posted. The market center 20 may also choose to cancel orders that are not permitted to lock the NBBO instead of converting them to "dark" orders, or may implement different rules for customer orders and non-customer orders.

The Routing Table and its Configurable Parameters

Certain key functional parameters included in an exemplary Routing Table are listed below. Not all parameters are applicable to all away markets. The Routing Table is not restricted to these parameters, nor to the behaviors described herein. The market center 20 may add additional parameters or values, may disable parameters or values, or may change the behavior of existing parameters or values.

| Parameter | Description |
| --- | --- |
| Destination | The Market Center/Market Participant for a route, i.e., the Away Market. |
| Routing Protocol | The code to indicate the appropriate routing protocol. Orders can be routed using an intermarket linkage or using a direct connection or a third-party service provider. Although multiple direct connections and service providers can be specified, this example only uses two generic protocols: "LINKAGE" = intermarket linkage "DIRECT" = private direct linkage Detailed examples of the use of the Routing Protocol parameter follow in the next section. |
| Start Time | The earliest time that orders can be sent to a route. Defines the effective time for any given routing rule. |
| Stop Time | The latest time that orders can be sent to a route. Defines the end time for any given routing rule. |
| Capacity Preference | Capacity restrictions on routed orders. Different rules can be established for the routing of orders with different capacities. Capacity MM = MM orders accepted Capacity BD = Broker/dealer orders accepted Capacity C = Customer orders accepted Capacity F = Firm orders accepted Capacity FARM = FARM orders accepted Detailed examples illustrating the use of the Capacity parameter follow in the next section. |
| Routing Priority | Numerical value from 1 to 99 used as a tiebreaker when two or more Away Markets are quoting at the same price and are equally eligible to receive a routed order. The higher the number, the more desirable the destination is. May be set to 0 to indicate that a route is temporarily inaccessible and no orders should route there. |
| NOW-eligible | Is this market center eligible to receive NOW Orders? True/false flag. |
| Routing Behavior | Various models for default routing behavior, depending on the destination market, the capacity of the order being routed, and other order attributes. 1: As volume is sent, decrement the quote size internally. Once the quote is fully decremented, do not route additional orders. Instead, post the "dark" orders internally and allow them to execute against incoming order flow. Reinstate the quote if the price changes or the size increases. 2. As volume is sent, decrement the quote size internally. Continue to route to the quote, even if the quote does not change, as long as fills are received. 3. Always route up to the full quote size, even if other orders have previously been routed to the quote and even if the away market does not update its quote. Do not decrement or reinstate the quote size. If any order quantity remains after routing, post it as a "dark" order. 4. Always route up to the full quote size, even if other orders have previously been routed to the quote and even if the away market does not update its quote. Do not decrement or reinstate the quote size. If any order quantity remains after routing, cancel it back to the sender. If any quantity is declined by the away market, cancel it back to the sender. 5. As volume is sent, decrement the quote size. When the quote size has been fully satisfied, if the order still has remaining quantity and is a limit priced order, post the order even if locks the NBBO. If the away market declines/cancels any portion of the routed order, then reinstate the declined contracts, increasing the lock. Reinstate |

-continued

| Parameter | Description |
|---|---|
| | the quote if the price changes or the size increases.<br>Detailed examples of different Routing Behaviors follow in the next section. |
| Route Preference Style | Indicates whether orders should be sent as IOC orders or as DAY orders. Although orders routed using the intermarket linkage are sent as IOC wherever possible, orders routed using a private direct link may need to be sent as DAY orders followed with a Cancel message after a specified interval has passed without a fill or decline. |
| Automatic Timeout | Indicates the number of seconds that the Routing Process should wait before it sends a Cancel message to the away market. The timer can be initiated when the order is sent, or alternatively when an ACK (acknowledgement of receipt of the routed order) is received from the away market. Used for DAY orders, as they do not automatically expire. |
| Oversize Weight | A multiplier that is used when calculating the maximum quantity of contracts that can be routed to a given away market quoting at the NBBO. For example, if the Oversize Weight = "2," then the away market is eligible for routing up to twice the size of its disseminated quotation. Setting the Oversize Weight to "1" is the same as setting it to zero, as the away market will only be eligible for routing up to its disseminated quotation size. |
| Maximum Route Size | Under current marketplace rules, away markets guarantee automatic execution of orders routed on behalf of customers up to their disseminated quotation size, so this parameter is not generally relevant to P/A orders routed using the intermarket linkage. However, this parameter can be used in cases where the guaranteed automatic execution size differs from the disseminated quote size, e.g., for specific options series or specific expiration terms, or for orders that route over a private direct link instead of using the intermarket linkage. |
| Maximum Route Style | For use in combination with a Maximum Route Size. Various models for routing if a Maximum Route Size is in effect for the route.<br>1. Always route up to the Maximum Route Size, regardless of the quote size<br>2. Route up to the lesser of the Maximum Route Size and the unsatisfied quote size<br>3. Route up to the greater of the Maximum Route Size and the unsatisfied quote size |
| Protected Quote | Indicates whether an Away Market's quotes are protected against trade-through or not. Currently all markets are protected, but options market rules may change so that only fully-electronic markets are protected whereas hybrid markets are not protected. True/false flag |
| Allows Intermarket Sweep | Indicates if a market center accepts orders that are off the NBBO if they are flagged as intermarket sweep orders, or if they programmed to automatically reject orders off the NBBO. Not eligible for use until intermarket sweeping is allowed on the options market. True/false flag. |
| Intermarket Sweep Cap | Number of ticks worse than the disseminated NBBO at which an incoming intermarket sweep order can contemporaneously route after satisfying all markets at the NBBO first. This parameter is applicable only if intermarket sweeping is allowed, but is capped at a specified number of price increments beyond the NBBO. |

Figure 4:
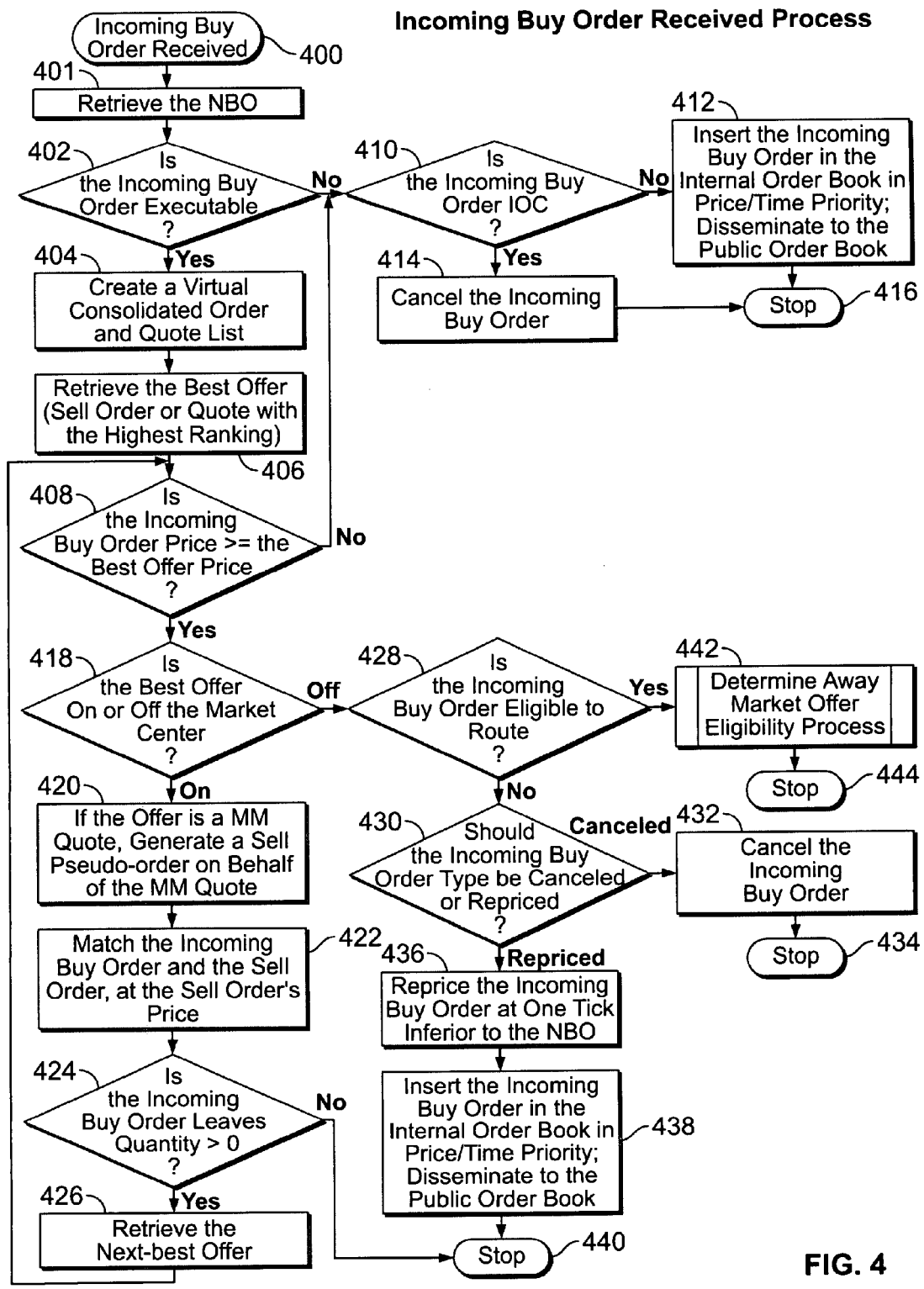
FIG. 4 is a flow diagram illustrating a process for determining if an incoming buy order should post, execute, cancel, or route.

Detailed Descriptions of the Order Routing Process
Incoming Buy Order is Received Process Referring to FIG. 4, a routine wherein the order matching engine 21 receives an incoming buy order is illustrated. If one or more away market quotes are superior to the best price on the market center (whether displayed or not), then the incoming buy order is evaluated to determine if it should route or not. If no away market quotes are superior, then the incoming buy order executes against resident orders and/or market maker quotes first. It should be noted that the processing related to incoming market maker quotes, incoming working orders, incoming directed orders, and market maker entitlements are not described in detail herein because they are not central to the operation of this invention and are described elsewhere.

In step 400, the process receives the incoming buy order. In step 401, it retrieves the NBO. In step 402, the process checks if the incoming buy order is executable. The incoming buy order's price does not necessarily have to be at or better than the NBO to be executable, as the internal order book 29a may include Working Orders whose prices are never displayed, and/or may include "dark" sell orders whose prices are temporarily hidden until the NBB moves away. If the incoming buy order is not executable, then the process continues to step 410, where it checks if the incoming buy order is IOC or not. If the incoming buy order is IOC, then the process continues to step 414, where it cancels the order and terminates in step 416 as indicated. If, however, the incoming buy order is not IOC, then the process continues to step 412, where it posts the incoming buy order to the internal order book 29a in price/time priority and disseminates it to the public order book. The process then terminates in step 416 as indicated.

Returning to step 402, if, however, the incoming buy order is indeed executable, then the process continues to step 404. In step 404, the process combines the away market BBO book 25a, the market maker quote book 33a, and the internal order book 29a together in a virtual consolidated order and quote list, which it ranks in price/display/time priority but with a preference for resident interest over away market interest at the same price level. What this means is that at any given price level, displayed orders and market maker quotes have the highest priority, Working Orders have the next-highest priority, and away market quotes have the lowest priority. In step 406, it retrieves the best offer in the virtual consolidated order and quote list.

In step 408, the process compares the price of the incoming buy order to the retrieved best offer. If the incoming buy order's price is greater than or equal to the retrieved best offer, then the process continues to step 418, where it checks if the best offer is on or off the market center 20. If the best offer is on the market center 20 (i.e., if it is a sell order or market maker quote), then the process continues to step 420, where if the best offer is a market maker quote, it automatically generates an IOC sell pseudo-order on behalf of the quote. The process then continues to step 422, where it matches the incoming buy order and the sell order or pseudo-order, at the sell order's price.

In step 424, the process checks if the incoming buy order's Leaves quantity is greater than zero. If it is not, then the process terminates in step 440 as indicated. If, however, the incoming buy order still has quantity available to trade, then the process continues to step 426, where it retrieves the next best offer in the virtual consolidated order and quote list. The process then returns to step 408, where it checks if the incoming buy order's price is still greater than or equal to the next best offer. If the incoming buy order's price is still greater than or equal to the best offer, then the order is still executable, and the process continues to step 418. If, however, the incoming buy order's price is no longer greater than or equal to the best offer, then the order is no longer executable, and the process continues to step 410 instead.

Returning to step 418, if, however, the best offer is off the market center 20, i.e., is an away market quote, then the incoming buy order cannot execute on the market center 20. The process continues to step 428, where it checks if the incoming buy order type is eligible to route. By way of explanation, certain order types such as IOC orders and exchange-restricted orders cannot route by definition. If the incoming buy order is not eligible to route, then the process continues to step 430, where it determines whether the incoming buy order should be canceled or repriced according to the business rules of the market center 20, as it is not permitted to lock the market. If the order should be canceled, then the process continues to step 432, where it cancels the incoming buy order and then terminates in step 434. If, however, the order should be repriced instead, then the process continues to step 436, where it reprices the incoming buy order at one tick inferior to the NBO and continues to step 438, where it inserts the repriced buy order in the internal order book 29*a* and disseminates it to the public order book. The process then terminates in step 440 as indicated.

Figure 5:
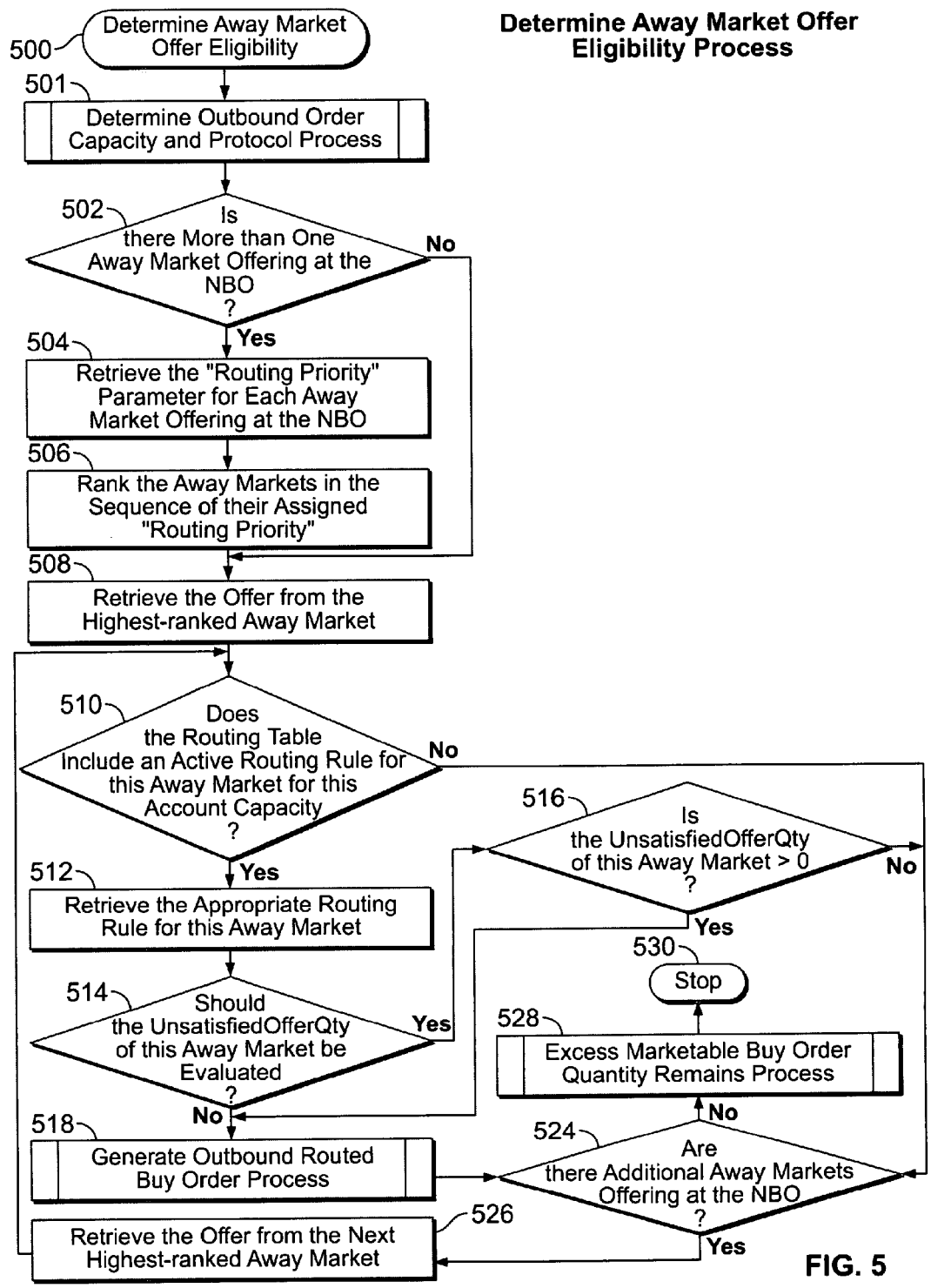
FIG. 5 is a flow diagram illustrating a process for determining if an away market offer is eligible to receive an outbound routed buy order.

Returning to step 428, if, however, the incoming buy order is eligible to route off the market center 20, then the process continues to step 442, where it initiates the "Determine Away Market Offer Eligibility Process" and proceeds to step 500 in FIG. 5.

Determine Away Market Offer Eligibility Process

Referring now FIG. 5, a routine wherein the Routing Process determines if an incoming buy order can route to one or more away markets offering at the NBO is illustrated. The process ranks all eligible away markets according to their assigned "Routing Priority," and determines if the highest-ranking away market's offer has already been fully satisfied or not by prior routed buy orders. If the away market is not fully satisfied, then the process determines if the away market can accept orders with the account capacity specified on the incoming buy order. If the away market can receive orders with the specified account capacity, then the process generates and routes an order to the away market. The process satisfies each eligible away market at the NBO, in the sequence of their assigned Routing Priority.

In this embodiment in the process depicted in FIG. 5, the process only routes to away markets offering at the NBO. It should be understood, however, that in other embodiments where intermarket sweeping is allowed that the routing in FIG. 5 would not be capped at the NBO, and the away market offers at each successive price level inferior to the NBO would generally be ranked and evaluated in the same manner as described herein for away market offers at the NBO.

Figure 6:
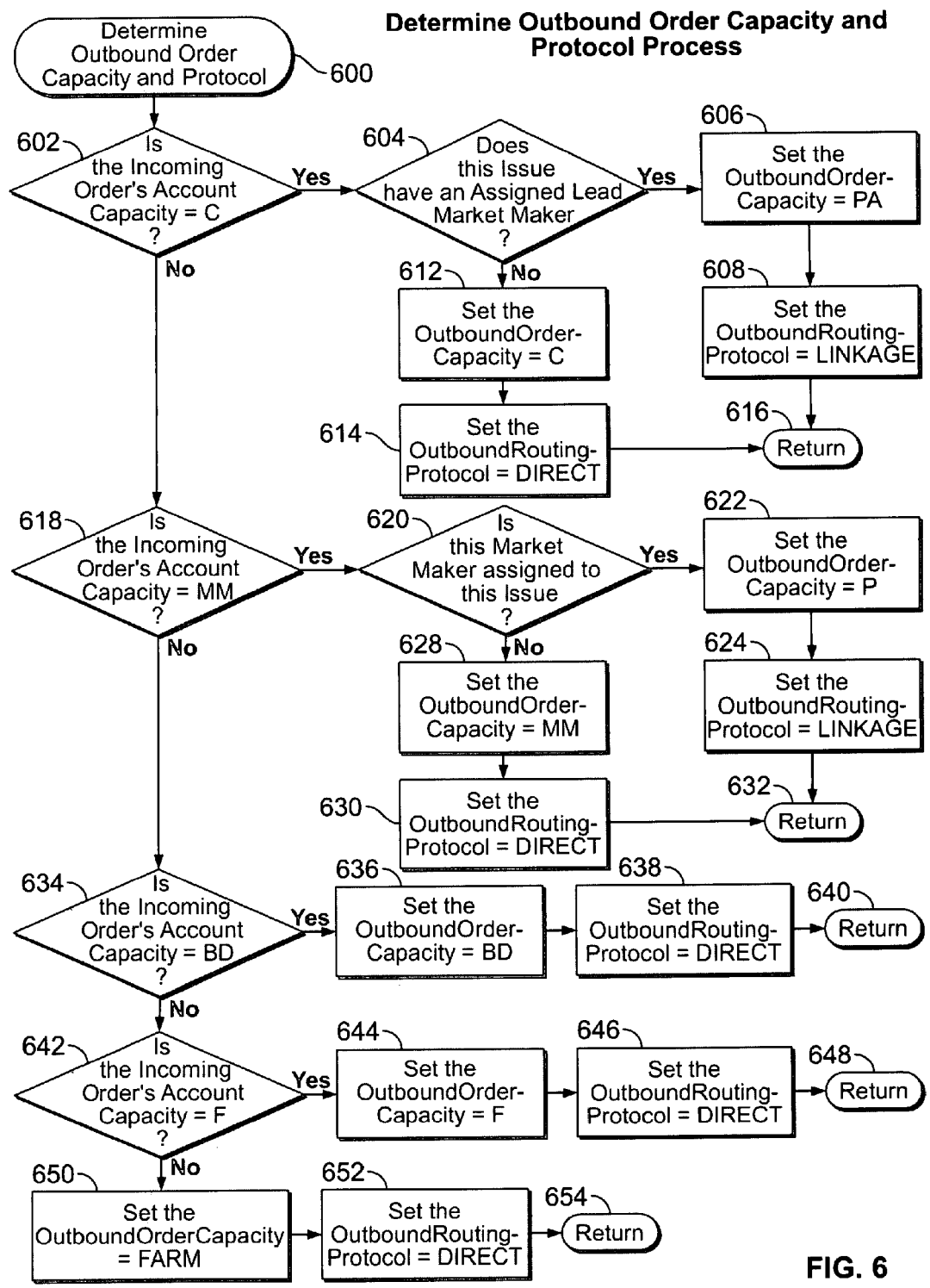
FIG. 6 is a flow diagram illustrating a process for determining the account capacity that should be assigned to an outbound routed order.

In step 501, the process initiates the "Determine Outbound Order Capacity and Protocol Process" and proceeds to step 600 in FIG. 6. This procedure determines the appropriate account capacity to assign to the outbound routed order, and determines the appropriate routing protocol to use for routing the outbound order. FIG. 6 is described in detail below.

After the process determines the appropriate account capacity and routing protocol in FIG. 6, it proceeds to step 502, where it checks if there is more than one away market offering at the NBO. If there is, then the process continues to step 504, where it retrieves the "Routing Priority" assigned to each away market. In step 506, the process ranks the away markets according to their assigned numerical Routing Priority.

In step 508, the process retrieves the offer from the highest-ranked away market. Returning to step 502, if there is only one away market at the NBO, then it is automatically the highest-ranked away market, and its offer is retrieved in step 508. In step 510, the process reads the Routing Table to determine if an active routing rule exists for this away market for this account capacity and routing protocol. If the process locates an active routing rule for this away market for this account capacity and routing protocol, then it continues to step 512. If, however, no such rule exists, then the Routing Process cannot route this incoming buy order to this away market, and the process continues to step 524, where it checks if there are any additional away markets at the NBO, as those markets may have active routing rules for this account capacity and routing protocol.

In step 512, the process retrieves the appropriate routing rule for this away market from the Routing Table. In step 514, the process checks if it should evaluate whether this away market's offer is fully satisfied or not. If at step 514 the process determines that the check is applicable, then the process continues to step 516, where it checks if the away market's offer is fully satisfied. If the away market is fully satisfied, i.e., its UnsatisfiedOfferQty is equal to zero, then the process continues to step 524, where it checks if there are any additional away markets at the NBO. If, however, the away market's offer is not fully satisfied, i.e., its UnsatisfiedOfferQty is greater than zero, then the process continues to step 518 instead. Returning to step 514, if the process determines that it should not check if the away market has been satisfied or not, then it also continues to step 518.

Figure 7A:
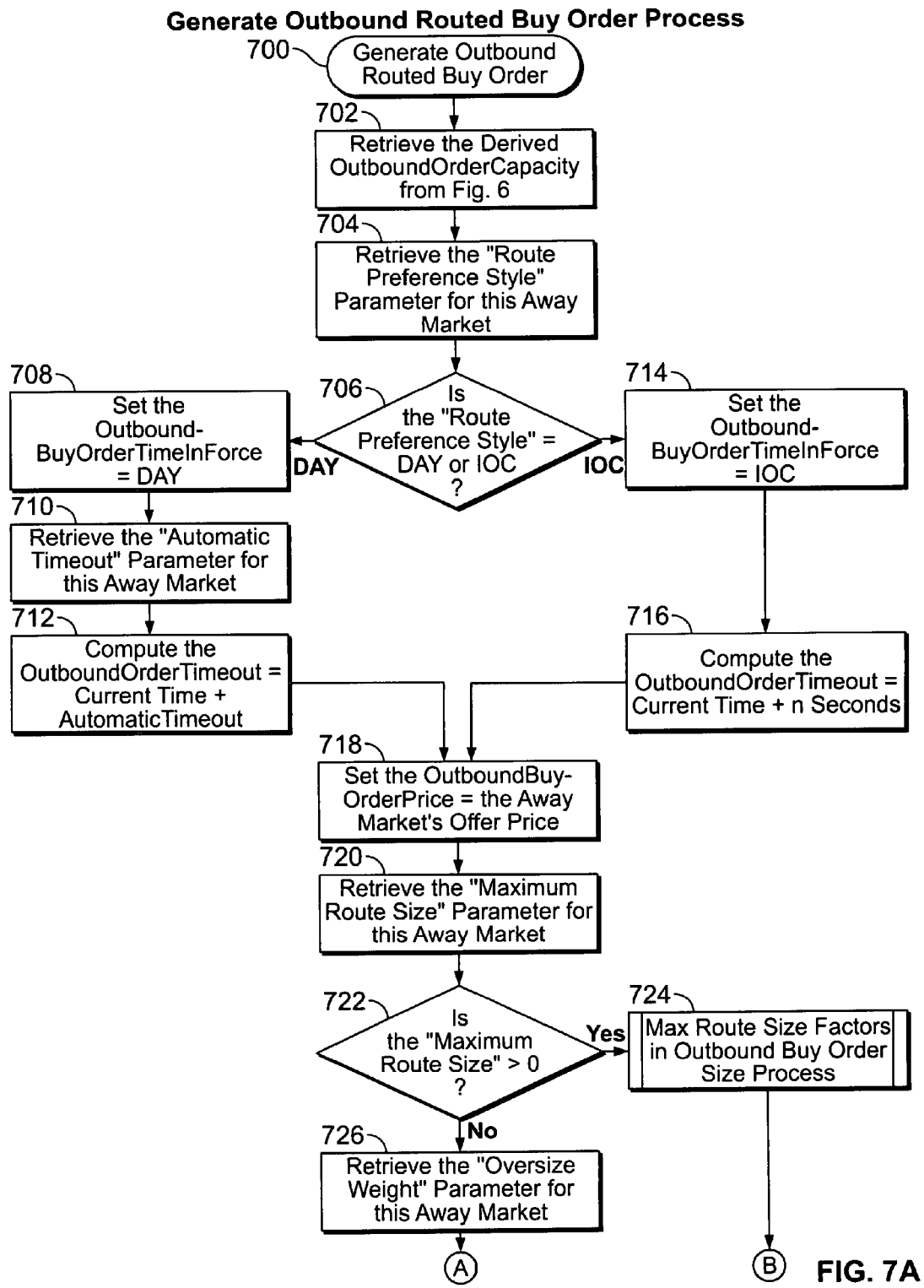
FIGS. 7A-7B are flow diagrams illustrating a process that generates an outbound routed buy order.
Figure 7B:
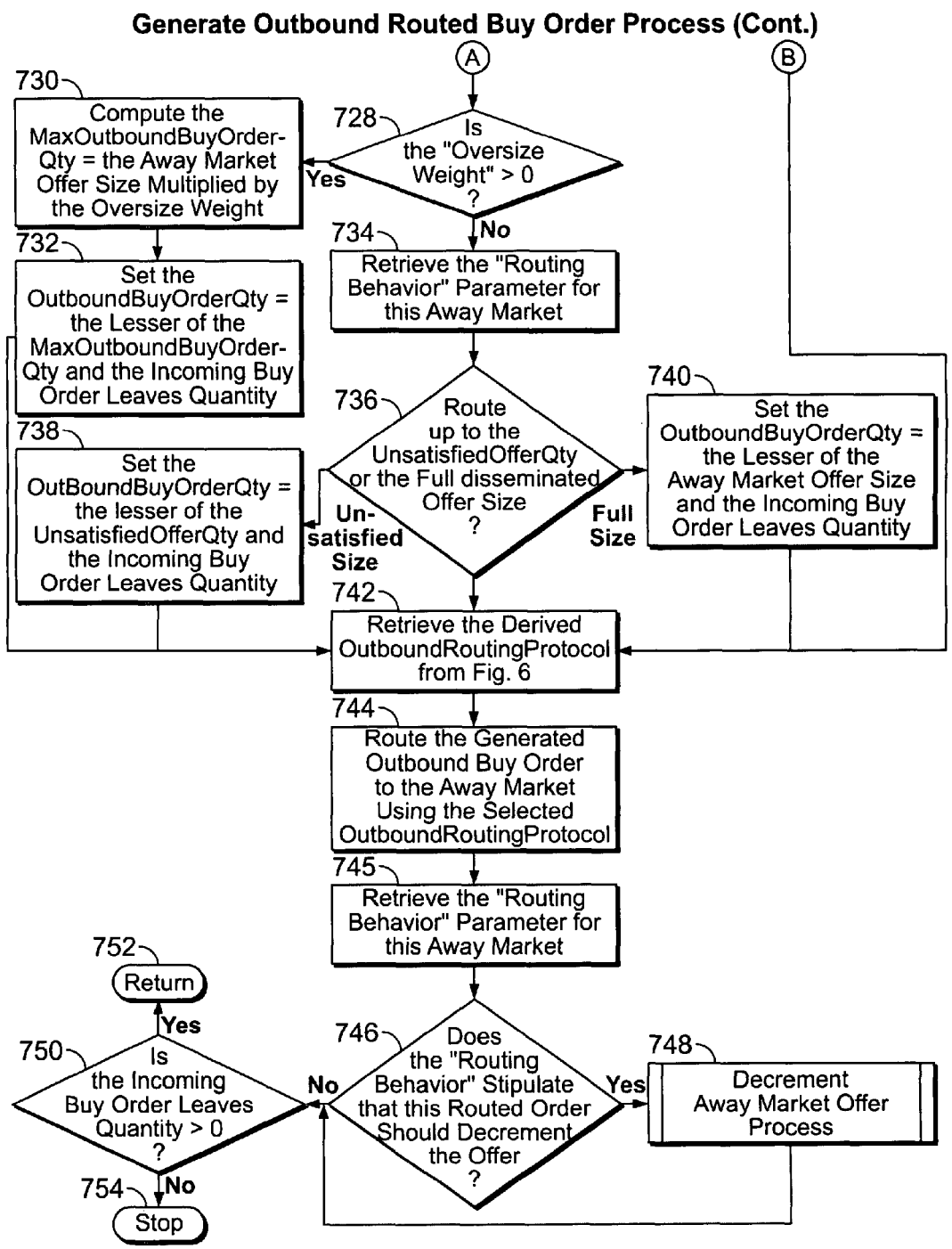

In step 518, the process initiates the "Generate Outbound Routed Buy Order Process" and proceeds to step 700 in FIG. 7A. This procedure constructs the outbound buy order and routes it to the away market. FIGS. 7A-7B are described in detail below.

After the process has generated and routed the outbound buy order in FIGS. 7A-7B, it proceeds to step 524, where it checks if there are additional away markets at the NBO, as it may be able to route to those markets as well. If there are additional markets, then the process continues to step 526, where it retrieves the offer from the next-highest ranking away market at the NBO and returns to step 510, where it repeats the steps involved in determining if this next-best away market is eligible to receive a routed buy order. The process continues until all eligible away markets at the NBO have been satisfied, or else the incoming buy order is depleted.

Figure 10:
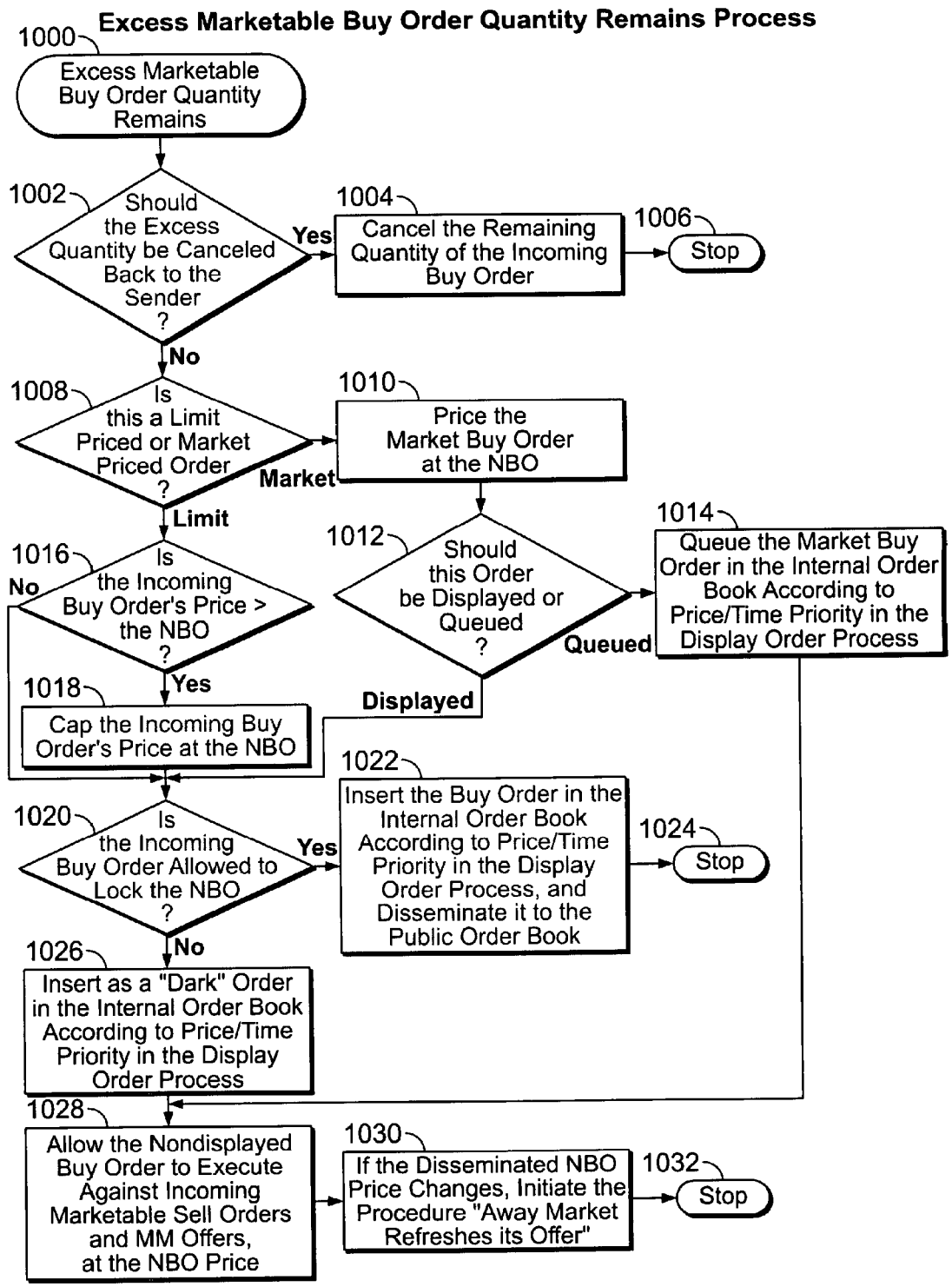
FIG. 10 is a flow diagram illustrating a process for determining whether the excess quantity of an incoming buy order should be canceled, posted, or go "dark" after all obligations to the NBO have been satisfied.

Returning to step 524, if there are no additional away markets at the NBO and the incoming buy order still has quantity available to trade, then the process continues to step 528, where it initiates the "Excess Marketable Buy Order Quantity Remains Process" and proceeds to step 1000 in FIG. 10. This procedure determines what to do with the remaining marketable portion of the incoming buy order after it has routed to all eligible away markets at the NBO. FIG. 10 is described in detail below.

Determine Outbound Order Capacity and Routing Protocol

Referring now to FIG. 6, a routine wherein the Routing Process determines the appropriate account capacity to include on the outbound routed order is illustrated. The account capacity specified on the incoming order is translated to the appropriate account capacity for the outbound order, depending on factors such as whether the issue has an assigned lead market maker or not. The process also determines whether the market center 20 should route the outbound order using the rules of the intermarket linkage, or using the rules for routing via a "direct" linkage instead (e.g., a third-party service provider or a direct network connection.)

In this embodiment of FIG. 6, for ease of illustration, orders are routed using the intermarket linkage protocol 41 wherever possible, and are routed using the direct linkage protocol 43 only when the intermarket linkage protocol 41 cannot be used. In a different embodiment, the market center may prefer to route orders using the direct linkage protocol 43 wherever possible. In yet a different embodiment, the outbound order protocol may not be determined by the Routing Process 21c, and may instead default to the routing protocol specified on the intermarket routing rule 42 or the direct routing rule 44, whichever rule is encountered first, as described in FIG. 3B.

In step 602, the process checks if the incoming order's account capacity is "C," indicating an order on behalf of a customer. If it is, the process continues to step 604, where it checks if the issue has an assigned lead market maker. It should be noted that market makers other than the lead market maker may be permitted by the rules to act as an agent on behalf of customer orders routed over the linkage, e.g., a designated intermarket linkage market maker ("IMM"). If the issue does have an assigned lead market maker or equivalent, then the process continues to step 606, where it sets the OutboundOrderCapacity="PA" to indicate that this is a Principal acting as Agent order. The process then continues to step 608, where it sets the OutboundRoutingProtocol="LINKAGE" to indicate that this order should be routed using the intermarket linkage protocol. The process then terminates in step 616 as indicated.

Returning to step 604, if, however, the issue does not have an assigned lead market maker, then the process continues to step 612, where it sets the OutboundOrderCapacity="C" to indicate that this is a customer order. The process then continues to step 614, where it sets the OutboundRoutingProtocol="DIRECT" to indicate that this order should be routed using the direct linkage protocol. The process then terminates in step 616 as indicated.

Returning to step 602, if the process determines that the incoming order's account capacity is not "C," then the process continues to step 618 instead. In step 618, the process checks if the incoming order's account capacity is "MM," indicating an order on behalf of a market maker. If it is, the process continues to step 620, where it checks if this market maker is assigned to this issue. If the market maker is indeed assigned to this issue, then the process continues to step 622, where it sets the OutboundOrderCapacity="P" to indicate that this is a Principal order. The process then continues to step 624, where it sets the OutboundRoutingProtocol="LINKAGE" to indicate that this order should be routed using the intermarket linkage. The process then terminates in step 632 as indicated.

Returning to step 620, if, however, the process determines that this market maker is not assigned to this issue, then the process continues to step 628, where it sets the OutboundOrderCapacity="MM" to indicate that this is a market maker order. The process then continues to step 630, where it sets the OutboundRoutingProtocol="DIRECT" to indicate that this order should be routed using the direct linkage protocol. The process then terminates in step 632 as indicated.

Returning to step 618, if, however, the process determines that the incoming order's account capacity is not "MM," then the process continues to step 634 instead. In step 634, the process checks if the incoming order's account capacity is "BD," indicating an order on behalf of a broker/dealer that is not an assigned market maker. If it is, then the process continues to step 636, where it sets the OutboundOrderCapacity="BD" to indicate that this is a broker/dealer order. The process then continues to step 638, where it sets the OutboundRoutingProtocol="DIRECT" to indicate that this order should be routed using the direct linkage protocol. The process then terminates in step 640 as indicated.

Returning to step 634, if, however, the process determines that the incoming order's account capacity is not "BD," then the process continues to step 642 instead. In step 642, the process checks if the incoming order's account capacity is "F," indicating an order on behalf of a firm. If it is, then the process continues to step 644, where it sets the OutboundOrderCapacity="F" to indicate that this is a firm's order. The process then continues to step 646, where it sets the OutboundRoutingProtocol="DIRECT" to indicate that this order should be routed using the direct linkage protocol. The process then terminates in step 648 as indicated.

Returning to step 642, if, however, the process determines that the incoming order's account capacity is not "F," then the process continues to step 650 instead. If the incoming order's account capacity is not "F," then, in this embodiment, it is a "FARM" order because there are no other account capacities in this embodiment. It should be understood that there may be other account capacities that are not specifically addressed herein, but that would work within the framework of this invention and would be evaluated in the same manner as the account capacities discussed above. In step 650, the process sets the OutboundOrderCapacity="FARM" to indicate that this is an order from a market maker on an away market. The process then continues to step 652, where it sets the OutboundRoutingProtocol="DIRECT" to indicate that this order should be routed using the direct linkage protocol. The process then terminates in step 654 as indicated.

Generate Outbound Routed Buy Order Process

Referring now to FIGS. 7A-7B, a routine wherein the Routing Process constructs the outbound buy order based on the parameters specified in the Routing Table rule for the specific away market is illustrated. The routine also determines whether the routed buy order should decrement the away market's offer size or not after routing.

In step 702, the process retrieves the OutboundOrderCapacity which was derived in previous FIG. 6. In step 704, the process retrieves the "Route Preference Style" parameter on the away market's routing rule. In step 706, if the value of the "Route Preference Style" is "DAY," then the process continues to step 708, where it sets the OutboundBuyOrderTimeInForce="DAY." In step 710, the process retrieves the "Automatic Timeout" parameter on the away market's routing rule. In step 712, the process computes the time that the routed order will expire ("OutboundOrderTimeout") by adding the number of seconds specified in the Automatic Timeout parameter to the current time. In a different embodiment, the process waits until it receives an acknowledgement message from the away market and then computes the OutboundOrderTimeout by adding the number of seconds specified in the Automatic Timeout parameter to the time the order was acknowledged by the away market. Regardless of which method is used, the Routing Process sets an internal timer, and if the order expires without receiving a fill or decline, then the process automatically sends a cancel message to the away market.

Returning to step 706, if, however, the value of the "Route Preference Style" is "IOC," then the process continues to step 714, where it sets the OutboundBuyOrderTimeInForce="IOC" instead. The process then continues to step 716, where it derives the time when the order automatically expires ("OutboundOrderTimeout") by adding n seconds to the current time, where n seconds is the timeout specified by the intermarket linkage rules, e.g., 5 seconds.

Figure 8:
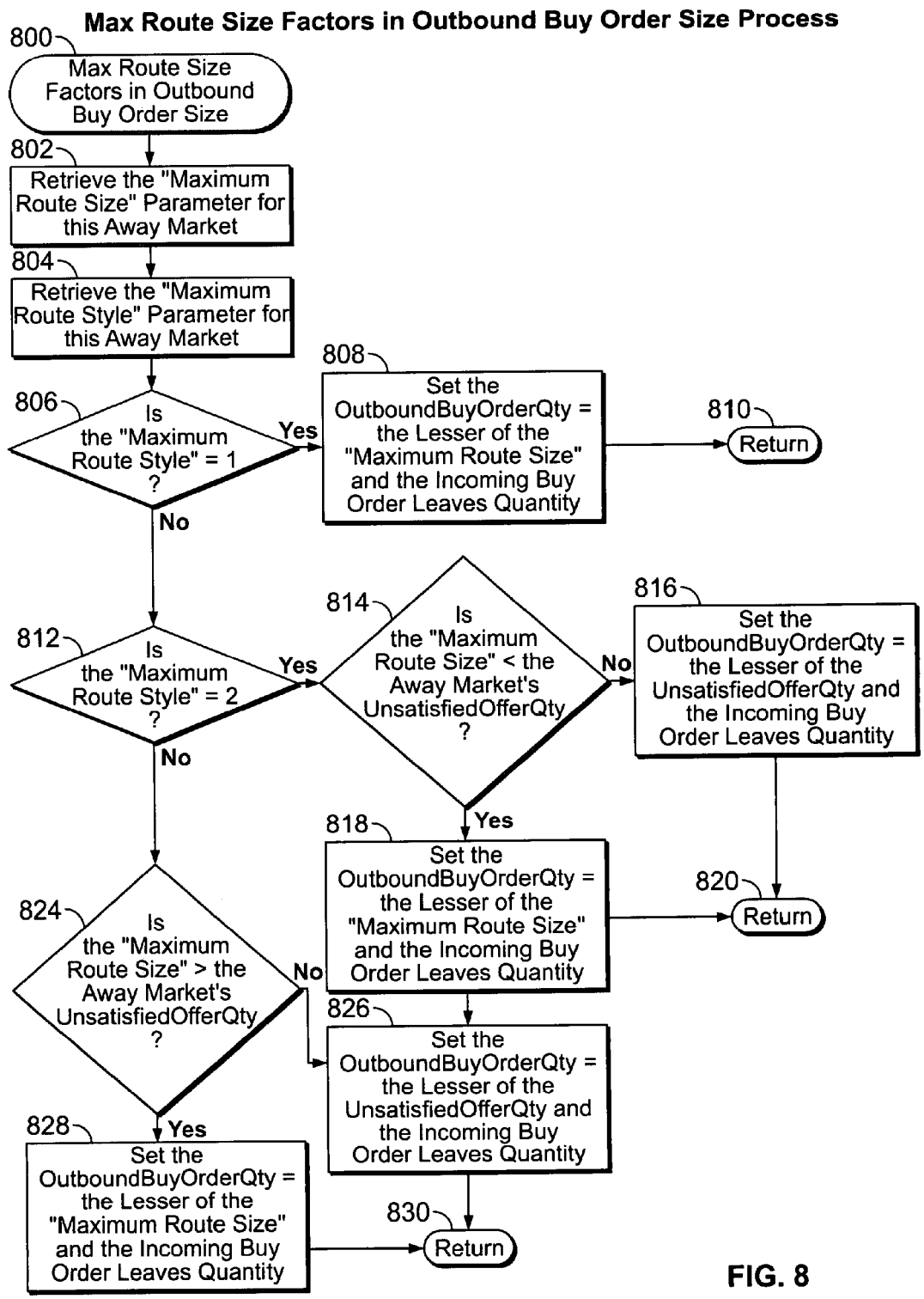
FIG. 8 is a flow diagram illustrating a process for determining the maximum size for an outbound routed buy order.

The process then continues to step 718, where it sets the price of the routed buy order ("OutboundBuyOrderPrice") to the away market's disseminated offer price. In a different embodiment, the process may set the OutboundBuyOrderPrice to the incoming buy order's higher price instead, if the away market executes at its quoted price regardless. By way of explanation, this embodiment may be useful for issues where the quotes move quickly. The process continues to step 720, where it retrieves the "Maximum Route Size" parameter on the away market's routing rule. In step 722, it checks if the value of the "Maximum Route Size" parameter is greater than zero. This parameter is set only if the away market's guaranteed automatic execution size differs from its disseminated quote size, and the market center 20 elects one over the other. If the value is greater than zero, then the process continues to step 724, where it initiates the "Max Route Size Factors in Outbound Buy Order Size Process" and proceeds to step 800 in FIG. 8. The processing steps in FIG. 8 are described in detail below. After the process determines the OutboundBuyOrderQty in FIG. 8, it proceeds to step 742.

Returning to step 722, if, however, the value of the "Maximum Route Size" parameter for this away market is not greater than zero, then the process continues to step 726, where it retrieves the "Oversize Weight" parameter on the away market's routing rule instead.

The process continues to step 728, where it checks if the value of the "Oversize Weight" parameter is greater than zero. This parameter is set only if the market center 20 routes orders in excess of the away market's disseminated quote size. If the value is greater than zero, then the process continues to step 730, where it computes the maximum size that can be routed to this away market ("MaxOutboundBuyOrderQty") by multiplying the away market's disseminated offer size by the value of its "Oversize Weight" parameter. For example, if the Oversize Weight=2, the process can route an order up to twice the size of the quote. It should be noted that the Routing Process is not required to satisfy all disseminated quote sizes at the NBBO first before allocating the remaining quantity among the oversizable routes. Instead, it can immediately route up to the full eligible size, i.e., the disseminated quote size multiplied by the Oversize Weight. However, an away market is eligible to be oversized only if it is currently quoting at the NBBO, even if its Oversize Weight is greater than '1.' In step 732, the process sets the OutboundBuyOrderQty equal to the lesser of the computed MaxOutboundBuyOrderQty and the Leaves quantity of the incoming buy order. After the process determines the OutboundBuyOrderQty, it proceeds to step 742.

Returning to step 728, if, however, the value of the "Oversize Weight" parameter for this away market is not greater than zero, then the process continues to step 734, where it retrieves the "Routing Behavior" parameter on this away market's routing rule. In step 736, the process checks if it should route a buy quantity up to the away market's unsatisfied offer size ("UnsatisfiedOfferQty") or if it should route a buy quantity up to the away market's full disseminated offer size. If the process determines that it should route up to the unsatisfied offer size (according to the exemplary rules for Routing Behavior=1, 2, 3, and 5), then it continues to step 738, where it sets the OutboundBuyOrderQty equal to the lesser of the UnsatisfiedOfferQty and the Leaves quantity of the incoming buy order.

Returning to step 736, if, however, the process determines that it should route up to the full disseminated offer size (according to the exemplary rules for Routing Behavior=4), then it continues to step 740, where it sets the OutboundBuyOrderQty equal to the lesser of the away market's full disseminated offer size and the Leaves quantity of the incoming buy order.

In step 742, the process retrieves the OutboundRoutingProtocol which was derived in FIG. 6. The OutboundRoutingProtocol is either "LINKAGE" or "DIRECT" in these examples. In step 744, the process routes the outbound buy order (which it has generated in the steps above) to the away market using either the intermarket linkage protocol or the direct linkage protocol, as previously determined.

Figure 9:
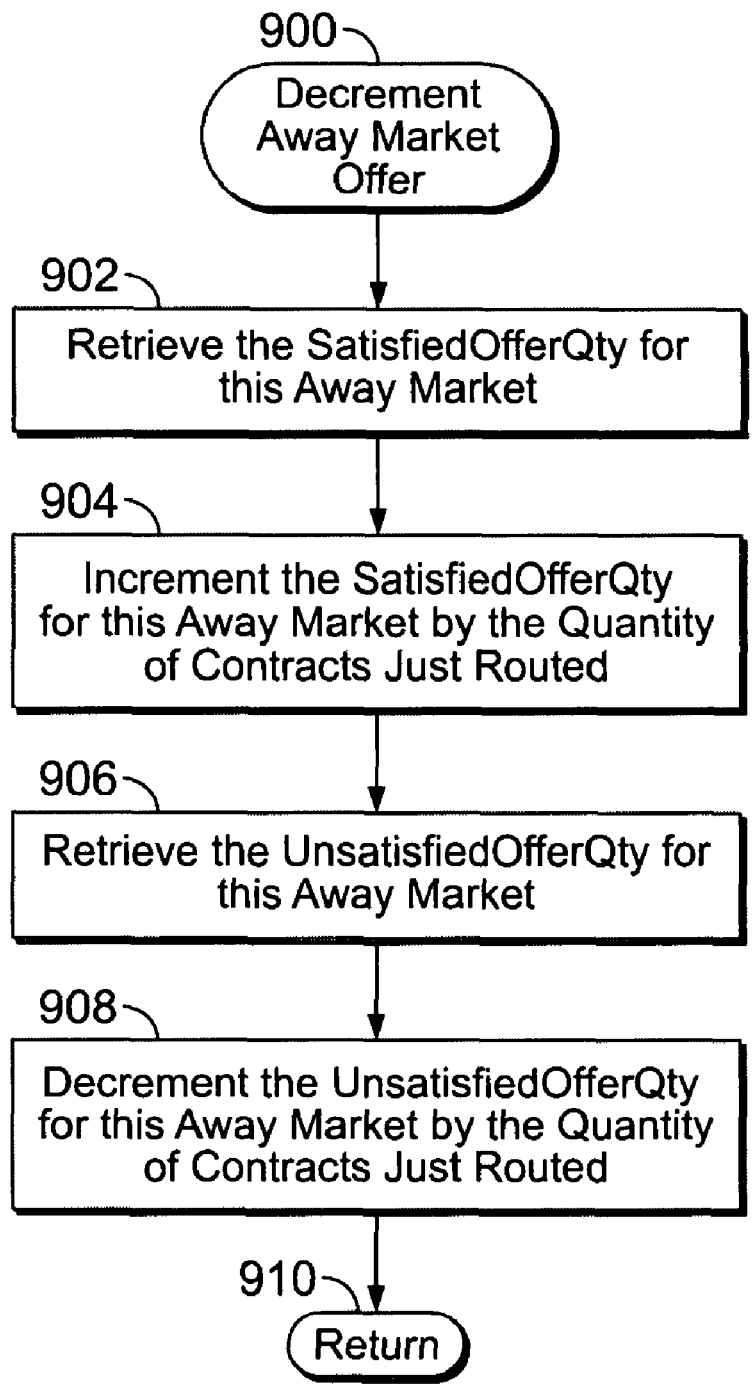
FIG. 9 is a flow diagram illustrating a process for "decrementing" an away market's offer, i.e., reducing the obligation to the quote after a buy order routes to it.

In step 745, the process retrieves the "Routing Behavior" parameter on this away market's routing rule. (The process may already have retrieved this parameter in step 734.) In step 746, the process evaluates whether the outbound routed buy order should decrement the away market's offer size or not. According to the exemplary rules for the "Routing Behavior" parameter, away markets whose Routing Behavior=1, 2, 3, and 5 do indeed have their offers decremented (i.e., the quote size available to subsequent incoming buy orders is decreased by the routed quantity) while away markets whose Routing Behavior=4 do not. If the process determines that the outbound routed buy order should decrement the away market's offer size, then it continues to step 748, where it initiates the "Decrement Away Market Offer Process" and proceeds to step 900 in FIG. 9. The processing steps for FIG. 9 are described in detail below. After the process has partially or fully decremented the away market's offer size in FIG. 9, it continues to step 750.

Returning to step 746, if the process determines that the outbound routed buy order should not decrement the away market's offer size, then it also continues to step 750.

In step 750, the process checks if the incoming buy order still has any quantity remaining to trade after routing. If it does have quantity remaining, then the process continues to step 752, where it returns to the step where the routine was originally invoked. If it does not have any quantity remaining, then the process terminates in step 754 as indicated.

Max Route Size Factors in Outbound Buy Order Size Process

Referring now to FIG. 8, a routine wherein the maximum size of the outbound buy order is calculated is illustrated. The Routing Process retrieves the "Maximum Route Size" parameter and the "Maximum Route Style" parameter from the Routing Table rules for the away market, and uses those rules to calculate the size of the outbound buy order. Depending on the value configured in the "Maximum Route Style", the process determines whether to route up to the value configured in the "Maximum Route Size" or up to the away market's unsatisfied offer size.

In step 802, the process retrieves the "Maximum Route Size" parameter on the away market's routing rule. In step 804, the process retrieves the "Maximum Route Style" parameter on the away market's routing rule.

In step 806, the process checks if the value of the "Maximum Route Style" parameter for the away market is "1." If it is "1," then the process continues to step 808, where it sets the OutboundBuyOrderQty equal to the lesser of the value retrieved in the "Maximum Route Size" parameter and the incoming buy order's Leaves quantity. The process then continues to step 810, where it returns to the step where it was originally invoked, back to step 724 in FIG. 7A.

Returning to step 806, if, however, the value of the "Maximum Route Style" parameter for the away market is not "1," then the process continues to step 812, where it checks if the value of the "Maximum Route Style" parameter for the away market is "2" instead. If it is "2," then the process continues to step 814, where it determines if the value of the "Maximum Route Size" parameter is less than the away market's UnsatisfiedOfferQty. If the value of the "Maximum Route Size" parameter is lower, then the process continues to step 818, where it sets the OutboundBuyOrderQty equal to the lesser of the value retrieved in the "Maximum Route Size" parameter and the incoming buy order's Leaves quantity. The process then continues to step 820, where it returns to the step where it was originally invoked, back to step 724 in FIG. 7A.

Returning to step 814, if, however, the value of the "Maximum Route Size" parameter is greater than or equal to the UnsatisfiedOfferQty, then the process continues to step 816, where it sets the OutboundBuyOrderQty equal to the lesser of the UnsatisfiedOfferQty and the incoming buy order's Leaves quantity. The process then continues to step 820, where it returns to the step where it was originally invoked, back to step 724 in FIG. 7A.

Returning to step 812, if, however, the value of the "Maximum Route Style" parameter for the away market is not "2," then, in this embodiment, the value is "3," because there are no other values for Maximum Route Style in this embodiment. The process then continues to step 824, where it determines if the value of the "Maximum Route Size" parameter is greater than the away market's UnsatisfiedOfferQty. If the value of the "Maximum Route Size" parameter is higher, then the process continues to step 828, where it sets the OutboundBuyOrderQty equal to the lesser of the value retrieved in the "Maximum Route Size" parameter and the incoming buy order's Leaves quantity. The process then continues to step 830, where it returns to the step where it was originally invoked, back to step 724 in FIG. 7A.

Returning to step 824, if, however, the value of the "Maximum Route Size" parameter is less than or equal to the UnsatisfiedOfferQty, then the process continues to step 826, where it sets the OutboundBuyOrderQty equal to the lesser of the UnsatisfiedOfferQty and the incoming buy order's Leaves quantity. The process then continues to step 830, where it returns to the step where it was originally invoked, back to step 724 in FIG. 7A.

Decrement Away Market Offer Process

Referring now to FIG. 9, a routine wherein the Routing Process internally reduces the available quote size for the away market offer is illustrated. When a quantity equal to the total disseminated offer size has been routed to the away market, its offer is considered to be fully satisfied.

In step 902, the process retrieves the SatisfiedOfferQty for the away market, which is a running total of the number of buy contracts that have been routed to the current disseminated Offer, i.e., the cumulative offer size that has been satisfied. In step 904, the process increments the SatisfiedOfferQty by adding the size of the outbound routed buy order, resulting in an updated SatisfiedOfferQty. In step 906, the process retrieves the UnsatisfiedOfferQty for the away market, which is a running total of the number of buy contracts that must still be routed to the current disseminated offer before the offer is completely satisfied. In step 908, the process subtracts the size of the outbound routed buy order from the UnsatisfiedOfferQty, resulting in an updated UnsatisfiedOfferQty. The process continues to step 910, where it returns to the step where the routine was originally invoked, back to step 748 in FIG. 7B.

Excess Marketable Buy Order Quantity Remains Process

Referring now to FIG. 10, a routine wherein the process determines how to proceed next if the incoming marketable buy order still has quantity available to execute after satisfying all eligible away markets at the NBBO is illustrated. Depending on the order type and on the rules that govern the buy order, (e.g., whether it was routed using the intermarket linkage or not), the remaining portion of the incoming buy order may be canceled, posted, queued, or temporarily hidden as a "dark" order.

In step 1002, the process evaluates whether according to the business rules of the market center 20, the excess quantity of the incoming buy order should be canceled. By way of example, any excess quantity of a NOW Order must be canceled by definition. Additionally, in a different embodiment, the market center 20 may choose to cancel the excess quantity of a limit order that cannot lock the market instead of processing it as a "dark" order. If the order should be canceled, then the process cancels the order in step 1004 and terminates in step 1006 as indicated.

Returning to step 1002, if, however, the process determines that the excess quantity of the incoming buy order should not be canceled, then it continues to step 1008, where it checks whether the order is a limit order or a market order. If the incoming buy order is a market order, then the process continues to step 1010, where it prices the market buy order at the NBO. The process then continues to step 1012, where it checks if the market order should be displayed or queued, as the market center 20 may allow different variations of market order behavior. For example, a market order type may be disclosed like a limit order to the marketplace. In contrast, a different market order type may be queued by inserting the order in the internal order book 29a only, without disclosing it to the marketplace.

If in step 1012 the process determines that the incoming market buy order should be queued, then it continues to step 1014, where it queues the incoming market buy order by inserting it in the internal order book 29a in price/time priority (priced at the current NBO) without disclosing it to the marketplace. The process then continues to step 1028, as described below. If, however, the process determines in step 1012 that the incoming market buy order should be displayed instead, then the process continues to step 1020, as described below.

Returning to step 1008, if, however, the process determines that the incoming buy order is a limit order, then the process continues to step 1016, where it checks if the incoming buy order's price is higher than the NBO price. If it is higher, then the process continues to step 1018 where it caps the price at the NBO, and then continues to step 1020. If it is not higher, then the process continues to step 1020. In step 1020, the process checks if the incoming buy order is allowed to lock the NBO. Generally speaking, if the incoming limit buy order has satisfied all away markets offering at the NBO by routing orders using the intermarket linkage, then it is indeed allowed to lock the market. If the incoming buy order is allowed to lock the NBO, then the process continues to step 1022, where it inserts the order in the internal order book 29a according to price/time priority in the Display Order Process, and disseminates the order to the public order book. The process then terminates in step 1024 as indicated.

Returning to step 1020, the process may determine that the incoming buy order is not allowed to lock the NBO. By way of example, in this embodiment, this can occur if the buy order could not be routed using the intermarket linkage protocol. If the incoming buy order cannot lock the NBO, then the process continues to step 1026, where it inserts the incoming buy order in the internal order book 29a according to price/time priority in the Display Order Process, but does not disseminate it to the marketplace. The temporarily nondisclosed order is referred to as a "dark" order. Although the "dark" buy order is not displayed to the marketplace at the present time, it is nevertheless eligible to execute with incoming sell orders or market maker offers whose prices are equal or lower to that of the "dark" buy order, as indicated in step 1028.

Figure 12A:
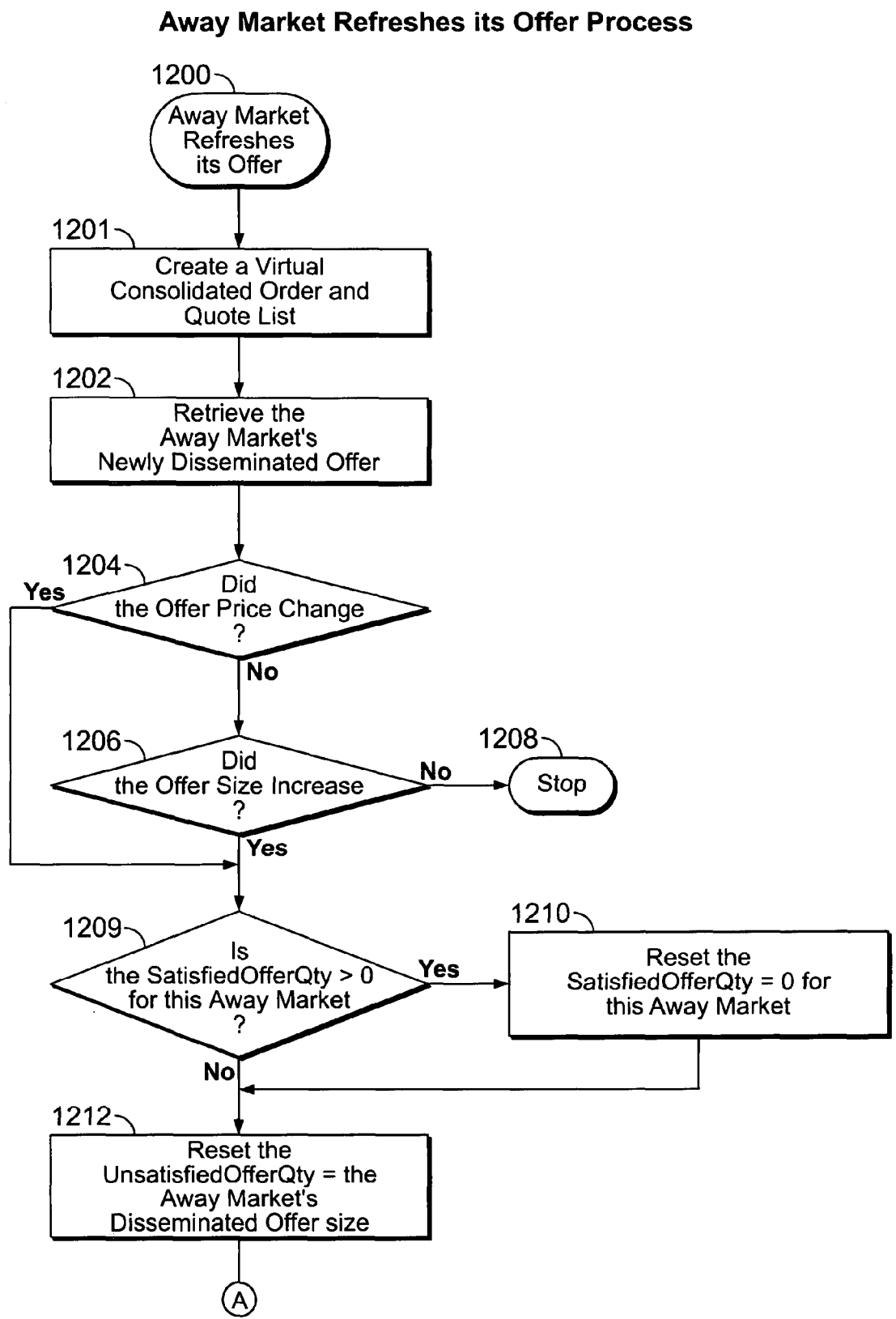
FIGS. 12A-12B are flow diagrams illustrating a process for responding to a newly-disseminated away market offer by determining if resting buy orders should route to it or not.
Figure 12B:
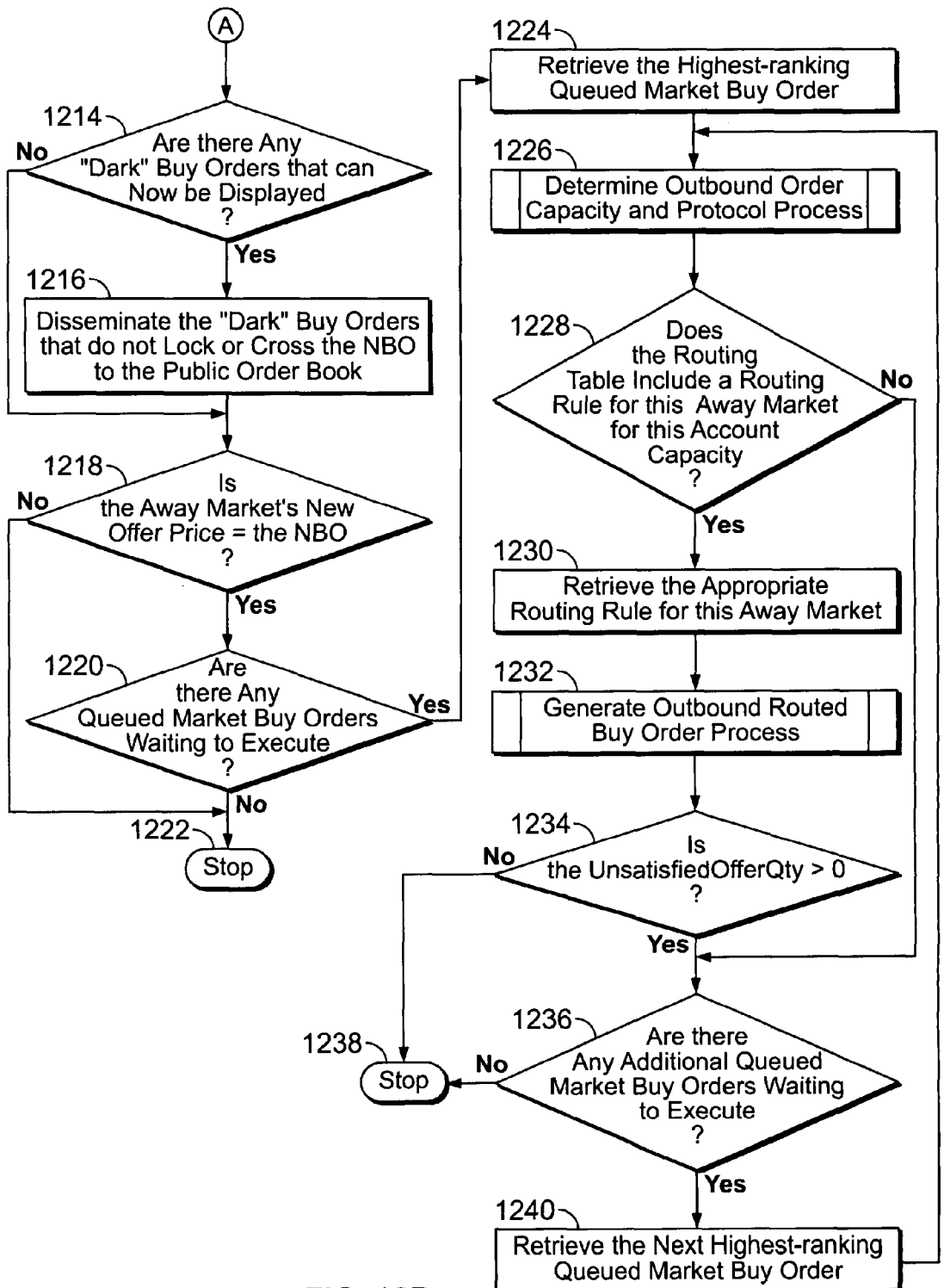

The buy order remains "dark" only while its price would cause the NBO to be locked if it were posted. If the NBO price changes, then in step 1030, the process initiates the "Away Market Refreshes its Offer Process" and proceeds to step 1200 in FIG. 12A, where the "dark" buy order may be displayed to the marketplace if it no longer locks the NBO. FIGS. 12A-12B are described in detail below. The process then terminates in step 1032 as indicated.

Away Market Fills or Declines Routed Buy Order Process

Figure 11:
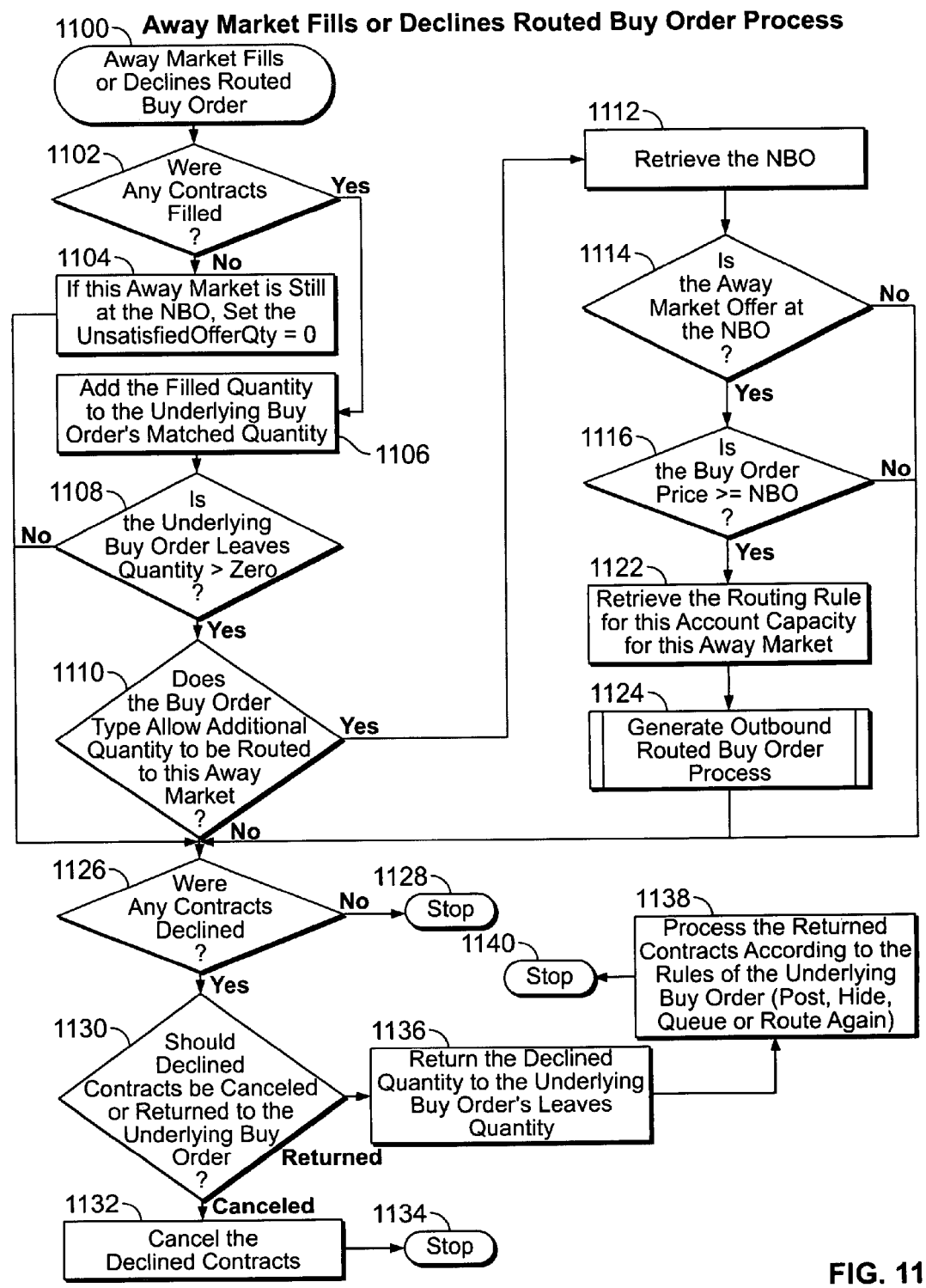
FIG. 11 is a flow diagram illustrating a process for receiving fills or declines for routed buy orders, and determining if the underlying buy order should route again.

Referring now to FIG. 11, a routine wherein the process receives a message from an away market indicating that it has filled or declined a routed buy order is illustrated. If a fill is received and the underlying buy order still has quantity available to trade, the process determines whether it should route additional quantity or not depending on the rules for the underlying order type. If any portion of the routed order is declined by the away market, the declined quantity is either canceled, posted, made "dark", or else routed again, depending on the rules for the underlying order.

When the order matching engine 21 receives a fill or decline message for a routed buy order, it initiates the "Away Market Fills or Declines Routed Buy Order Process" in step 1100. In step 1102, the process checks if the away market filled any part of the routed buy order. If it did, then in step 1106, it adds the filled quantity to the underlying buy order's cumulative matched quantity. In step 1108, the process checks if the underlying buy order still has quantity available to trade. If it does not have any more contracts available, then the process proceeds to step 1126.

Returning to step 1102, if, however, the away market did not fill any part of the routed buy order, then the process sets its UnsatisfiedOfferQty equal to zero to prevent any subsequent buy orders from routing to this away market until it moves its Offer. The process then proceeds to step 1126.

Returning to step 1108, if, however, the underlying buy order does still have quantity available to trade, then the process continues to step 1110, where it checks if fills for the underlying buy order type allow additional quantities to be routed or not. If the market center 20 receives a fill on behalf of an order type that does not route to the same disseminated quote again, then it proceeds to step 1126. If, however, the fill is on behalf of an order type that does continue to route to the same disseminated quote (e.g., a queued market order, or a reprice-and-ship inside limit order), then the process continues to step 1112, where it retrieves the NBO.

In step 1114, the process checks if the away market's offer is still at the NBO. If it is not still at the NBO, then the underlying buy order cannot route to it, and the process proceeds to step 1126. If, however, the away market's offer is still at the NBO, then the process continues to step 1116, where it checks if the underlying buy order's price is still marketable. If the underlying buy order is no longer marketable, i.e., its price is less than the NBO, then the process proceeds to step 1126.

Returning to step 1116, if, however, the underlying buy order is still marketable, then it is eligible to route again to the same away market that filled it. In step 1122, the process retrieves the Routing Table rule for this away market for the account capacity and routing protocol applicable to the underlying buy order. By way of explanation, the process already knows that such a routing rule exists because it previously routed part of this underlying buy order to this away market. In step 1124, the process initiates the "Generate Outbound Routed Buy Order Process" and proceeds to step 700 in FIG. 7A. The processing steps for FIGS. 7A-7B were described in detail above. After the process finishes generating another outbound buy order and routing it to the away market, the process continues to step 1126.

In step 1126, the process checks if the away market declined any portion of the routed buy order. If it did not, then the process terminates in step 1128 as indicated. If, however, the away market did decline all or part of the routed buy order, then in step 1130, the process checks whether it should cancel the declined quantity or else return the declined quantity to the underlying buy order.

If the business rules for the market center 20 determine that the declined quantity should be canceled, then the process cancels the declined contracts in step 1132 and terminates in step 1134. If, however, the business rules for the market center 20 determine that the declined quantity should be reinstated instead, then the process continues to step 1136, where it returns the declined contracts to the underlying buy order. The process then continues to step 1138, where the returned contracts may be posted, hidden, or may route to a different away market at the NBO, depending on the rules for the underlying buy order type and the market prices in effect at the time the contracts are declined. The process then terminates in step 1140 as indicated.

Away Market Refreshes its Offer Process

Referring now to FIGS. 12A-12B, a routine wherein the Routing Process 21c, having been notified by the quote engine 23a that an away market at the NBO has updated its quote, receives the newly-disseminated offer from an away market and determines what actions to take is illustrated. As previously described, once the obligation to an away market's specific offer quotation is satisfied, the market center 20 is not required to route additional contracts to it. However, if the away market changes its offer price or increases its offer size, then the obligation to the new quote begins again. The process resets the "Satisfied Offer Quantity" to zero, making the offer eligible to receive routed orders again. Based on the new offer, the process also checks if any "dark" buy orders can now be displayed publicly. If the new offer is at the NBO, the process also checks if there are any queued market buy orders that can route to the new offer. The market center 20 may also elect to reprice and route displayed market buy orders to the new offer.

When the quote engine 23a detects the new disseminated offer, it notifies the order matching engine 21, which initiates the "Away Market Refreshes its Offer Process" in step 1200 of FIG. 12A. In step 1201, the process combines the away market BBO book 25a, the market maker quote book 33a, and the internal order book 29a together in a virtual consolidated order and quote list, which it ranks in price/display/time priority but with a preference for resident interest over away market interest at the same price level. In step 1202, the process retrieves the away market's newly-disseminated Offer. In step 1204, it checks if the offer price has changed from this away market's previous offer price. If the price has not changed, then the process continues to step 1206, where it checks if the offer size has increased from this away market's previous offer size. If it did not increase, then the process terminates in step 1208 as indicated because no action is required when an away market decreases its existing offer.

Returning to step 1204, if, however, the offer price has indeed changed, then the process continues to step 1209. In step 1209, the process checks if the SatisfiedOfferQty is greater than zero for this away market, i.e., if previous routed buy orders have already partially or fully satisfied this away market's offer. If the offer is at least partly satisfied, i.e., if the SatisfiedOfferQty is greater than zero, then in step 1210, the process resets the SatisfiedOfferQty to zero again. This indicates that the away market's newly disseminated offer has not been satisfied at all, and the away market is once again eligible to receive routed orders up to its quote size. The process continues to step 1212, where it resets the UnsatisfiedOfferQty for the away market equal to its full disseminated offer size.

Returning to step 1206, if, however, the offer size for this away market has indeed increased from its previous offer size, then the process also continues to step 1209, as an increased disseminated size reinstates a quote in the same manner as a new disseminated price does. The process executes steps 1209, 1210, and 1212 as described above.

The process continues to step 1214, where it checks if there are any "dark" buy orders that are resting in the internal order book 29*a* that can now be displayed to the marketplace. If the away market faded its offer off the NBO and the NBO price no longer locks one or more "dark" buy orders, then the process discloses those "dark" buy orders in step 1216, and continues to step 1218. Returning to step 1214, the process also continues to step 1218 if no "dark" buy orders presently exist.

In step 1218, the process checks if the away market's newly-disseminated offer price is at the NBO. Just as a market buy order can execute with an incoming sell order, it may also be eligible to route to an away market that presents at the NBO—either because its new price places it at the NBO, or because its increased size while already at the NBO makes it eligible to receive additional routed quantity. If the new offer price is inferior to the NBO, then the process terminates in step 1222 as indicated.

Returning to step 1218, if, however, the away market is at the NBO, then the process continues to step 1220, where it checks if there are any queued market buy orders, as they may be eligible for routing to the away market. If there are no queued market buy orders, then the process terminates in step 1222 as indicated. If, however, there are queued market buy orders, then the process continues to step 1224, where it retrieves the highest-ranking market buy order. The process continues to step 1226, where it initiates the "Determine Outbound Order Capacity and Protocol Process" and proceeds to step 600 in FIG. 6. FIG. 6 was described in detail above.

After determining the appropriate account capacity and routing protocol in FIG. 6, the process determines if there is a routing rule for this away market for this account capacity and routing protocol in step 1228. If the process determines that the away market does indeed have a routing rule that accommodates the account capacity and routing protocol derived in FIG. 6, then the process continues to step 1230, where it retrieves the routing rule for the away market. In step 1232, the process initiates the "Generate Outbound Routed Buy Order Process" and proceeds to step 700 in FIG. 7A. The processing for FIGS. 7A-7B have been described in detail above. After the process finishes constructing an outbound buy order and routing it to the away market's newly-disseminated offer, in step 1234, the process checks if the away market's offer has been fully satisfied, i.e., if its UnsatisfiedOfferQty is greater than zero. If its UnsatisfiedOfferQty is equal to zero, then it is completely satisfied, and the process terminates in step 1238 as indicated.

Returning to step 1234, if, however, the away market's UnsatisfiedOfferQty is greater than zero, then its offer is not fully satisfied, and additional market buy orders may be eligible to route. The process continues to step 1236, where it checks if there are additional queued market buy orders. If there are, then the process continues to step 1240, where it retrieves the next highest-ranking market buy order, and returns to step 1226, where it repeats the procedures described above for determining if the away market can accept an order routed on behalf of this next-best market buy order. The steps are repeated until the process determines that the newly-disseminated away market offer is satisfied, or until there are no additional queued market buy orders. The process then terminates in step 1238 as indicated.

Returning to step 1228, if no routing rule exists for this away market for this account capacity, then the retrieved market buy order cannot route to this away market, and the process proceeds to step 1236 where it checks if there are any other queued market buy orders that may be eligible to route, as described above. If there are, then the process continues to step 1240, where it retrieves the next highest-ranking market buy order, and returns to step 1226, where it repeats the procedures described above for determining if the away market can accept an order routed on behalf of this next-best market buy order. The steps are repeated until at step 1236, the process determines there are no more market buy orders, and terminates in step 1238 instead.

Incoming Sell Order is Received Process

Figure 13:
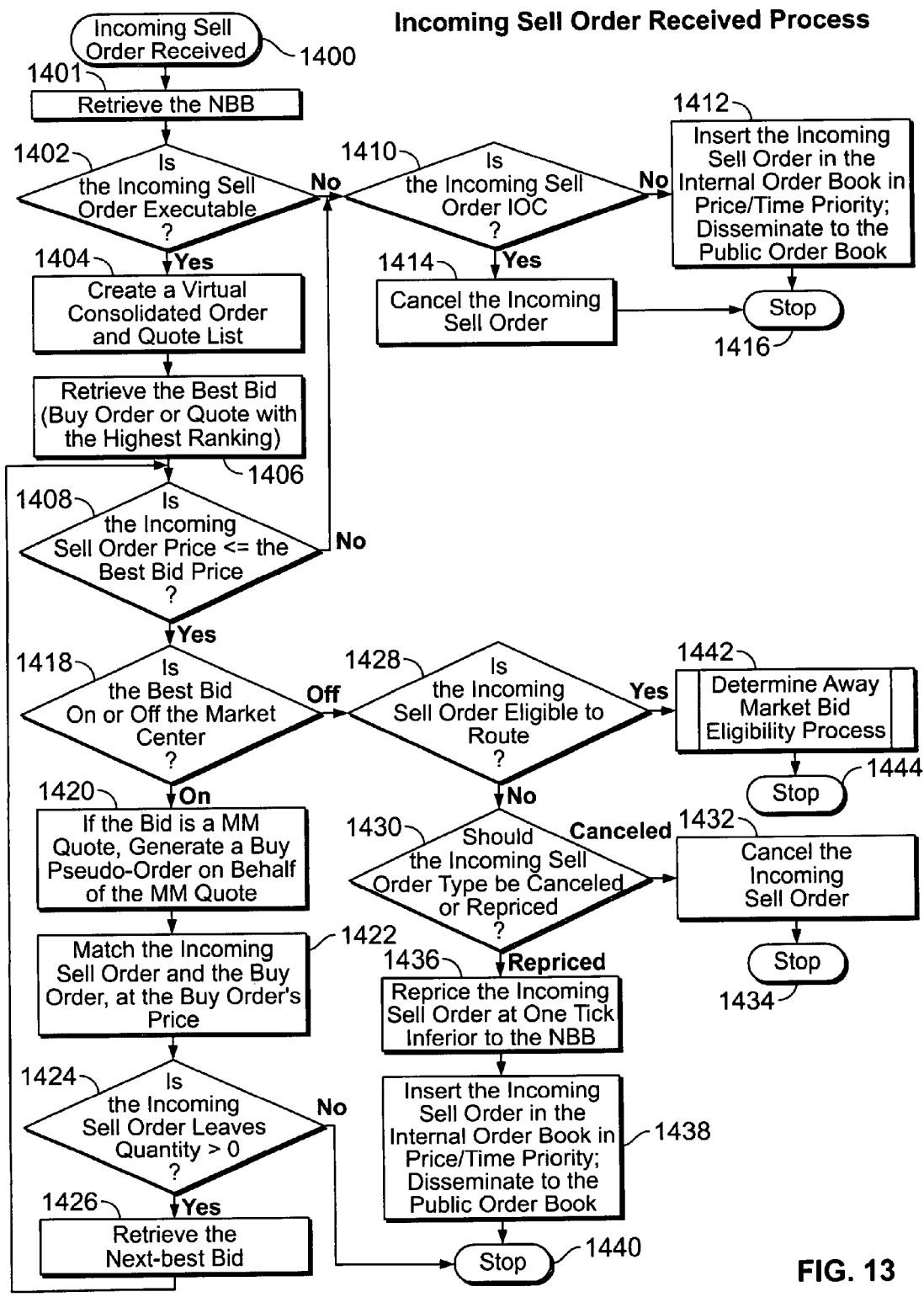
FIG. 13 is a flow diagram illustrating a process for determining if an incoming sell order should post, execute, cancel, or route.

Referring now to FIG. 13, a routine wherein the order matching engine 21 receives an incoming sell order is illustrated. The routine is very similar to the processing described in FIG. 4 above for receiving an incoming buy order.

In step 1400, the process receives the incoming sell order. In step 1401, it retrieves the NBB. In step 1402, the process checks if the incoming sell order is executable. If the incoming sell order is not executable, then the process continues to step 1410, where it checks if the incoming sell order is IOC or not. If the incoming sell order is IOC, then the process continues to step 1414, where it cancels the order and terminates in step 1416 as indicated. If, however, the incoming sell order is not IOC, then the process continues to step 1412, where it posts the incoming sell order to the internal order book 29*a* in price/time priority and disseminates it to the public order book. The process then terminates in step 1416 as indicated.

Returning to step 1402, if, however, the incoming sell order is indeed executable, then the process continues to step 1404. In step 1404, the process combines the away market BBO book 25*a*, the market maker quote book 33*a*, and the internal order book 29*a* together in a virtual consolidated order and quote list, which it ranks in price/display/time priority but with a preference for resident interest over away market interest at the same price level. In step 1406, it retrieves the best bid in the virtual consolidated order and quote list.

In step 1408, the process compares the price of the incoming sell order to the retrieved best bid. If the incoming sell order's price is less than or equal to the retrieved best bid, then the process continues to step 1418, where it checks if the best bid is on or off the market center 20. If the best bid is on the market center 20 (i.e., if it is a buy order or market maker quote), then the process continues to step 1420, where if the best bid is a market maker quote, it automatically generates an IOC buy pseudo-order on behalf of the quote. The process then continues to step 1422, where it matches the incoming sell order and the buy order or pseudo-order, at the buy order's price.

In step 1424, the process checks if the incoming sell order's Leaves quantity is greater than zero. If it is not, then the process terminates in step 1440 as indicated. If, however, the incoming sell order still has quantity available to trade, then the process continues to step 1426, where it retrieves the next best bid in the virtual consolidated order and quote list. The process then returns to step 1408, where it checks if the incoming sell order's price is still less than or equal to the next best bid. If the incoming sell order's price is still less than or equal to the best bid, then the order is still executable, and the process continues to step 1418. If, however, the incoming sell order's price is no longer less than or equal to the best bid, then the order is no longer executable, and the process continues to step 1410 instead.

Returning to step 1418, if, however, the best bid is off the market center 20, i.e., is an away market quote, then the incoming sell order cannot execute on the market center 20. The process continues to step 1428, where it checks if the incoming sell order type is eligible to route. If the incoming sell order is not eligible to route, then the process continues to step 1430, where it determines whether the incoming sell order should be canceled or repriced according to the business rules of the market center 20, as it is not permitted to lock the market. If the order should be canceled, then the process continues to step 1432, where it cancels the incoming sell order and then terminates in step 1434. If, however, the order should be repriced instead, then the process continues to step 1436, where it reprices the incoming sell order at one tick inferior to the NBB and continues to step 1438, where it inserts the repriced sell order in the internal order book 29a and disseminates it to the public order book. The process then terminates in step 1440 as indicated.

Returning to step 1428, if, however, the incoming sell order is eligible to route off the market center 20, then the process continues to step 1442, where it initiates the "Determine Away Market Bid Eligibility Process" and proceeds to step 1500 in FIG. 14, as described next.

Determine Away Market Bid Eligibility Process

Figure 14:
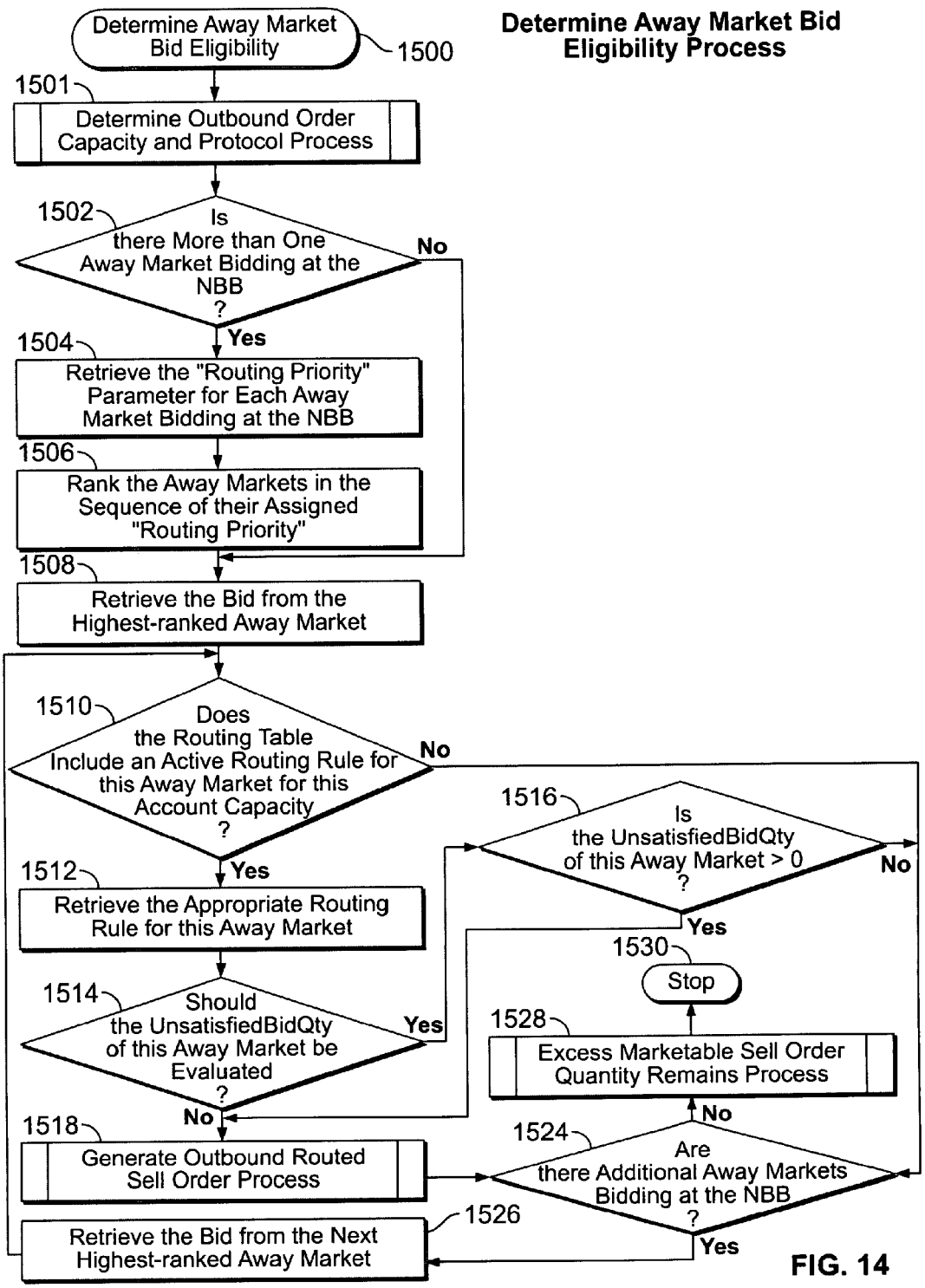
FIG. 14 is a flow diagram illustrating a process for determining if an away market bid is eligible to receive an outbound routed sell order.

Referring now to FIG. 14, a routine wherein the Routing Process determines if an incoming sell order can route to one or more away markets bidding at the NBB is illustrated. The routine is very similar to the processing described above in FIG. 5 for determining if an incoming buy order can route to one or more away markets bidding at the NBO.

As with the embodiment of the process illustrated in FIG. 5, in this embodiment in the process depicted in FIG. 14, the process only routes to away markets bidding at the NBB. It should be understood, however, that in other embodiments where intermarket sweeping is allowed that the routing in FIG. 14 would not be capped at the NBB, and the away market bids at each successive price level inferior to the NBB would generally be ranked and evaluated in the same manner as described herein for away market bids at the NBB.

In step 1501, the process initiates the "Determine Outbound Order Capacity and Protocol Process" and proceeds to step 600 in FIG. 6. FIG. 6 was described in detail above.

After the process determines the appropriate account capacity and routing protocol in FIG. 6, it proceeds to step 1502, where it checks if there is more than one away market bidding at the NBB. If there is, then the process continues to step 1504, where it retrieves the "Routing Priority" assigned to each away market. The "Routing Priority" parameter is configured in the Routing Table rules for each away market. In step 1506, the process ranks the away markets according to their assigned numerical Routing Priority, i.e., the market center with the highest assigned number is ranked first, the market center with the second-highest assigned number is ranked second, and so forth.

In step 1508, the process retrieves the bid from the highest-ranked away market. Returning to step 1502, if there is only one away market at the NBB, then it is automatically the highest-ranked away market, and its bid is retrieved in step 1508. In step 1510, the process reads the Routing Table to determine if an active routing rule exists for this away market for this account capacity and routing protocol. If the process locates an active routing rule for this away market for this account capacity and routing protocol, then it continues to step 1512. If, however, no such rule exists, then the Routing Process cannot route this incoming sell order to this away market, and the process continues to step 1524, where it checks if there are any additional away markets at the NBB, as those markets may have active routing rules for this account capacity and routing protocol.

In step 1512, the process retrieves the appropriate routing rule for this away market from the Routing Table. In step 1514, the process checks if it should evaluate whether this away market's bid is fully satisfied or not. By way of explanation, away markets sometimes receive routed orders only if their quotes are not fully satisfied, while in other circumstances they continue to receive routed orders regardless of whether prior orders are already in flight or not. The value of the "Routing Behavior" on the retrieved routing rule determines whether the check is applicable or not.

If at step 1514 the process determines that the check is applicable, then the process continues to step 1516, where it checks if the away market's bid is fully satisfied. If the away market is fully satisfied, i.e., its UnsatisfiedBidQty is equal to zero, then the process continues to step 1524, where it checks if there are any additional away markets at the NBB. If, however, the away market's bid is not fully satisfied, i.e., its UnsatisfiedBidQty is greater than zero, then the process continues to step 1518 instead. Returning to step 1514, if the process determines that it should not check if the away market has been satisfied or not, then it also continues to step 1518.

Figure 15A:
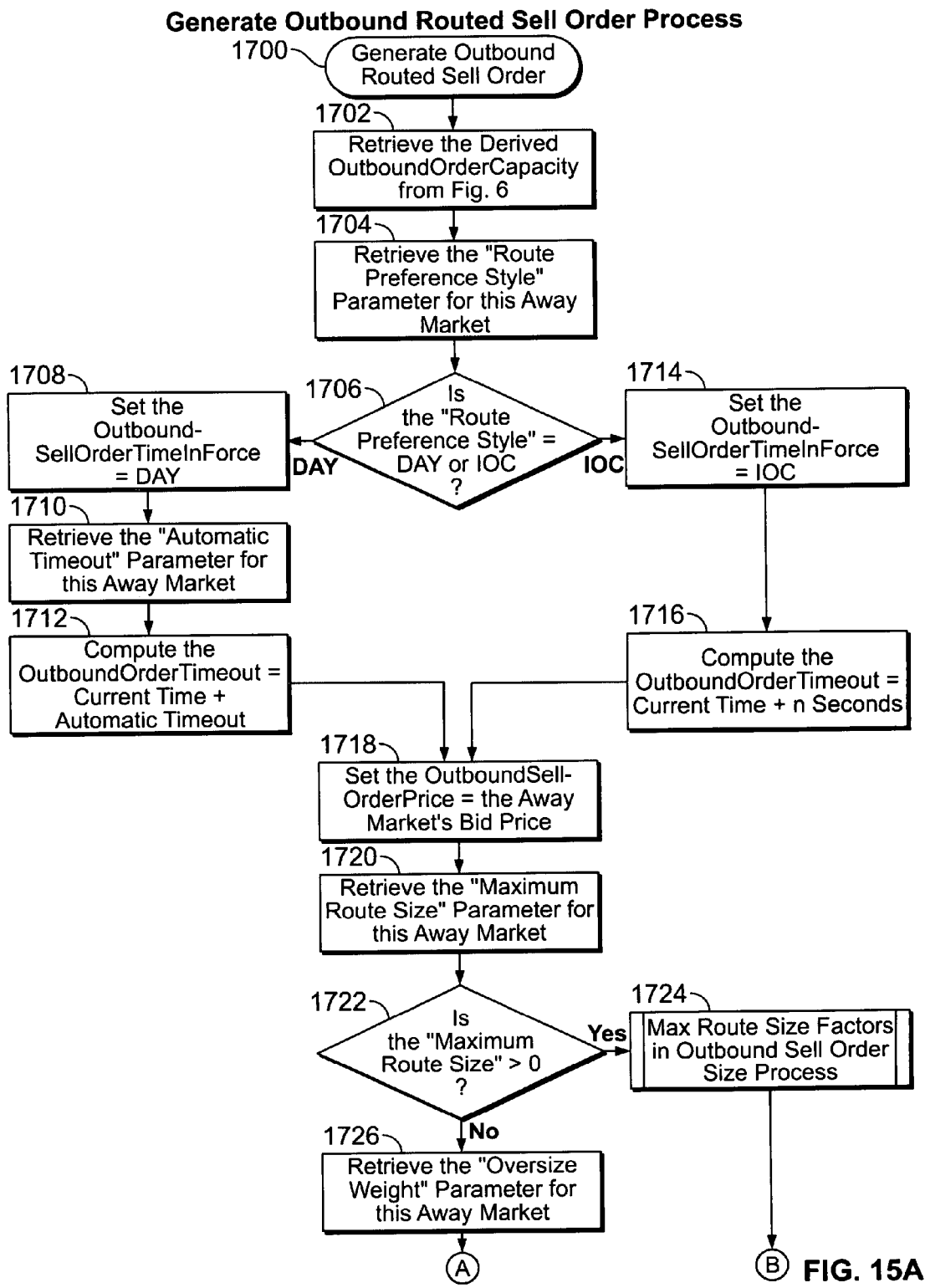
FIGS. 15A-15B are flow diagrams illustrating a process that generates an outbound routed sell order.
Figure 15B:
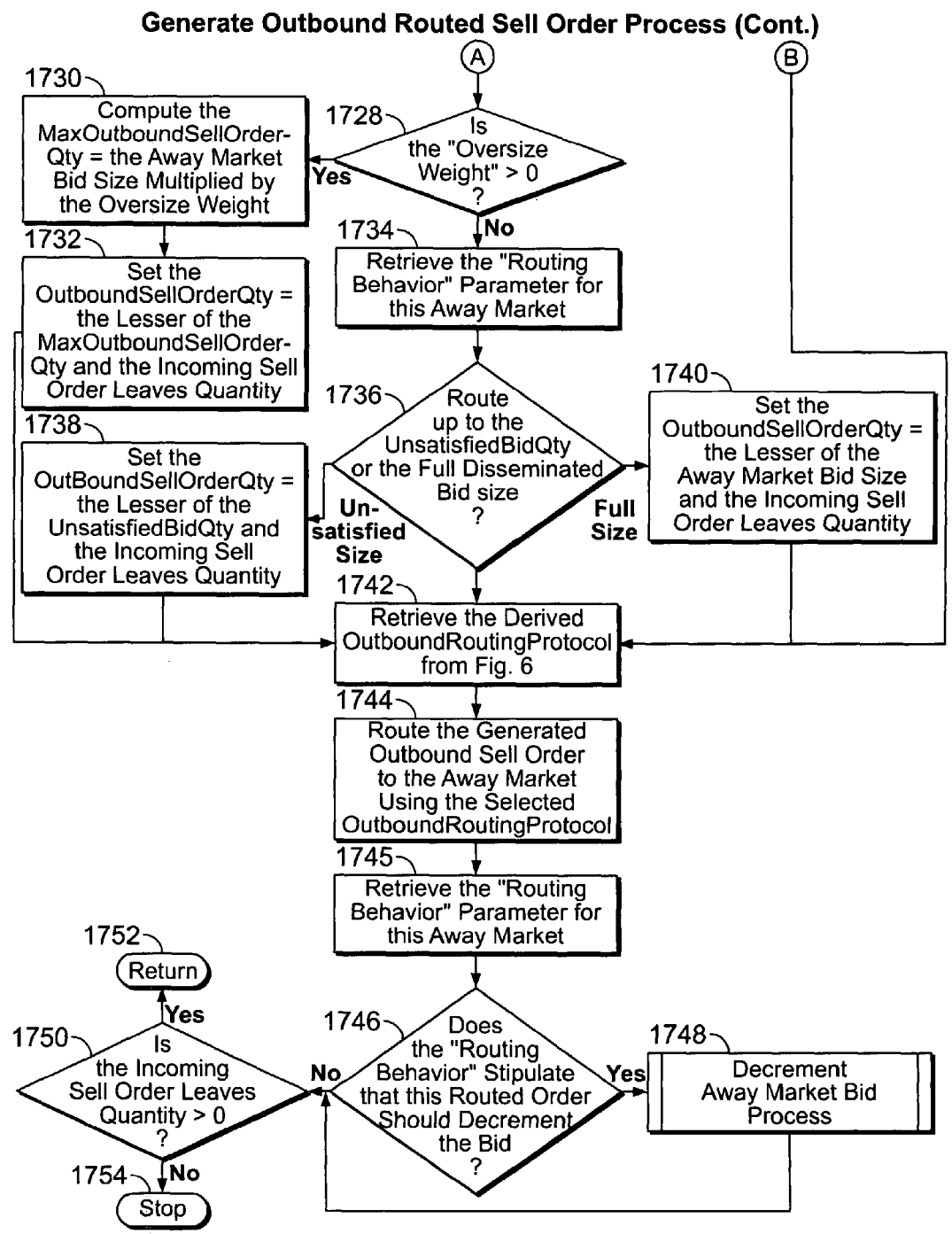

In step 1518, the process initiates the "Generate Outbound Routed Sell Order Process" and proceeds to step 1700 in FIG. 15A. This procedure constructs the outbound sell order and routes it to the away market. FIGS. 15A-15B are described in detail below.

After the process has generated and routed the outbound sell order in FIGS. 15A-15B, it proceeds to step 1524, where it checks if there are additional away markets at the NBB, as it may be able to route to those markets as well. If there are additional markets, then the process continues to step 1526, where it retrieves the bid from the next-highest ranking away market at the NBB (i.e., the away market with the next-highest numerical "Routing Priority") and returns to step 1510, where it repeats the steps involved in determining if this next-best away market is eligible to receive a routed sell order. The process continues until all eligible away markets at the NBB have been satisfied, or else the incoming sell order is depleted.

Figure 18:
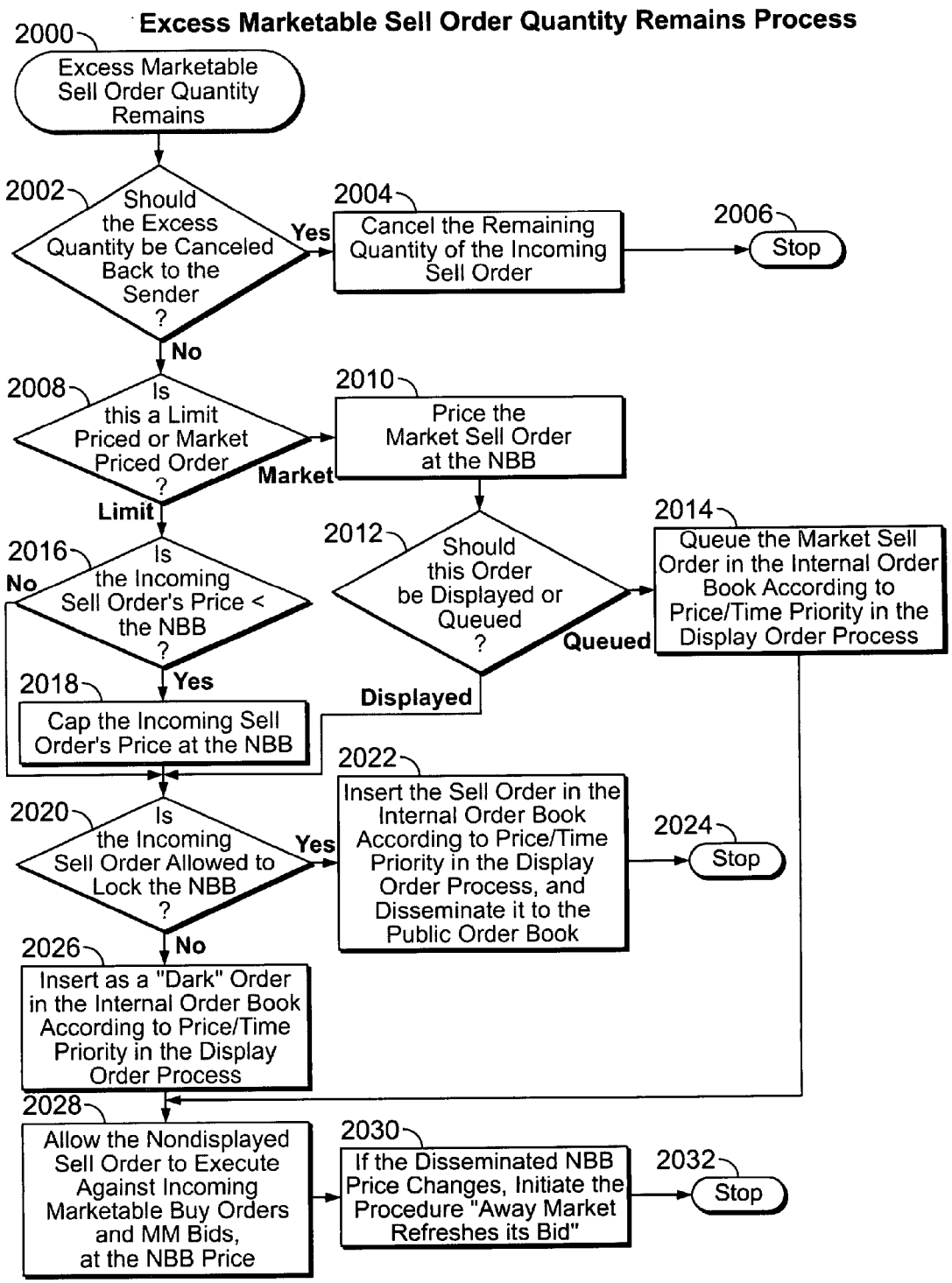
FIG. 18 is a flow diagram illustrating a process for determining whether the excess quantity of an incoming sell order should be canceled, posted, or go "dark" after all obligations to the NBB have been satisfied.

Returning to step 1524, if there are no additional away markets at the NBB and the incoming sell order still has quantity available to trade, then the process continues to step 1528, where it initiates the "Excess Marketable Sell Order Quantity Remains Process" and proceeds to step 2000 in FIG. 18. This procedure determines what to do with the remaining marketable portion of the incoming sell order after it has routed to all eligible away markets at the NBB. FIG. 18 is described in detail below.

Generate Outbound Routed Sell Order Process

Referring now to FIGS. 15A-15B, a routine wherein the Routing Process constructs the outbound sell order based on the parameters specified in the Routing Table rule for the away market is illustrated. This routine is very similar to the processing described in FIGS. 7A-7B above for constructing the outbound buy order.

In step 1702, the process retrieves the OutboundOrderCapacity which was derived in previous FIG. 6. In step 1704, the process retrieves the "Route Preference Style" parameter on the away market's routing rule. In step 1706, if the value of the "Route Preference Style" is "DAY," then the process continues to step 1708, where it sets the OutboundSellOrderTimeInForce="DAY." In step 1710, the process retrieves the "Automatic Timeout" parameter on the away market's routing rule. In step 1712, the process computes the time that the routed order will expire ("OutboundOrderTimeout") by adding the number of seconds specified in the Automatic Timeout parameter to the current time.

Returning to step 1706, if, however, the value of the "Route Preference Style" is "IOC," then the process continues to step 1714, where it sets the OutboundSellOrderTimeInForce="IOC" instead. The process then continues to step 1716, where it derives the time when the order automatically expires ("OutboundOrderTimeout") by adding n seconds to the current time, where n seconds is the timeout specified by the intermarket linkage rules, e.g., 5 seconds.

The process then continues to step 1718, where it sets the price of the routed sell order ("OutboundSellOrderPrice") to the away market's disseminated bid price.

Figure 16:
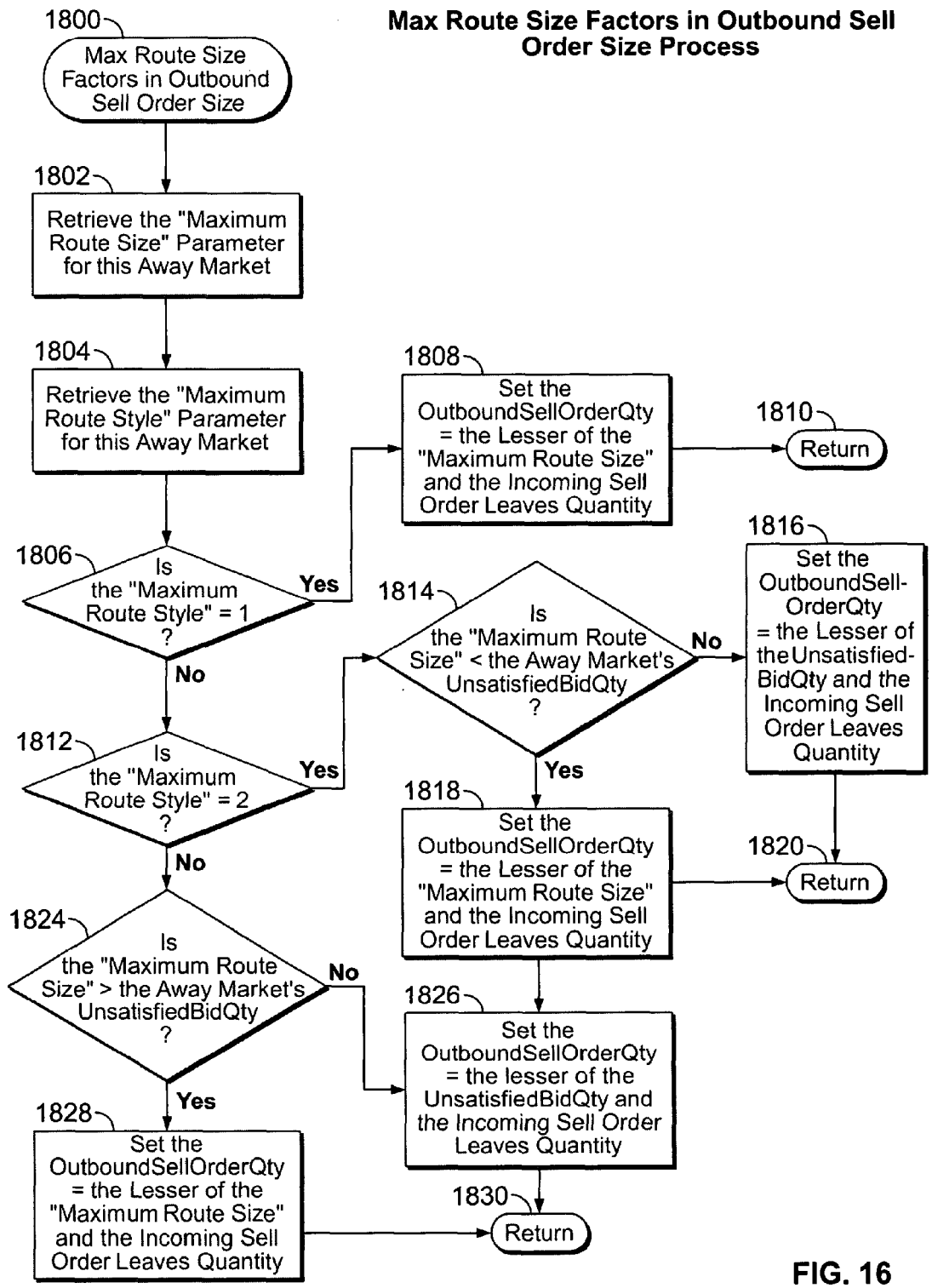
FIG. 16 is a flow diagram illustrating a process for determining the maximum size for an outbound routed sell order.

The process continues to step 1720, where it retrieves the "Maximum Route Size" parameter on the away market's routing rule. In step 1722, it checks if the value of the "Maximum Route Size" parameter is greater than zero. This parameter is set only if the away market's guaranteed automatic execution size differs from its disseminated quote size, and the market center 20 elects one over the other. If the value is greater than zero, then the process continues to step 1724, where it initiates the "Max Route Size Factors in Outbound Sell Order Size" and proceeds to step 1800 in FIG. 16. The processing steps in FIG. 16 are described in detail below. After the process determines the OutboundSellOrderQty in FIG. 16, it proceeds to step 1742.

Returning to step 1722, if, however, the value of the "Maximum Route Size" parameter for this away market is not greater than zero, then the process continues to step 1726, where it retrieves the "Oversize Weight" parameter on the away market's routing rule instead.

The process continues to step 1728, where it checks if the value of the "Oversize Weight" parameter is greater than zero. This parameter is set only if the market center 20 routes orders in excess of the away market's disseminated quote size. If the value is greater than zero, then the process continues to step 1730, where it computes the maximum size that can be routed to this away market ("MaxOutboundSellOrderQty") by multiplying the away market's disseminated bid size by the value of its "Oversize Weight" parameter. For example, if the Oversize Weight=2, the process can route an order up to twice the size of the quote. In step 1732, the process sets the OutboundSellOrderQty equal to the lesser of the computed MaxOutboundSellOrderQty and the Leaves quantity of the incoming sell order. After the process determines the OutboundSellOrderQty, it proceeds to step 1742.

Returning to step 1728, if, however, the value of the "Oversize Weight" parameter for this away market is not greater than zero, then the process continues to step 1734, where it retrieves the "Routing Behavior" parameter on this away market's routing rule. In step 1736, the process checks if it should route a sell quantity up to the away market's unsatisfied bid size ("UnsatisfiedBidQty") or if it should route a sell quantity up to the away market's full disseminated bid size. If the process determines that it should route up to the unsatisfied bid size (according to the exemplary rules for Routing Behavior=1, 2, 3, and 5), then it continues to step 1738, where it sets the OutboundSellOrderQty equal to the lesser of the UnsatisfiedBidQty and the Leaves quantity of the incoming sell order.

Returning to step 1736, if, however, the process determines that it should route up to the full disseminated bid size (according to the exemplary rules for Routing Behavior=4), then it continues to step 1740, where it sets the OutboundSellOrderQty equal to the lesser of the away market's full disseminated bid size and the Leaves quantity of the incoming sell order.

In step 1742, the process retrieves the OutboundRoutingProtocol which was derived in FIG. 6, which is either "LINKAGE" or "DIRECT." In step 1744, the process routes the outbound sell order (which it has generated in the steps above) to the away market using either the intermarket linkage protocol or the direct linkage protocol as previously determined.

Figure 17:
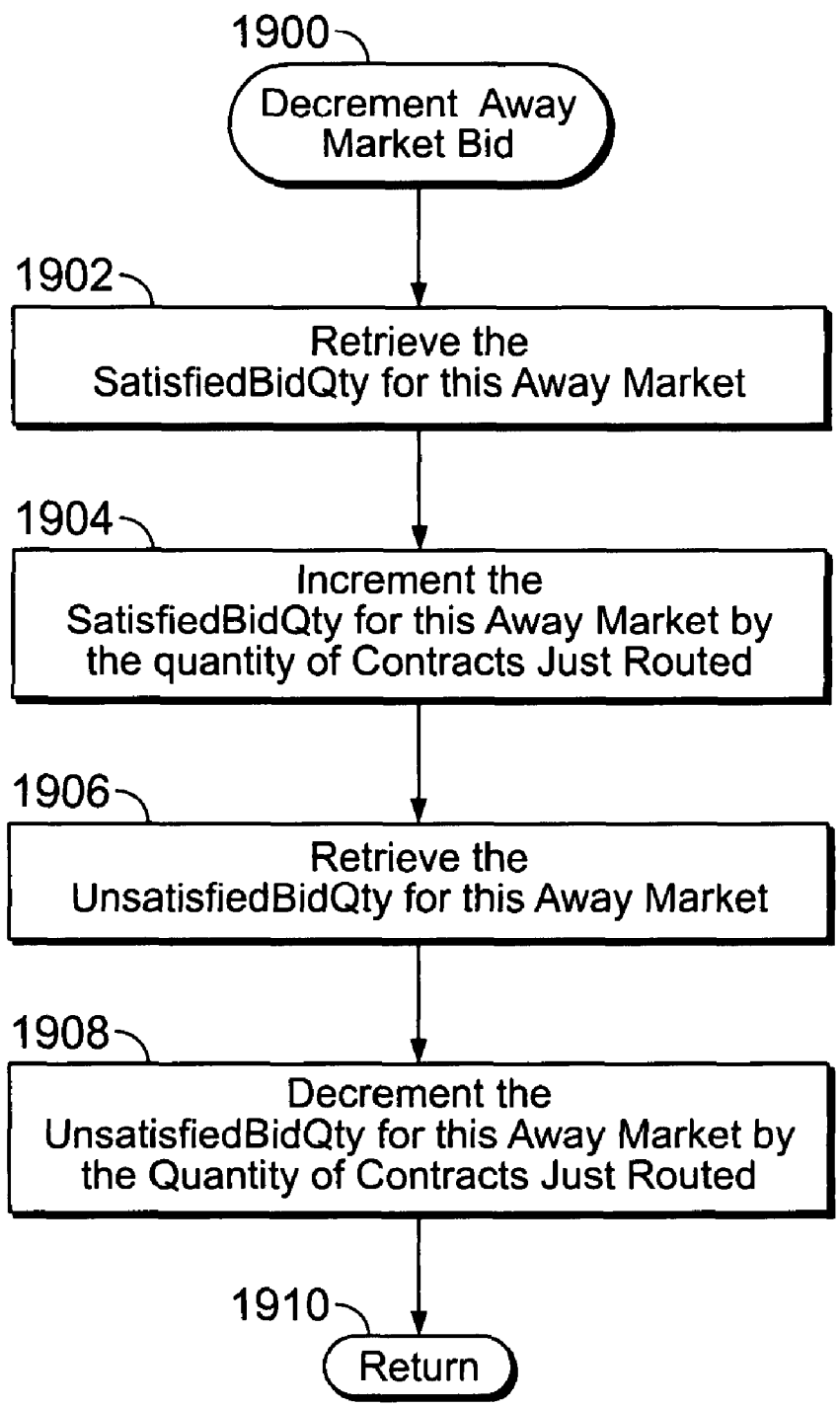
FIG. 17 is a flow diagram illustrating a process for "decrementing" an away market's bid, i.e., reducing the obligation to the quote after a sell order routes to it.

In step 1745, the process retrieves the "Routing Behavior" parameter on this away market's routing rule. (The process may already have retrieved this parameter in step 1734.) In step 1746, the process evaluates whether the outbound routed sell order should decrement the away market's bid size or not. According to the exemplary rules for the "Routing Behavior" parameter, away markets whose Routing Behavior=1, 2, 3, and 5 do indeed have their bids decremented (i.e., the quote size available to subsequent incoming sell orders is decreased by the routed quantity) while away markets whose Routing Behavior=4 do not. If the process determines that the outbound routed sell order should decrement the away market's bid size, then it continues to step 1748, where it initiates the "Decrement Away Market Bid" and proceeds to step 1900 in FIG. 17. The processing steps for FIG. 17 are described in detail below. After the process has partially or fully decremented the away market's bid size in FIG. 17, it continues to step 1750.

Returning to step 1746, if the process determines that the outbound routed sell order should not decrement the away market's bid size, then it also continues to step 1750.

In step 1750, the process checks if the incoming sell order still has any quantity remaining to trade after routing. If it does have quantity remaining, then the process continues to step 1752, where it returns to the step where the routine was originally invoked, back to step 1518. If it does not have any quantity remaining, then the process terminates in step 1754 as indicated.

Max Route Size Factors in Outbound Sell Order Size Process

Referring now to FIG. 16, a routine wherein the Routing Process calculates the maximum size of the outbound sell order is illustrated. This routine is very similar to the processing described in FIG. 8 above for calculating the size of the outbound buy order.

In step 1802, the process retrieves the "Maximum Route Size" parameter on the away market's routing rule. In step 1804, the process retrieves the "Maximum Route Style" parameter on the away market's routing rule.

In step 1806, the process checks if the value of the "Maximum Route Style" parameter for the away market is "1." If it is "1," then the process continues to step 1808, where it sets the OutboundSellOrderQty equal to the lesser of the value retrieved in the "Maximum Route Size" parameter and the incoming sell order's Leaves quantity. The process then continues to step 1810, where it returns to the step where it was originally invoked, back to step 1724 in FIG. 15A.

Returning to step 1806, if, however, the value of the "Maximum Route Style" parameter for the away market is not "1," then the process continues to step 1812, where it checks if the value of the "Maximum Route Style" parameter for the away market is "2" instead. If it is "2," then the process continues to step 1814, where it determines if the value of the "Maximum Route Size" parameter is less than the away market's UnsatisfiedBidQty. If the value of the "Maximum Route Size" parameter is lower, then the process continues to step 1818, where it sets the OutboundSellOrderQty equal to the lesser of the value retrieved in the "Maximum Route Size" parameter and the incoming sell order's Leaves quantity. The process then continues to step 1820, where it returns to the step where it was originally invoked, back to step 1724 in FIG. 15A.

Returning to step 1814, if, however, the value of the "Maximum Route Size" parameter is greater than or equal to the UnsatisfiedBidQty, then the process continues to step 1816, where it sets the OutboundSellOrderQty equal to the lesser of the UnsatisfiedBidQty and the incoming sell order's Leaves quantity. The process then continues to step 1820, where it returns to the step where it was originally invoked, back to step 1724 in FIG. 15A.

Returning to step 1812, if, however, the value of the "Maximum Route Style" parameter for the away market is not "2," then, in this embodiment, the value is "3," because there are no other values for Maximum Route Style in this embodiment. The process then continues to step 1824, where it determines if the value of the "Maximum Route Size" parameter is greater than the away market's UnsatisfiedBidQty. If the value of the "Maximum Route Size" parameter is higher, then the process continues to step 1828, where it sets the OutboundSellOrderQty equal to the lesser of the value retrieved in the "Maximum Route Size" parameter and the incoming sell order's Leaves quantity. The process then continues to step 1830, where it returns to the step where it was originally invoked, back to step 1724 in FIG. 15A.

Returning to step 1824, if, however, the value of the "Maximum Route Size" parameter is less than or equal to the UnsatisfiedBidQty, then the process continues to step 1826, where it sets the OutboundSellOrderQty equal to the lesser of the UnsatisfiedBidQty and the incoming sell order's Leaves quantity. The process then continues to step 1830, where it returns to the step where it was originally invoked, back to step 1724 in FIG. 15A.

Decrement Away Market Bid Process

Referring now to FIG. 17, a routine wherein the Routing Process reduces the available quote size for the away market bid is illustrated. When a quantity equal to the total disseminated bid size has been routed to the away market, its bid is considered to be fully satisfied.

In step 1902, the process retrieves the SatisfiedBidQty for the away market, which is a running total of the number of sell contracts that have been routed to the current disseminated bid, i.e., the cumulative bid size that has been satisfied. In step 1904, the process increments the SatisfiedBidQty by adding the size of the outbound routed sell order, resulting in an updated SatisfiedBidQty. In step 1906, the process retrieves the UnsatisfiedBidQty for the away market, which is a running total of the number of sell contracts that must still be routed to the current disseminated bid before the bid is completely satisfied. In step 1908, the process subtracts the size of the outbound routed sell order from the UnsatisfiedBidQty, resulting in an updated UnsatisfiedBidQty. The process continues to step 1910, where it returns to the step where the routine was originally invoked, back to step 1748 in FIG. 15B.

Excess Marketable Sell Order Quantity Remains Process

Referring now to FIG. 18, a routine wherein the process determines how to proceed next if the incoming marketable sell order still has quantity available to execute after satisfying all the eligible away markets at the NBB is illustrated. This routine is very similar to the procedure described in FIG. 10 above for processing the excess quantity of an incoming marketable buy order.

In step 2002, the process evaluates whether according to the business rules of the market center 20, the excess quantity of the incoming sell order should be canceled. If the order should be canceled, then the process cancels the order in step 2004 and terminates in step 2006 as indicated.

Returning to step 2002, if, however, the process determines that the excess quantity of the incoming sell order should not be canceled, then it continues to step 2008, where it checks whether the order is a limit order or a market order. If the incoming sell order is a market order, then the process continues to step 2010, where it prices the market sell order at the NBB. The process then continues to step 2012, where it checks if the market order should be displayed or queued If in step 2012 the process determines that the incoming market sell order should be queued, then it continues to step 2014, where it queues the incoming market sell order by inserting it in the internal order book 29a in price/time priority (priced at the current NBB) without disclosing it to the marketplace. The process then continues to step 2028, as described below. If, however, the process determines in step 2012 that the incoming market sell order should be displayed instead, then the process continues to step 2020, as described below.

Returning to step 2008, if, however, the process determines that the incoming sell order is a limit order, then the process continues to step 2016, where it checks if the incoming sell order's price is lower than the NBB price. If it is lower, then the process continues to step 2018 where it caps the price at the NBB, and then continues to step 2020. If it is not lower, then the process continues to step 2020. In step 2020, the process checks if the incoming sell order is allowed to lock the NBB. Generally speaking, if the incoming limit sell order has satisfied all away markets offering at the NBB by routing orders using the intermarket linkage, then it is indeed allowed to lock the market. If the incoming sell order is allowed to lock the NBB, then the process continues to step 2022, where it inserts the order in the internal order book 29a according to price/time priority in the Display Order Process, and disseminates the order to the public order book. The process then terminates in step 2024 as indicated.

Returning to step 2020, the process may determine that the incoming sell order is not allowed to lock the NBB. If the incoming sell order cannot lock the NBB, then the process continues to step 2026, where it inserts the incoming sell order in the internal order book 29a according to price/time priority in the Display Order Process, but does not disseminate it to the marketplace. Although the "dark" sell order is not displayed to the marketplace at the present time, it is nevertheless eligible to execute with incoming buy orders or market maker bids whose prices are equal or higher than that of the "dark" sell order, as indicated in step 2028.

Figure 20A:
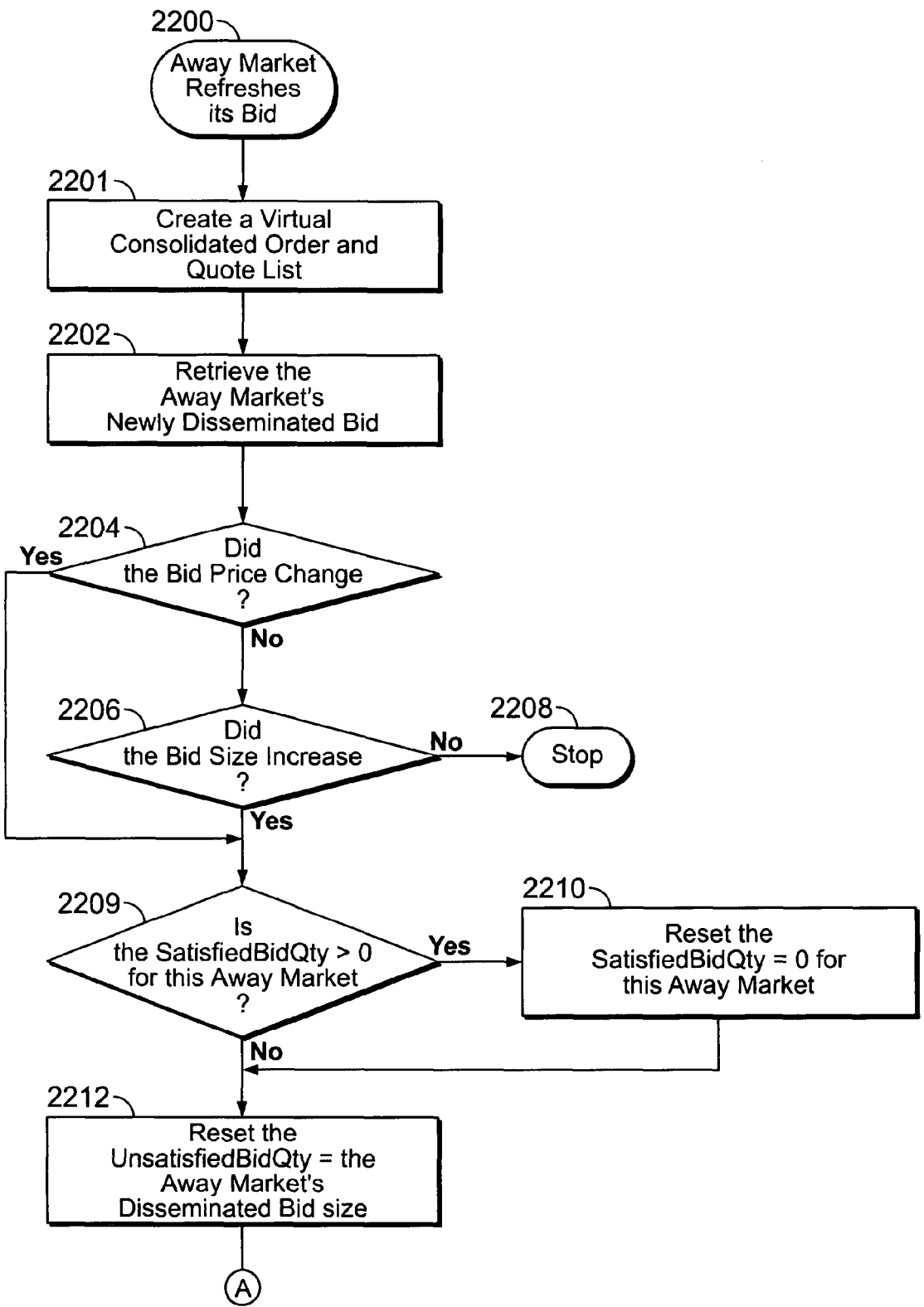
FIGS. 20A-20B are flow diagrams illustrating a process for responding to a newly-disseminated away market bid by determining if resting sell orders should route to it or not.
Figure 20B:
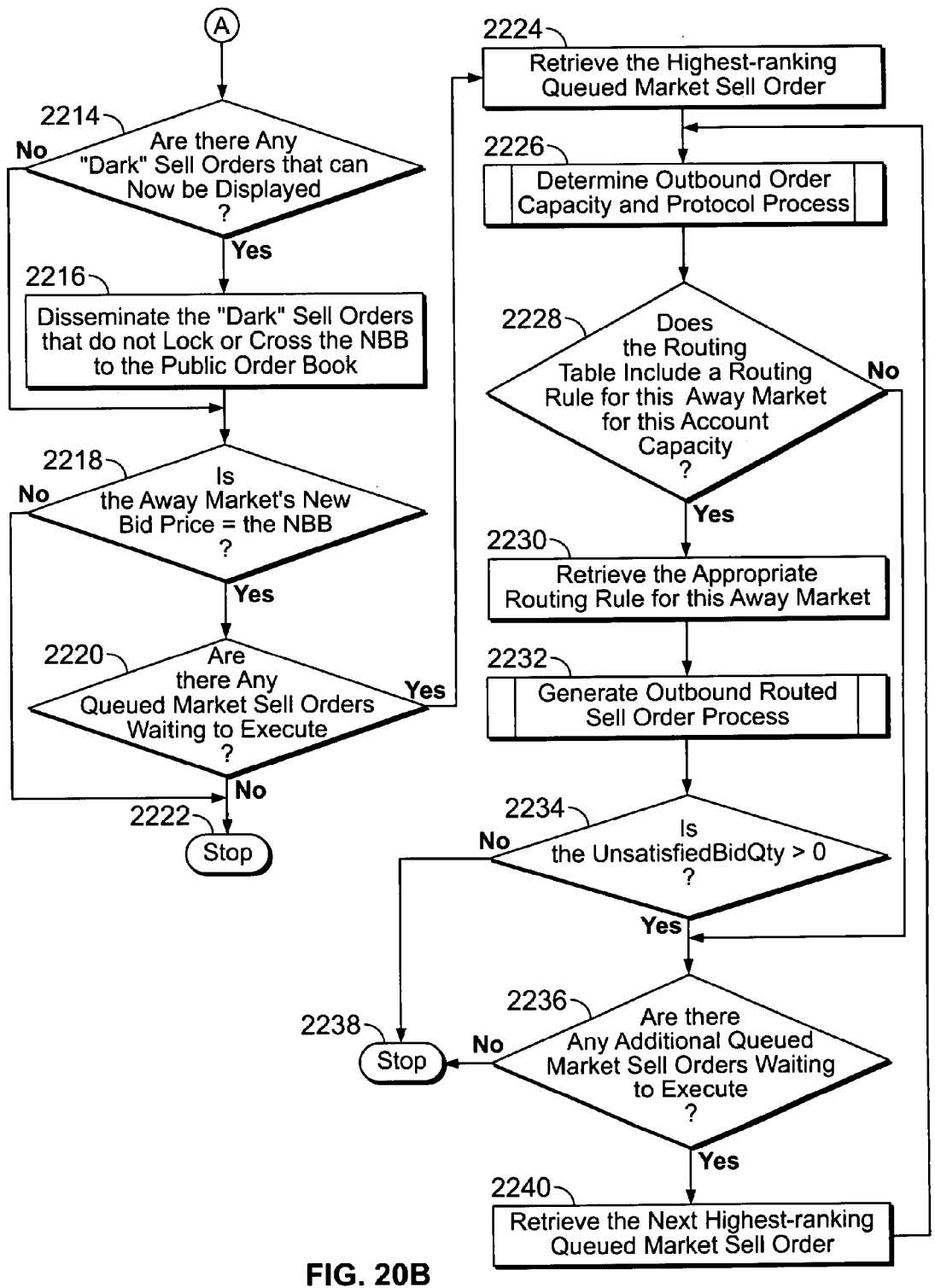

The limit sell order remains "dark" only while its price would cause the NBB to be locked if it were posted. If the NBB price changes, then in step 2030, the process initiates the "Away Market Refreshes its Bid Process" and proceeds to step 2200 in FIG. 20A, where the "dark" sell order may be displayed to the marketplace if it no longer locks the NBB. FIGS. 20A-20B are described in detail below. The process then terminates in step 2032 as indicated.

Away Market Fills or Declines Routed Sell Order Process

Figure 19:
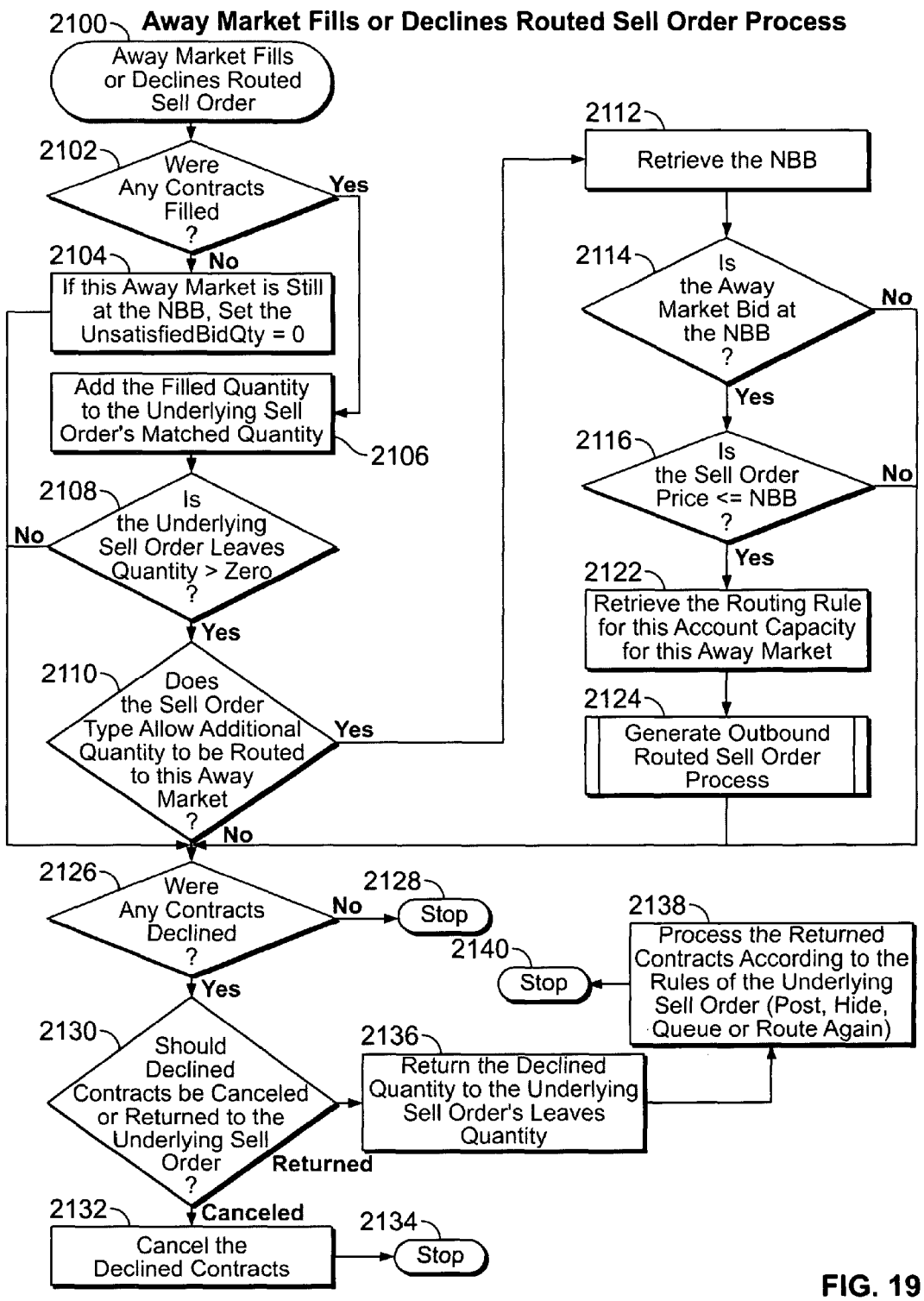
FIG. 19 is a flow diagram illustrating a process for receiving fills or declines for routed sell orders, and determining if the underlying sell order should route again.

Referring now to FIG. 19, a routine wherein the process receives a message that an away market has filled or declined a routed sell order is illustrated. The routine is very similar to the processing described for FIG. 11 above when an away market fills or declines the buy order routed to it.

When the order matching engine 21 receives a fill or decline message for a routed sell order, it initiates the "Away Market Fills or Declines Routed Sell Order Process" in step 2100. In step 2102, the process checks if the away market filled any part of the routed sell order. If it did, then in step 2106, it adds the filled quantity to the underlying sell order's cumulative matched quantity. In step 2108, the process checks if the underlying sell order still has quantity available to trade. If it does not have any more contracts available, then the process proceeds to step 2126.

Returning to step 2102, if, however, the away market did not fill any part of the routed sell order, then the process sets its UnsatisfiedBidQty equal to zero to prevent any subsequent sell orders from routing to this away market until it moves its bid. The process then proceeds to step 2126.

Returning to step 2108, if, however, the underlying sell order does still have quantity available to trade, then the process continues to step 2110, where it checks if fills for the underlying sell order type allow additional quantities to be routed or not. If the market center 20 receives a fill on behalf of an order type that does not route to the same quote again, then it proceeds to step 2126. If, however, the fill is on behalf of an order type that does continue to route to the same quote, then the process continues to step 2112, where it retrieves the NBB.

In step 2114, the process checks if the away market's bid is still at the NBB. If it is not still at the NBB, then the underlying sell order cannot route to it, and the process proceeds to step 2126. If, however, the away market's bid is still at the NBB, then the process continues to step 2116, where it checks if the underlying sell order's price is still marketable. If the underlying sell order is no longer marketable, i.e., its price is greater than the NBB, then the process proceeds to step 2126.

Returning to step 2116, if, however, the underlying sell order is still marketable, then it is eligible to route again to the same away market that filled it. In step 2122, the process retrieves the Routing Table rule for this away market for the account capacity and routing protocol applicable to the underlying sell order. By way of explanation, the process already knows that such a routing rule exists because it previously routed part of this underlying sell order to this away market. In step 2124, the process initiates the "Generate Outbound Routed Sell Order Process" and proceeds to step 1700 in FIG. 15A. The processing steps for FIGS. 15A-15B are described in detail above. After the process finishes generating another outbound sell order and routing it to the away market, the process continues to step 2126.

In step 2126, the process checks if the away market declined any portion of the routed sell order. If it did not, then the process terminates in step 2128 as indicated. If, however, the away market did decline all or part of the routed sell order, then in step 2130, the process checks whether it should cancel the declined quantity or else return the declined quantity to the underlying sell order.

If the business rules for the market center 20 determine that the declined quantity should be canceled, then the process cancels the declined contracts in step 2132 and terminates in step 2134. If, however, the business rules for the market center 20 determine that the declined quantity should be reinstated instead, then the process continues to step 2136, where it returns the declined contracts to the underlying sell order. The process then continues to step 2138, where the returned contracts may be posted, hidden, or may route to a different away market at the NBB, depending on the rules for the underlying sell order type and the market prices in effect at the time the contracts are declined. The process then terminates in step 2140 as indicated.

Away Market Refreshes its Bid Process

Referring now to FIGS. 20A-20B, a routine wherein the Routing Process 21c, having been notified by the quote engine 23a that an away market at the NBB has updated its quote, receives the newly-disseminated bid from an away market and determines what actions to take is illustrated. The routine is very similar to the processing described in FIGS. 12A-12B above for receiving the newly-disseminated offer from an away market.

When the quote engine 23a detects the new disseminated bid, it notifies the order matching engine 21, which initiates the "Away Market Refreshes its Bid Process" in step 2200 of FIG. 20A. In step 2201, the process combines the away market BBO book 25a, the market maker quote book 33a, and the internal order book 29a together in a virtual consolidated order and quote list, which it ranks in price/display/time priority but with a preference for resident interest over away market interest at the same price level. In step 2202, the process retrieves the away market's newly-disseminated bid. In step 2204, it checks if the bid price has changed from this away market's previous bid price. If the price has not changed, then the process continues to step 2206, where it checks if the bid size has increased from this away market's previous bid size. If it did not increase, then the process terminates in step 2208 as indicated because no action is required when an away market decreases its existing bid.

Returning to step 2204, if, however, the bid price has indeed changed, then the process continues to step 2209. In step 2209, the process checks if the SatisfiedBidQty is greater than zero for this away market, i.e., if previous routed sell orders have already partially or fully satisfied this away market's bid. If the bid is at least partly satisfied, i.e., if the SatisfiedBidQty is greater than zero, then in step 2210, the process resets the SatisfiedBidQty to zero again. This indicates that the away market's newly disseminated bid has not been satisfied at all, and the away market is once again eligible to receive routed orders up to its quote size. The process continues to step 2212, where it resets the UnsatisfiedBidQty for the away market equal to its full disseminated bid size.

Returning to step 2206, if, however, the bid size for this away market has indeed increased from its previous bid size, then the process also continues to step 2209, as an increased disseminated size reinstates a quote in the same manner as a new disseminated price does. The process executes steps 2209, 2210, and 2212 as described above.

The process continues to step 2214, where it checks if there are any "dark" sell orders that are resting in the internal order book 29a that can now be displayed to the marketplace. If the away market faded its bid off the NBB and the NBB price no longer locks one or more "dark" sell orders, then the process discloses those "dark" sell orders in step 2216, and continues to step 2218. Returning to step 2214, the process also continues to step 2218 if no "dark" sell orders presently exist.

In step 2218, the process checks if the away market's newly-disseminated bid price is at the NBB. Just as a market sell order can execute with an incoming buy order, it may also be eligible to route to an away market that presents at the NBB—either because its new price places it at the NBB, or because its increased size while already at the NBB makes it eligible to receive additional routed quantity. If the new bid price is inferior to the NBB, then the process terminates in step 2222 as indicated.

Returning to step 2218, if, however, the away market is at the NBB, then the process continues to step 2220, where it checks if there are any queued market sell orders, as they may be eligible for routing to the away market. If there are no queued market sell orders, then the process terminates in step 2222 as indicated. If, however, there are queued market sell orders, then the process continues to step 2224, where it retrieves the highest-ranking market sell order. The process continues to step 2226, where it initiates the "Determine Outbound Order Capacity and Protocol Process" and proceeds to step 600 in FIG. 6. The processing steps of FIG. 6 are described in detail above.

After determining the appropriate account capacity and routing protocol in FIG. 6, in step 2228, the process determines if there is a routing rule for this away market for this capacity and routing protocol. If the process determines that the away market does indeed have a routing rule that accommodates the account capacity and routing protocol derived in FIG. 6, then the process continues to step 2230, where it retrieves the routing rule for the away market. In step 2232, the process initiates the "Generate Outbound Routed Sell Order Process" and proceeds to step 1700 in FIG. 15A. The processing for FIGS. 15A-15B are described in detail above. After the process finishes constructing an outbound sell order and routing it to the away market's newly-disseminated bid, in step 2234, the process checks if the away market's bid has been fully satisfied, i.e., if its UnsatisfiedBidQty is greater than zero. If its UnsatisfiedBidQty is equal to zero, then it is completely satisfied, and the process terminates in step 2238 as indicated.

Returning to step 2234, if, however, the away market's UnsatisfiedBidQty is greater than zero, then its bid is not fully satisfied, and additional market sell orders may be eligible to route. The process continues to step 2236, where it checks if there are additional market sell orders. If there are, then the process continues to step 2240, where it retrieves the next highest-ranking market sell order, and returns to step 2226, where it repeats the procedures described above for determining if the away market can accept an order routed on behalf of this next-best market sell order. The steps are repeated until the process determines that the newly-disseminated away market bid is fully satisfied, or until there are no additional queued market sell orders. The process then terminates in step 2238 as indicated.

Returning to step 2228, if, however, no routing rule exists for this away market for this account capacity, then the retrieved market sell order cannot route to this away market, and the process proceeds to step 2236 where it checks if there are any other queued market sell orders that may be eligible to route, as described above.

Detailed Examples of the Routing Process

It should be noted that in the examples used throughout this document, legacy price increments (e.g., a nickel) are used, but this invention could certainly be employed in a penny trading (or any other increment) environment. It should also be noted that order and quote prices and sizes are by way of example. It should also be noted that routing rules used in these examples only serve to illustrate the basic concepts of the Routing Process and the Routing Table, and that different rules may be actually implemented. It should also be noted that standard market-wide protocols for routing, such as the acknowledgement of the receipt of routed orders and the rules for rejecting fills resulting from routed orders that time out, are not discussed, as such requirements are already known to the marketplace.

It should also be noted that in the examples used throughout this document, market maker entitlements and the execution of market maker quotes are not discussed. Market maker quote processing is described in detail elsewhere. Similarly, it should also be noted that in the examples used throughout this document, the execution of working orders (i.e., special order types that are partially displayed or are completely nondisclosed by definition) is also not discussed. Working order processing is described in detail elsewhere. It should simply be noted that an incoming order will execute against any eligible working orders at the NBBO in the Working Order Process prior to the order being released to the Routing Process.

As previously described, the order matching engine 21 creates a new virtual consolidated order and quote list whenever it receives a new incoming marketable order, or whenever it is notified by the quote engine 23a that an away market quote 25a may be marketable or may affect the pricing or display of orders in the order book 29a. The assembled virtual consolidated order and quote list remains in local memory only for the duration of the evaluation and/or execution, and is then deleted. However, for ease of illustration in the examples that follow, it should be noted that the virtual consolidated order and quote list is often depicted as being passed to subsequent processing steps as if it remained in local memory, rather than being recreated from its component books each time it is evaluated.

Examples of Order Routing Using the Intermarket Linkage

The first series of examples illustrate the processes that the market center 20 uses when routing orders to away markets using an intermarket linkage, designated as "LINKAGE" in the Routing Table. In this series of examples, the Routing Table rules have been configured to generally conform to present intermarket linkage rules. Accordingly, the market center 20 routes to all away markets quoting at the NBBO up to the disseminated quote size of each away market, and then contemporaneously posts any excess quantity of the routed order, locking the NBBO. The away markets have 5 seconds to fill or decline IOC orders in these examples.

When the away market fills the routed order, the market center 20 does not generally route additional quantity to the away market unless the away market also updates its quote price or increases its quote size. This routing model is referred to as "Routing Behavior 5," as the "Routing Behavior" parameter is configured to '5' in the rules described in this series of examples.

As marketplace rules presently permit routing using an intermarket linkage only if an issue has an assigned market maker, this first series of examples use an issue with an assigned lead market maker (LMM) and an assigned regular market maker (MM2). In the interest of brevity, the examples that follow do not describe the execution of market maker quotes, as such processing is described in detail elsewhere.

In the following examples, an order on behalf of a market maker and an order on behalf of a customer are routed off the market center 20 in accordance with the parameters specified in the Routing Table shown below. After all the away markets at the NBBO are fully satisfied, the order matching engine 21 posts the remainder of the customer order, locking the market.

The Exemplary Marketplace and its Intermarket Linkage Routing Rules are Shown

→The NBBO is 1.95 to 2.05 (210×150)

The away market BBO book 25a looks like this:

| Bids | Offers |
|---|---|
| Away Market D: Bid 50 @ 1.95 | Away Market A: Offer 70 @ 2.05 |
| Away Market B: Bid 90 @ 1.95 | Away Market B: Offer 60 @ 2.05 |
| Away Market C: Bid 40 @ 1.90 | Away Market D: Offer 50 @ 2.10 |
| Away Market A: Bid 30 @ 1.85 | Away Market C: Offer 30 @ 2.10 |

The market maker quote book 33a looks like this:

| | Bids | | Offers |
|---|---|---|---|
| LMM: | Bid 70 @ 1.95 | LMM: | Offer 40 @ 2.10 |
| MM2: | Bid 70 @ 1.90 | MM2: | Offer 20 @ 2.10 |

The internal order book 29a looks like this:

| | Bids | | Offers |
|---|---|---|---|
| Order A: | Buy 20 @ 1.90 | Order C: | Sell 20 @ 2.05 |
| Order B: | Buy 10 @ 1.85 | Order D: | Sell 40 @ 2.15 |

→The market center BBO is 1.95 to 2.05 (70×20)
The public order book looks like this:

| Bids | Offers |
|---|---|
| 70 @ 1.95 | 20 @ 2.05 |
| 90 @ 1.90 | 60 @ 2.10 |
| 10 @ 1.85 | 40 @ 2.15 |

In the examples that follow, only orders routed on behalf of customers and assigned market makers may be routed using the intermarket linkage. Accordingly, the exemplary Routing Table below only includes routing rules for Capacity=C and Capacity=MM, with Routing Protocol=LINKAGE. The outbound orders are sent as P/A orders and Principal orders, respectively.

As shown in the exemplary Routing Table below, there is one routing rule for each of four away markets. According to the values assigned to the "Routing Priority" parameter, when all four away markets are quoting at the same price, Away Market B has the highest priority (9); Away Market C has the second-highest priority (7); Away Market A has the third-highest priority (5); and Away Market D has the lowest priority (3). According to the values assigned to the "Route Preference Style" parameter, outbound orders are sent as IOC orders except in the case of orders routed to Away Market D, which are sent as DAY orders instead. According to the values assigned to the "Routing Behavior" parameter, i.e., Routing Behavior=5, outbound orders are sent up to the away market quote size, and any portion of an incoming limit order that remains after all markets quoting at the NBBO have been fully satisfied is contemporaneously posted, locking the NBBO.

Incoming Order E (Capacity=MM) is Received, and Matches a Posted Sell Order

As previously described, market makers can send orders in any issue, although they can only quote in their assigned issues. Although the Routing Process does not automatically generate and route orders on behalf of market maker quotes (market makers must manually route their own Principal orders if they generate a quote that locks or crosses an away market), the Routing Process does however automatically generate and route orders on behalf of market maker orders.

In step 400, the order matching engine 21 receives the following order on behalf of the lead market maker:
Order E: Buy 60 @ 2.05, Capacity=MM In step 401, the process retrieves the NBO (2.05). In step 402, it checks if incoming Buy Order E is executable. As incoming Buy Order E's price (2.05) is equal to the NBO (2.05), the order is indeed executable. The process continues to step 404, where it creates a virtual consolidated order and quote list, which it ranks in price/display/time priority, but with a preference for resident interest over away market interest at the same price level.

The virtual consolidated order and quote list looks like this:

| | Bids | | Offers |
|---|---|---|---|
| LMM: | Bid 70 @ 1.95 | Order C: | Sell 20 @ 2.05 |
| Away Market D: | Bid 50 @ 1.95 | Away Market A: | Offer 70 @ 2.05 |
| Away Market B: | Bid 90 @ 1.95 | Away Market B: | Offer 60 @ 2.05 |
| Order A: | Buy 20 @ 1.90 | LMM: | Offer 40 @ 2.10 |
| MM2: | Bid 70 @ 1.90 | MM2: | Offer 20 @ 2.10 |
| Away Market C: | Bid 40 @ 1.90 | Away Market D: | Offer 50 @ 2.10 |
| Order B: | Buy 10 @ 1.85 | Away Market C: | Offer 30 @ 2.10 |
| Away Market A: | Bid 30 @ 1.85 | Order D: | Sell 40 @ 2.15 |

The process continues to step 406, where it retrieves the best offer in the virtual consolidated order and quote list, which is posted Sell Order C. In step 408, it checks if incoming Buy Order E's price (2.05) is greater than or equal to Sell Order C's price (2.05). As the prices are equal, the process continues to step 418, where it checks if the offer is on or off the market center 20. As the offer is a sell order on the market center 20, the process bypasses step 420 and continues to step 422. In step 422, it matches 20 contracts of incoming Buy Order E with posted Sell Order C at the sell price (2.05), completely depleting Sell Order C and removing it from the virtual consolidated order and quote list and the books.

Routing Table

| Destination | Routing Priority | Capacity | Routing Behavior | Routing Protocol | Route Preference Style | Auto. Time-Out | Over-size Weight | Max. Route Size | Max. Route Style |
|---|---|---|---|---|---|---|---|---|---|
| Away Market A | 5 | C, MM | 5 | LINKAGE | IOC | | | | |
| Away Market B | 9 | C, MM | 5 | LINKAGE | IOC | | | | |
| Away Market C | 7 | C, MM | 5 | LINKAGE | IOC | | | | |
| Away Market D | 3 | C, MM | 5 | LINKAGE | DAY | 15 | | | |

→The NBBO is now 1.95 to 2.05 (210×130)

The virtual consolidated order and quote list now looks like this:

|  | Bids |  | Offers |
| --- | --- | --- | --- |
| LMM: | Bid 70 @ 1.95 | Away Market A: | Offer 70 @ 2.05 |
| Away Market D: | Bid 50 @ 1.95 | Away Market B: | Offer 60 @ 2.05 |
| Away Market B: | Bid 90 @ 1.95 | LMM: | Offer 40 @ 2.10 |
| Order A: | Buy 20 @ 1.90 | MM2: | Offer 20 @ 2.10 |
| MM2: | Bid 70 @ 1.90 | Away Market D: | Offer 50 @ 2.10 |
| Away Market C: | Bid 40 @ 1.90 | Away Market C: | Offer 30 @ 2.10 |
| Order B: | Buy 10 @ 1.85 | Order D: | Sell 40 @ 2.15 |
| Away Market A: | Bid 30 @ 1.85 |  |  |

The internal order book 29a now looks like this:

|  | Bids |  | Offers |
| --- | --- | --- | --- |
| Order A: | Buy 20 @ 1.90 | Order D: | Sell 40 @ 2.15 |
| Order B: | Buy 10 @ 1.85 |  |  |

→The market center BBO is now 1.95 to 2.10 (70×60)

The public order book looks like this:

| Bids | Offers |
| --- | --- |
| 70 @ 1.95 | 60 @ 2.10 ← |
| 90 @ 1.90 | 40 @ 2.15 |
| 10 @ 1.85 |  |

Incoming Order E is Eligible to Route

In step 424, the process checks if incoming Buy Order E still has quantity available. As it has 40 contracts remaining, the process continues to step 426, where it retrieves the next-best offer in the virtual consolidated order and quote list, which is Away Market A's Offer. The process then returns to step 408, where it checks if incoming Buy Order E's price (2.05) is greater than or equal to the best offer (2.05). As the prices are equal, the process continues to step 418, where it checks if the best offer is on or off the market center 20.

As the offer is an away market quote, the process continues to step 428, where it checks if incoming Buy Order E is an order type that is eligible for routing. As incoming Buy Order E is a regular limit order, it is eligible to route, so the process continues to step 442, where it initiates the "Determine Away Market Offer Eligibility Process," and proceeds to step 500 in FIG. 5.

Incoming Order E Can Route With Capacity=P Using the Intermarket Linkage

In step 501, the process initiates the "Determine Outbound Order Capacity and Protocol Process," and proceeds to step 600 in FIG. 6.

In step 602, the process checks if the Capacity specified on incoming Buy Order E is "C" (customer). As it is not, the process continues to step 618, where it checks if the Capacity specified on incoming Buy Order E is "MM" (market maker). As it is, the process continues to step 620, where it checks if this market maker is assigned to this issue. As this market maker is the LMM, the process continues to step 622, where it sets the OutboundOrderCapacity="P" (Principal). The process continues to step 624, where it sets the OutboundRoutingProtocol="LINKAGE." The process then terminates in step 632, where it returns to the step where it was originally invoked, back to step 501 in FIG. 5.

Away Markets at the NBO are Evaluated as Possible Routing Destinations

Continuing to step 502, the process checks if there is more than one away market quoting at the NBO. As both Away Market A and Away Market B are offering at 2.05, the NBO, the process continues to step 504. In step 504, the process retrieves the "Routing Priority" parameter for Away Markets A and B.

| Destination | Routing Priority |
| --- | --- |
| Away Market A | 5 |
| Away Market B | 9 |

As shown in the Routing Table, Away Market A has been assigned a Routing Priority=5, while Away Market B has been assigned a Routing Priority=9. Accordingly, in step 506, the process determines that Away Market B has a higher ranking than Away Market A. This is illustrated by inserting Away Market B's offer ahead of Away Market A's offer in the rankings in the virtual consolidated order and quote list shown below.

As orders are routed to each away market's specific disseminated bid or offer quotation, the process maintains running totals of the quantity of contracts that have already been routed and that can still be routed. For clarity, in the examples that follow, the SatisfiedOfferQty and the UnsatisfiedOfferQty for the away market quotes participating in the examples is depicted in the virtual consolidated order and quote list, as shown below. As no orders have been routed to Away Market B's offer or to Away Market A's offer yet in this example, each SatisfiedOfferQty is set to zero and each UnsatisfiedOfferQty is set to the away market's full disseminated offer size.

The virtual consolidated order and quote list now looks like this, with Away Market B's offer ranked ahead of Away Market A's offer due to its higher Routing Priority:

|  | Bids |  | Offers |
| --- | --- | --- | --- |
| LMM: | Bid 70 @ 1.95 | Away Market B: | Offer 60 @ 2.05 |
|  |  | SatisfiedOfferQty = 0 ← |  |
|  |  | UnsatisfiedOfferQty = 60 ← |  |
| Away Market D: | Bid 50 @ 1.95 | Away Market A: | Offer 70 @ 2.05 |
|  |  | SatisfiedOfferQty = 0 ← |  |
|  |  | UnsatisfiedOfferQty = 70 ← |  |
| Away Market B: | Bid 90 @ 1.95 | LMM: | Offer 40 @ 2.10 |
| Order A: | Buy 20 @ 1.90 | MM2: | Offer 20 @ 2.10 |
| MM2: | Bid 70 @ 1.90 | Away Market D: | Offer 50 @ 2.10 |
| Away Market C: | Bid 40 @ 1.90 | Away Market C: | Offer 30 @ 2.10 |
| Order B: | Buy 10 @ 1.85 | Order D: | Sell 40 @ 2.15 |
| Away Market A: | Bid 30 @ 1.85 |  |  |

Away Market B has the Highest Ranking at the NBO, and is Eligible to Receive the Routed Order In step 508, the process retrieves the offer from the highest-ranked away market, Away Market B. In step 510, it checks if the Routing Table includes an active rule for Away Market B that accepts Capacity=MM orders that are routed using Routing Protocol=LINKAGE. As shown below, Away Market B's routing rule does indeed allow Capacity=MM orders to be routed using LINKAGE. (As described in FIG. 6, the outbound linkage order will include the Capacity "P" rather than "MM" as this issue has an assigned lead market maker.)

The process retrieves the routing rule for Away Market B in step 512:

Routing Table

| Destination | Routing Priority | Capacity | Routing Behavior | Routing Protocol | Route Preference Style | Auto. Time-out | Over-size Weight | Max. Route Size | Max. Route Style |
|---|---|---|---|---|---|---|---|---|---|
| Away Market B | 9 | C, MM | 5 | LINKAGE | IOC | | | | |

In step 514, the process checks if Away Market B's UnsatisfiedOfferQty should be evaluated or not. As Routing Behavior '5' specifies that orders are routed to away markets only if their quotes are not completely satisfied, the process continues to step 516, where it checks if Away Market B's UnsatisfiedOfferQty is greater than zero. As no orders have been routed to Away Market B yet, its UnsatisfiedOfferQty=60, the full size of its disseminated Offer.

Outbound Order with Capacity=P is Generated on Behalf of Order E and Routed to Away Market B Using the Intermarket Linkage The process continues to step 518, where it initiates the "Generate Outbound Routed Buy Order Process," and proceeds to step 700 in FIG. 7A.

In step 702, the process retrieves the OutboundOrderCapacity (the value "P" was previously derived in step 622 of FIG. 6) and attaches it to the outbound linkage order that is being generated now. In step 704, the process retrieves the "Route Preference Style" parameter from Away Market B's routing rule. In step 706, it checks if the Route Preference Style=DAY or IOC. As the Route Preference Style=IOC, the process continues to step 714, where it sets the OutboundBuyOrderTimeInForce="IOC." In step 716, it derives the OutboundOrderTimeout by adding 5 seconds to the current time. Accordingly, if Away Market B does not fill the routed order within 5 seconds, the market center 20 can consider it to be expired, and can reject a fill that is received after the order times out.

The process continues to step 718, where it sets the OutboundBuyOrderPrice equal to Away Market B's disseminated offer price (2.05). The process continues to step 720, where it retrieves the "Maximum Route Size" parameter from Away Market B's routing rule. In step 722, it checks if the Maximum Route Size is greater than zero. As this parameter is not set for Away Market B, the process continues to step 726, where it retrieves the "Oversize Weight" parameter from Away Market B's routing rule. In step 728, it checks if the Oversize Weight is greater than zero. As this parameter is not set for Away Market B, the process continues to step 734.

In step 734, the process retrieves the "Routing Behavior" parameter for Away Market B (Routing Behavior=5). In step 736, the process checks whether it should route up to the UnsatisfiedOfferQty or it should route up to the full disseminated offer size. As Routing Behavior '5' specifies that the process should route up to the UnsatisfiedOfferQty, the process continues to step 738, where it sets the OutboundBuyOrderQty=40, the lesser of Away Market B's UnsatisfiedOfferQty (60 contracts) and incoming Buy Order E's remaining quantity (40 contracts).

The process continues to step 742, where it retrieves the "Routing Protocol" parameter specified for Away Market B on its routing rule. As the Routing Protocol=LINKAGE, in step 744, the process routes the outbound buy order to Away Market B using the intermarket linkage to deliver the order.

Accordingly, the outbound routed order on behalf of underlying Buy Order E looks like this:

→Buy 40@ 2.05, Capacity=P, Time In Force=IOC, Destination=Away Market B, Routing Protocol=LINKAGE Away Market B is only required to execute a minimum of 10 contracts, the current Firm Principal Quote Size, as this is a Principal order and not a P/A order. In this example, Away Market B will execute the full order size regardless.

As the process has already retrieved the "Routing Behavior" parameter for Away Market B in step 734, it bypasses step 745. In step 746, the process checks if the routed order should decrement Away Market B's offer size or not. As Routing Behavior '5' does indeed decrement the quotes, the process continues to step 748, where it initiates the "Decrement Away Market Offer Process" and proceeds to step 900 of FIG. 9. Away Market B's Offer is Partially Decremented (Quote is not Fully Satisfied)

In step 902, the process retrieves the computed SatisfiedOfferQty for Away Market B. As no orders were previously routed to Away Market B, the SatisfiedOfferQty=zero. In step 904, the process increments the SatisfiedOfferQty (0) by the number of contracts it just routed (40) to yield an updated SatisfiedOfferQty=40. In step 906, the process retrieves the UnsatisfiedOfferQty for Away Market B (currently set to 60 as no orders were previously routed to Away Market B). In step 908, it decrements the value by the number of contracts it just routed (40) to yield an updated UnsatisfiedOfferQty=20. In step 910, the process returns to the step where it was originally invoked, back to step 748 of FIG. 7B.

→The NBBO is still 1.95 to 2.05 (210×130)

The virtual consolidated order and quote list now looks like this:

| | Bids | | Offers |
|---|---|---|---|
| LMM: | Bid 70 @ 1.95 | Away Market B: | Offer 60 @ 2.05 |
| | | SatisfiedOfferQty = 40 ← | |
| | | UnsatisfiedOfferQty = 20 ← | |
| Away Market D: | Bid 50 @ 1.95 | Away Market A: | Offer 70 @ 2.05 |
| | | SatisfiedOfferQty = 0 | |
| | | UnsatisfiedOfferQty = 70 | |
| Away Market B: | Bid 90 @ 1.95 | LMM: | Offer 40 @ 2.10 |
| Order A: | Buy 20 @ 1.90 | MM2: | Offer 20 @ 2.10 |
| MM2: | Bid 70 @ 1.90 | Away Market D: | Offer 50 @ 2.10 |
| Away Market C: | Bid 40 @ 1.90 | Away Market C: | Offer 30 @ 2.10 |
| Order B: | Buy 10 @ 1.85 | Order D: | Sell 40 @ 2.15 |
| Away Market A: | Bid 30 @ 1.85 | | |

The process continues to step 750, where it checks if incoming Buy Order E has any quantity available to trade. As incoming Buy Order E has no remaining quantity, the process terminates in step 754 as indicated. The virtual consolidated order and quote list is deleted from local memory.

Incoming Order F (Capacity=C) is Received

In step 400, the order matching engine 21 receives the following order on behalf of a customer:

Order F: Buy 120 @ 2.05, Capacity=C

In step 401, the process retrieves the NBO (2.05). In step 402, the process checks if incoming Buy Order F is executable. As incoming Buy Order F's price (2.05) is equal to the NBO (2.05), the order is indeed executable. The process continues to step 404, where it combines the away market BBO book 25a, the market maker quote book 33a, and the internal order book 29a together in a virtual consolidated order and quote list, which it ranks in price/display/time priority but with a preference for resident interest over away market interest at the same price level. As there have been no updates to any of the books in the interim, the virtual consolidated order and quote list looks the same as it did in the prior step.

→The NBBO is still 1.95 to 2.05 (210×130)

The virtual consolidated order and quote list looks like this:

| | Bids | | Offers |
|---|---|---|---|
| LMM: | Bid 70 @ 1.95 | Away Market B: | Offer 60 @ 2.05 |
| | | SatisfiedOfferQty = 40 | |
| | | UnsatisfiedOfferQty = 20 | |
| Away Market D: | Bid 50 @ 1.95 | Away Market A: | Offer 70 @ 2.05 |
| | | SatisfiedOfferQty = 0 | |
| | | UnsatisfiedOfferQty = 70 | |
| Away Market B: | Bid 90 @ 1.95 | LMM: | Offer 40 @ 2.10 |
| Order A: | Buy 20 @ 1.90 | MM2: | Offer 20 @ 2.10 |
| MM2: | Bid 70 @ 1.90 | Away Market D: | Offer 50 @ 2.10 |
| Away Market C: | Bid 40 @ 1.90 | Away Market C: | Offer 30 @ 2.10 |

-continued

| | Bids | | Offers |
|---|---|---|---|
| Order B: | Buy 10 @ 1.85 | Order D: | Sell 40 @ 2.15 |
| Away Market A: | Bid 30 @ 1.85 | | |

Incoming Order F is Eligible to Route

The process continues to step 406, where it retrieves the best offer in the virtual consolidated order and quote list, which is still Away Market B's Offer. In step 408, it checks if incoming Buy Order F's price (2.05) is greater than or equal to Away Market B's offer price (2.05). As the prices are equal, the process continues to step 418, where it checks if the retrieved offer is on or off the market center 20. As the offer is an away market quote, the process continues to step 428. In step 428, the process checks if incoming Buy Order F is an order type that is eligible for routing. As incoming Buy Order F is a regular limit order, it is eligible to route, so the process continues to step 442, where it initiates the "Determine Away Market Offer Eligibility Process," and proceeds to step 500 in FIG. 5.

Incoming Order F Can Route with Capacity=PA Using the Intermarket Linkage

In step 501, the process initiates the "Determine Outbound Order Capacity and Protocol Process," and proceeds to step 600 in FIG. 6.

In step 602, the process checks if the capacity specified on incoming Buy Order F is "C" (customer). As it is, the process continues to step 604, where it checks if this issue has an assigned lead market maker. As this issue does have an assigned LMM, the process continues to step 606, where it sets the OutboundOrderCapacity="PA" (Principal acting as Agent). The process continues to step 608, where it sets the OutboundRoutingProtocol="LINKAGE." The process then terminates in step 616, where it returns to the step where it was originally invoked, back to step 501 in FIG. 5.

Continuing to step 502, the process checks if there is more than one away market quoting at the NBO. As both Away Market A and Away Market B are still offering at 2.05, the NBO, the process continues to step 504. In step 504, the process retrieves the "Routing Priority" parameter for Away Markets A and B. As no additional away markets have joined the NBO, in step 506, the process determines that Away Market B still has the highest Routing Priority.

Away Market B is Not Fully Satisfied, and is Eligible to Receive an Additional Routed Customer Order In step 508, the process retrieves the offer from the highest-ranked away market, Away Market B. In step 510, the process checks if the Routing Table includes an active rule for Away Market B that accepts Capacity=C orders that are routed using Routing Protocol=LINKAGE. As it does (the same rule it used to route prior incoming Order E), the process retrieves the routing rule for Away Market B in step 512:

| | | | | | Routing Table | | | | |
|---|---|---|---|---|---|---|---|---|---|
| Destination | Routing Priority | Capacity | Routing Behavior | Routing Protocol | Route Preference Style | Auto. Time-out | Over-size Weight | Max. Route Size | Max. Route Style |
| Away Market B | 9 | C, MM | 5 | LINKAGE | | IOC | | | |

In step 514, the process checks if Away Market B's UnsatisfiedOfferQty should be evaluated or not. As Routing Behavior '5' specifies that orders are routed to away markets only if their quotes are not completely satisfied, the process continues to step 516, where it checks if Away Market B's UnsatisfiedOfferQty is greater than zero. As Away Market B is still eligible to receive 20 more routed buy orders before its offer is fully satisfied (i.e., its UnsatisfiedOfferQty=20), the process continues to step 518.

Outbound Order with Capacity=PA is Generated on Behalf of Order F and Routed to Away Market B Using the Intermarket Linkage In step 518, the process initiates the "Generate Outbound Routed Buy Order Process," and proceeds to step 700 in FIG. 7A.

In step 702, the process retrieves the previously derived OutboundOrderCapacity (the value "PA" was derived in step

606 of FIG. 6). The process then executes steps 704 through 734 for processing incoming Buy Order F in the same manner as it did while processing previous incoming Buy Order E above.

In step 736, the process checks whether it should route up to the UnsatisfiedOfferQty or it should route up to the full disseminated offer size. As Routing Behavior '5' specifies that the process should route up to the UnsatisfiedOfferQty, the process continues to step 738, where it sets the Outbound-BuyOrderQty=20, the lesser of Away Market B's UnsatisfiedOfferQty (20 contracts) and incoming Buy Order F's remaining quantity (120 contracts, its full order size).

The process continues to step 742, where it retrieves the "Routing Protocol" parameter specified for Away Market B on its routing rule. As the Routing Protocol=LINKAGE, in step 744, the process routes the outbound buy order to Away Market B using the intermarket linkage.

Accordingly, the outbound routed order on behalf of underlying Buy Order F looks like this:
→Buy 20 @ 2.05, Capacity=PA, Time In Force=IOC, Destination=Away Market B, Routing Protocol=LINKAGE As the process has already retrieved Away Market B's "Routing Behavior" parameter in step 734, it bypasses step 745. In step 746, the process checks if the routed order should decrement Away Market B's offer size or not. As Routing Behavior '5' does indeed decrement the quotes, the process continues to step 748, where it initiates the "Decrement Away Market Offer Process" and proceeds to step 900 of FIG. 9. Remaining Portion of Away Market B's Offer is Decremented (Quote is Fully Satisfied)

In step 902, the process retrieves the computed SatisfiedOfferQty for Away Market B (40 contracts). In step 904, the process increments the SatisfiedOfferQty (40) by the number of contracts it has just routed (20) to yield an updated SatisfiedOfferQty=60. In step 906, the process retrieves the UnsatisfiedOfferQty for Away Market B (20 contracts). In step 908, it decrements the value by the number of contracts it just routed (20) to yield an updated UnsatisfiedOfferQty=0. Away Market B's offer is now fully decremented, i.e., has been fully satisfied and the obligation to its quote is fully met. In step 910, the process returns to the step where it was originally invoked, back to step 748 of FIG. 7B.
→The NBBO is still 1.95 to 2.05 (210×130)

The virtual consolidated order and quote list now looks like this:

| Bids | | Offers | |
|---|---|---|---|
| LMM: | Bid 70 @ 1.95 | Away Market B: | Offer 60 @ 2.05 |
| | | SatisfiedOfferQty = 60 ← | |
| | | UnsatisfiedOfferQty = 0 ← | |

-continued

| Bids | | Offers | |
|---|---|---|---|
| Away Market D: | Bid 50 @ 1.95 | Away Market A: | Offer 70 @ 2.05 |
| | | SatisfiedOfferQty = 0 | |
| | | UnsatisfiedOfferQty = 70 | |
| Away Market B: | Bid 90 @ 1.95 | LMM: | Offer 40 @ 2.10 |
| Order A: | Buy 20 @ 1.90 | MM2: | Offer 20 @ 2.10 |
| MM2: | Bid 70 @ 1.90 | Away Market D: | Offer 50 @ 2.10 |
| Away Market C: | Bid 40 @ 1.90 | Away Market C: | Offer 30 @ 2.10 |
| Order B: | Buy 10 @ 1.85 | Order D: | Sell 40 @ 2.15 |
| Away Market A: | Bid 30 @ 1.85 | | |

The process continues to step 750, where it checks if incoming Buy Order F still has quantity available to trade. As it still has 100 contracts remaining, the process continues to step 752, where it returns to the step where the procedure was originally invoked, back to step 518 in FIG. 5.

The process then continues to step 524, where it checks if there are additional away markets at the NBO. As Away Market A is also offering at 2.05, the NBO, the process continues to step 526, where it retrieves Away Market A's Offer.
Away Market A is also Eligible to Receive a Routed Customer Order The process returns to step 510, where it checks if the Routing Table includes an active rule for Away Market A that accepts Capacity=C orders that are routed using Routing Protocol=LINKAGE. As shown below, Away Market A's routing rule does indeed allow Capacity=C orders to be routed using LINKAGE.

The process retrieves the routing rule for Away Market A in step 512:

| | | | Routing Table | | | | | | |
|---|---|---|---|---|---|---|---|---|---|
| Destination | Routing Priority | Capacity | Routing Behavior | Routing Protocol | Route Preference Style | Auto. Time-out | Over-size Weight | Max. Route Size | Max. Route Style |
| Away Market A | 5 | C, MM | 5 | LINKAGE | IOC | | | | |

The process continues to step 514, where it checks if it should evaluate the UnsatisfiedOfferQty of Away Market A or not. As Routing Behavior '5' specifies that orders are routed to away markets only if their quotes are not completely satisfied, the process continues to step 516. In step 516, it checks if Away Market A's UnsatisfiedOfferQty (70 contracts) is greater than zero. As no buy orders have been routed to Away Market A yet and its entire offer size is eligible for routing, the process continues to step 518.
Outbound Order with Capacity=PA is Generated on Behalf of Order F and Routed to Away Market A Using The Intermarket Linkage In step 518, the process initiates the "Generate Outbound Routed Buy Order Process," and proceeds to step 700 in FIG. 7A.

In step 702, the process retrieves the OutboundOrderCapacity (the value "PA" was previously derived in step 606 of FIG. 6) and attaches it to the outbound linkage order that is being generated now. In step 704, the process retrieves the "Route Preference Style" parameter from Away Market A's routing rule. In step 706, it checks if Route Preference Style=DAY or IOC. As the Route Preference Style=IOC, the process continues to step 714, where it sets the OutboundBuyOrderTimeInForce="IOC." In step 716, it derives the OutboundOrderTimeout by adding 5 seconds to the current time. Accordingly, if Away Market A does not fill the routed order within 5 seconds, the market center 20 can consider it to be expired, and can reject a fill that is received after the order times out.

The process continues to step 718, where it sets the OutboundBuyOrderPrice equal to Away Market A's disseminated offer price (2.05). The process continues to step 720, where it retrieves the "Maximum Route Size" parameter from Away Market A's routing rule. In step 722, it checks if the Maximum Route Size is greater than zero. As this parameter is not set for Away Market A, the process continues to step 726, where it retrieves the "Oversize Weight" parameter from Away Market A's routing rule. In step 728, it checks if the Oversize Weight is greater than zero. As this parameter is not set for Away Market A, the process continues to step 734.

In step 734, the process retrieves the "Routing Behavior" parameter for Away Market A (Routing Behavior=5). In step 736, the process checks whether it should route up to the UnsatisfiedOfferQty or it should route up to the full disseminated offer size. As Routing Behavior '5' specifies that the process should route up to the UnsatisfiedOfferQty, the process continues to step 738, where it sets the OutboundBuyOrderQty=70, the lesser of Away Market A's UnsatisfiedOfferQty (70 contracts) and incoming Buy Order F's remaining quantity (100 contracts).

The process continues to step 742, where it retrieves the "Routing Protocol" parameter specified for Away Market A on its routing rule. As the Routing Protocol=LINKAGE, in step 744, the process routes the outbound buy order to Away Market A using the intermarket linkage.

Accordingly, the outbound routed order on behalf of underlying Buy Order F looks like this:

→Buy 70 @ 2.05, Capacity=PA, Time In Force=IOC, Destination=Away Market A, Routing Protocol=LINKAGE In step 746, the process checks if the routed order should decrement Away Market A's offer size or not. As Routing Behavior '5' does indeed decrement the quotes, the process continues to step 748, where it initiates the "Decrement Away Market Offer Process" and proceeds to step 900 of FIG. 9.

Away Market A's Offer is Completely Decremented (Quote is Fully Satisfied)

In step 902, the process retrieves the computed SatisfiedOfferQty for Away Market A (zero contracts). In step 904, the process increments the SatisfiedOfferQty (0) by the number of contracts it has just routed (70) to yield an updated SatisfiedOfferQty=70. In step 906, the process retrieves the UnsatisfiedOfferQty for Away Market A (70 contracts). In step 908, it decrements the value by the number of contracts it just routed (70) to yield an updated UnsatisfiedOfferQty=0. Away Market A's offer is now fully decremented, i.e., has been fully satisfied and the obligation to its quote is fully met. In step 910, the process returns to the step where it was originally invoked, back to step 748 of FIG. 7B.

→The NBBO is still 1.95 to 2.05 (210×130)

The virtual consolidated order and quote list now looks like this:

| Bids | | Offers | |
|---|---|---|---|
| LMM: | Bid 70 @ 1.95 | Away Market B: | Offer 60 @ 2.05 |
| | | SatisfiedOfferQty = 60 | |
| | | UnsatisfiedOfferQty = 0 | |
| Away Market D: | Bid 50 @ 1.95 | Away Market A: | Offer 70 @ 2.05 |
| | | SatisfiedOfferQty = 70 ← | |
| | | UnsatisfiedOfferQty = 0 ← | |
| Away Market B: | Bid 90 @ 1.95 | LMM: | Offer 40 @ 2.10 |
| Order A: | Buy 20 @ 1.90 | MM2: | Offer 20 @ 2.10 |
| MM2: | Bid 70 @ 1.90 | Away Market D: | Offer 50 @ 2.10 |
| Away Market C: | Bid 40 @ 1.90 | Away Market C: | Offer 30 @ 2.10 |
| Order B: | Buy 10 @ 1.85 | Order D: | Sell 40 @ 2.15 |
| Away Market A: | Bid 30 @ 1.85 | | |

The process continues to step 750, where it checks if incoming Buy Order F has any quantity available to trade. As it still has 30 contracts remaining, the process continues to step 752, where it returns to the step where the procedure was originally invoked, back to step 518 in FIG. 5.

All Away Markets at the NBO have Been Satisfied; Remaining Quantity of Order F is Posted, Locking the Market The process then continues to step 524, where it checks if there are additional away markets at the NBO. As there are no additional unsatisfied away markets quoting at the NBO, the process continues to step 528, where it initiates the "Excess Marketable Buy Order Quantity Remains Process," and proceeds to step 1000 in FIG. 10.

In step 1002, the process checks if the excess quantity of incoming Buy Order F should be canceled back to the sender. As current marketplace rules allow orders to be posted once all away markets at the NBO have been fully satisfied using the intermarket linkage, the order does not need to be canceled, and the process continues to step 1008. In step 1008, the process checks if incoming Buy Order F has a limit price. As it does, the process continues to step 1016, where it checks if incoming Buy Order F's price (2.05) is greater than the NBO (2.05). As the prices are equal, the process continues to step 1020, where it checks if incoming Buy Order F is allowed to lock the NBO. As current marketplace rules allow incoming Buy Order F to lock the NBO at this time, the process continues to step 1022, where it inserts incoming Buy Order F in price/time priority in the Display Order Process of the internal order book 29a disseminates it to the public order book. The process terminates in step 1024 as indicated.

→The NBBO is now 2.05 to 2.05 (30×130). The market is locked.

The virtual consolidated order and quote list now looks like this:

| Bids | | Offers | |
|---|---|---|---|
| Order F: | Buy 30 @ 2.05 ← | Away Market B: | Offer 60 @ 2.05 |
| | | SatisfiedOfferQty = 60 | |
| | | UnsatisfiedOfferQty = 0 | |
| LMM: | Bid 70 @ 1.95 | Away Market A: | Offer 70 @ 2.05 |
| | | SatisfiedOfferQty = 70 | |
| | | UnsatisfiedOfferQty = 0 | |
| Away Market D: | Bid 50 @ 1.95 | LMM: | Offer 40 @ 2.10 |

-continued

| | Bids | | Offers |
|---|---|---|---|
| Away Market B: | Bid 90 @ 1.95 | MM2: | Offer 20 @ 2.10 |
| Order A: | Buy 20 @ 1.90 | Away Market D: | Offer 50 @ 2.10 |
| MM2: | Bid 70 @ 1.90 | Away Market C: | Offer 30 @ 2.10 |
| Away Market C: | Bid 40 @ 1.90 | Order D: | Sell 40 @ 2.15 |
| Order B: | Buy 10 @ 1.85 | | |
| Away Market A: | Bid 30 @ 1.85 | | |

The internal order book 29a now looks like this:

| Bids | | Offers | |
|---|---|---|---|
| Order F: | Buy 30 @ 2.05 ← | Order D: | Sell 40 @ 2.15 |
| Order A: | Buy 20 @ 1.90 | | |
| Order B: | Buy 10 @ 1.85 | | |

→The market center BBO is now 2.05 to 2.10 (30×60)
The public order book now looks like this:

| Bids | Offers |
|---|---|
| 30 @ 2.05 ← | 60 @ 2.10 |
| 70 @ 1.95 | 40 @ 2.15 |
| 90 @ 1.90 | |
| 10 @ 1.85 | |

The virtual consolidated order and quote list is deleted from local memory.
Away Market B Fills Order E
→Away Market B fills the 40 contracts routed to it on behalf of Buy Order E When the order matching engine 21 receives a fill for a routed buy order, it initiates the "Away Market Fills or Declines Routed Buy Order Process" in step 1100 of FIG. 11. In step 1102, the process checks if Away Market B filled any portion of the linkage order routed on behalf of Buy Order E. As it did, in step 1106, the process adds the Fill quantity (40 contracts) to Buy Order E's previous matched quantity (20 contracts) to derive a cumulative matched quantity of 60 contracts. Buy Order E is completely filled.

In step 1108, the process checks if Buy Order E still has any quantity available to trade. As it does not, the process continues to step 1126, where it checks if Away Market B declined any portion of the linkage order routed on behalf of Buy Order E. As it did not, the process continues to step 1128, where it terminates as indicated.
Away Market B Fills Order F
→Away Market B fills the 20 contracts routed to it on behalf of Buy Order F When the order matching engine 21 receives a fill for a routed buy order, it initiates the "Away Market Fills or Declines Routed Buy Order Process" in step 1100 of FIG. 11. In step 1102, the process checks if Away Market B filled any portion of the linkage order routed on behalf of Buy Order F. As it did, in step 1106, the process adds the Fill quantity (20 contracts) to Buy Order F's previous matched quantity (zero contracts) to derive a cumulative matched quantity of 20 contracts. It should be noted that Buy Order F still has 70 contracts outstanding from Away Market A.

In step 1108, the process checks if Buy Order F still has any quantity available to trade. As it does (it has 30 contracts posted to the books), the process continues to step 1110, where it checks if Buy Order F's order type (regular limit order) allows additional contracts to be routed to Away Market B or not. According to the rules for regular limit orders, additional quantity of Buy Order F is not routed to Away Market B in response to this fill.

In step 1126, the process checks if Away Market B declined any portion of the linkage order routed on behalf of Buy Order F. As it did not, the process continues to step 1128, where it terminates as indicated.
Away Market A Fills Order F
→Away Market A fills the 70 contracts routed to it on behalf of Buy Order F When the order matching engine 21 receives a fill for a routed buy order, it initiates the "Away Market Fills or Declines Routed Buy Order Process" in step 1100 of FIG. 11. The process executes steps 1102 through 1128 in a manner similar to that described in the previous step for the fill from Away Market B. The process adds the Fill quantity (70 contracts) to Buy Order F's previous matched quantity (20 contracts) to derive a cumulative matched quantity of 90 contracts. No additional contracts of Buy Order F are routed to Away Market A, and the order remains posted.
Away Market B Moves its Offer off the NBO, and its Quote is Eligible to Receive Additional Routed Orders
→Away Market B fades its offer to 60 @ 2.10, moving off the NBO The away market BBO book 25a now looks like this:

| Bids | Offers |
|---|---|
| Away Market D: Bid 50 @ 1.95 | Away Market A: Offer 70 @ 2.05 |
| Away Market B: Bid 90 @ 1.95 | Away Market D: Offer 50 @ 2.10 |
| Away Market C: Bid 40 @ 1.90 | Away Market C: Offer 30 @ 2.10 |
| Away Market A: Bid 30 @ 1.85 | Away Market B: Offer 60 @ 2.10 ← |

→The NBBO is now 2.05 to 2.05 (30×70). The market is still locked.

The quote engine 23a notifies the order matching engine 21 of the change to Away Market B's offer, and the process initiates the "Away Market Refreshes its Offer Process" in step 1200 of FIG. 12A. In step 1201, the order matching engine 21 creates a new virtual consolidated order and quote list by combining the away market BBO book 25a, the market maker quote book 33a, and the internal order book 29a. The virtual consolidated order and quote list now looks like this:

| | Bids | | Offers |
|---|---|---|---|
| Order F: | Buy 30 @ 2.05 | Away Market A: | Offer 70 @ 2.05 |
| | | | SatisfiedOfferQty = 70 |
| | | | UnsatisfiedOfferQty = 0 |
| LMM: | Bid 70 @ 1.95 | LMM: | Offer 40 @ 2.10 |
| Away Market D: | Bid 50 @ 1.95 | MM2: | Offer 20 @ 2.10 |
| Away Market B: | Bid 90 @ 1.95 | Away Market D: | Offer 50 @ 2.10 |
| Order A: | Buy 20 @ 1.90 | Away Market C: | Offer 30 @ 2.10 |
| MM2: | Bid 70 @ 1.90 | Away Market B: | Offer 60 @ 2.10 ← |
| | | | SatisfiedOfferQty = 60 |
| | | | UnsatisfiedOfferQty = 0 |

-continued

| | Bids | | Offers |
|---|---|---|---|
| Away Market C: | Bid 40 @ 1.90 | Order D: | Sell 40 @ 2.15 |
| Order B: | Buy 10 @ 1.85 | | |
| Away Market A: | Bid 30 @ 1.85 | | |

In step 1202, the process retrieves Away Market B's newly disseminated offer (60 @ 2.10). In step 1204, it checks if the offer price changed. As Away Market B's previous offer price was 2.05, the process continues to step 1209, where it checks if Away Market B's SatisfiedOfferQty is greater than zero. As Away Market B's SatisfiedOfferQty is currently=60, in step 1210, the process resets the SatisfiedOfferQty for Away Market B=zero. In step 1212, the process resets the UnsatisfiedOfferQty for Away Market B=60, its disseminated offer size. Away Market B is eligible to receive routed orders again, but only after all higher-ranked interest has been satisfied first.

The virtual consolidated order and quote list now looks like this:

| | Bids | | Offers |
|---|---|---|---|
| Order F: | Buy 30 @ 2.05 | Away Market A: | Offer 70 @ 2.05<br>SatisfiedOfferQty = 70<br>UnsatisfiedOfferQty = 0 |
| LMM: | Bid 70 @ 1.95 | LMM: | Offer 40 @ 2.10 |
| Away Market D: | Bid 50 @ 1.95 | MM2: | Offer 20 @ 2.10 |
| Away Market B: | Bid 90 @ 1.95 | Away Market D: | Offer 50 @ 2.10 |
| Order A: | Buy 20 @ 1.90 | Away Market C: | Offer 30 @ 2.10 |
| MM2: | Bid 70 @ 1.90 | Away Market B: | Offer 60 @ 2.10<br>SatisfiedOfferQty = 0 ←<br>UnsatisfiedOfferQty = 60 ← |
| Away Market C: | Bid 40 @ 1.90 | Order D: | Sell 40 @ 2.15 |
| Order B: | Buy 10 @ 1.85 | | |
| Away Market A: | Bid 30 @ 1.85 | | |

The process continues to step 1214, where it checks if there are any "dark" buy orders that can now be displayed. As there are presently no "dark" buy orders in the internal order book 29a, the process continues to step 1218. In step 1218, the process checks if Away Market B's new offer is at the NBO. As it is inferior to the NBO, the process continues to step 1222, where it terminates as indicated. The virtual consolidated order and quote list is deleted from local memory.

Away Market A Moves its Offer off the NBO, and its Quote is Eligible to Receive Additional Routed Orders →Away Market A fades its offer to 70 @ 2.10, moving off the NBO The away market BBO book 25a now looks like this:

| Bids | Offers |
|---|---|
| Away Market D: Bid 50 @ 1.95 | Away Market D: Offer 50 @ 2.10 |
| Away Market B: Bid 90 @ 1.95 | Away Market C: Offer 30 @ 2.10 |
| Away Market C: Bid 40 @ 1.90 | Away Market B: Offer 60 @ 2.10 |
| Away Market A: Bid 30 @ 1.85 | Away Market A: Offer 70 @ 2.10 ← |

→The NBBO is now 2.05 to 2.10 (30×270). The market is no longer locked.

The quote engine 23a notifies the order matching engine 21 of the change to Away Market A's offer and the NBO, and the process initiates the "Away Market Refreshes its Offer Process" in step 1200 of FIG. 12A. In step 1201, the order matching engine 21 creates a new virtual consolidated order and quote list by combining the away market BBO book 25a, the market maker quote book 33a, and the internal order book 29a. The virtual consolidated order and quote list now looks like this:

| | Bids | | Offers |
|---|---|---|---|
| Order F: | Buy 30 @ 2.05 | LMM: | Offer 40 @ 2.10 |
| LMM: | Bid 70 @ 1.95 | MM2: | Offer 20 @ 2.10 |
| Away Market D: | Bid 50 @ 1.95 | Away Market D: | Offer 50 @ 2.10 |
| Away Market B: | Bid 90 @ 1.95 | Away Market C: | Offer 30 @ 2.10 |
| Order A: | Buy 20 @ 1.90 | Away Market B: | Offer 60 @ 2.10 |
| MM2: | Bid 70 @ 1.90 | Away Market A: | Offer 70 @ 2.10 ←<br>SatisfiedOfferQty = 70<br>UnsatisfiedOfferQty = 0 |
| Away Market C: | Bid 40 @ 1.90 | Order D: | Sell 40 @ 2.15 |
| Order B: | Buy 10 @ 1.85 | | |
| Away Market A: | Bid 30 @ 1.85 | | |

In step 1202, the process retrieves Away Market A's newly disseminated offer (70 @ 2.10). In step 1204, it checks if the offer price changed. As Away Market A's previous offer price was 2.05, the process continues to step 1209, where it checks if Away Market A's SatisfiedOfferQty is greater than zero. As Away Market A's SatisfiedOfferQty is currently=70, in step 1210, the process resets the SatisfiedOfferQty for Away Market A=zero. In step 1212, the process resets the UnsatisfiedOfferQty for Away Market A=70, its disseminated offer size. Away Market A is eligible to receive routed orders again, but only after all higher-ranked interest has been satisfied first.

The virtual consolidated order and quote list now looks like this:

| | Bids | | Offers |
|---|---|---|---|
| Order F: | Buy 30 @ 2.05 | LMM: | Offer 40 @ 2.10 |
| LMM: | Bid 70 @ 1.95 | MM2: | Offer 20 @ 2.10 |
| Away Market D: | Bid 50 @ 1.95 | Away Market D: | Offer 50 @ 2.10 |
| Away Market B: | Bid 90 @ 1.95 | Away Market C: | Offer 30 @ 2.10 |
| Order A: | Buy 20 @ 1.90 | Away Market B: | Offer 60 @ 2.10 |
| MM2: | Bid 70 @ 1.90 | Away Market A: | Offer 70 @ 2.10<br>SatisfiedOfferQty = 0 ←<br>UnsatisfiedOfferQty = 70 ← |
| Away Market C: | Bid 40 @ 1.90 | Order D: | Sell 40 @ 2.15 |
| Order B: | Buy 10 @ 1.85 | | |
| Away Market A: | Bid 30 @ 1.85 | | |

The process continues to step 1214, where it checks if there are any "dark" buy orders that can now be displayed. As there are presently no "dark" buy orders in the internal order book 29a, the process continues to step 1218. In step 1218, the process checks if Away Market A's new offer is at the NBO. As it is at the NBO, the process continues to step 1220, where it checks if there are any queued market buy orders waiting to execute. As there are none, the process continues to step 1222, where it terminates as indicated. The virtual consolidated order and quote list is deleted from local memory.

Examples of Order Routing Behavior Using a Private "Direct" Connection

The examples that follow next illustrate how the Routing Table of this embodiment could be easily configured to accommodate a routing model that is different from the legacy intermarket linkage. Such a business model could replace the legacy intermarket linkage model, or could execute concurrently with the legacy model. By way of example, issues that have assigned market makers could be configured to route according to the intermarket linkage model illustrated in the previous section, whereas issues that do not have assigned market makers could be configured to route according to a private direct connection model. The market center 20 could also elect to route orders using a direct connection for business reasons such performance or cost, even if an issue has market makers and is entitled to route using the intermarket linkage. An exemplary private direct connection model is illustrated below.

The exemplary direct routing model implements the following business rules. It should be noted that these rules are only meant to illustrate how the Routing Table can support different routing rules in effect for the options marketplace, and these rules are only exemplary:

- Orders are not allowed to lock the NBBO after routing using a private direct connection instead of the intermarket linkage
- If an order on behalf of a customer has satisfied all the away markets at the NBBO and still has excess quantity available to trade, the remaining portion of the order can be stored on the internal order book as a "dark" order until such time as the NBBO moves away and it can be displayed without locking the market
- If an order on behalf of a non-customer is routed, any remaining portion of the order that cannot route must be canceled instead and cannot be stored as a "dark" order
- If an order on behalf of a non-customer cannot route to any away market at the NBBO, then it must be canceled and cannot be stored as a "dark" order Based on these exemplary marketplace rules for direct routing, in the series of examples that follow, the market center 20 has configured its direct connection routing rules so that orders routed on behalf of customer accounts behave as they do when routed using the intermarket linkage model, except that any oversize quantity in excess of the NBBO size cannot lock the market, and will go "dark" instead. This routing model is referred to as Routing Behavior '1.' Routed customer orders decrement the away market quotes in the same manner as in Routing Behavior '5,' as illustrated in the examples of the prior section.

However, in this example, the Routing Table has been configured so that orders routed on behalf of non-customer accounts will route regardless of any prior orders already routed, and therefore do not decrement the away market quotes, nor check whether the away market quotes have been satisfied or not. As non-customer orders are not allowed to go "dark" according to the exemplary marketplaces rules for direct routing, any excess quantity remaining after a non-customer order has routed to the fullest extent possible is canceled instead. This routing model is referred to as Routing Behavior '4.'

Additionally, for the purpose of illustrating additional routing parameters, the examples that follow include a case where an order is routed with a quantity that exceeds the away market's disseminated quote size, and include a different case where an order is routed with a quantity that is less than the away market's disseminated quote size.

The Exemplary Marketplace and its Direct Routing Rules are Shown

→The NBBO is 1.95 to 2.05 (140×150)

The away market BBO book 25a looks like this:

| Bids | Offers |
| --- | --- |
| Away Market D: Bid 50 @ 1.95 | Away Market A: Offer 70 @ 2.05 |
| Away Market B: Bid 90 @ 1.95 | Away Market B: Offer 60 @ 2.05 |
| Away Market C: Bid 40 @ 1.90 | Away Market D: Offer 50 @ 2.10 |
| Away Market A: Bid 30 @ 1.85 | Away Market C: Offer 30 @ 2.10 |

As this issue does not have assigned market makers, it does not have a market maker quote book 33a.

The internal order book 29a looks like this:

| | Bids | | Offers |
| --- | --- | --- | --- |
| Order A: | Buy 20 @ 1.90 | Order C: | Sell 20 @ 2.05 |
| Order B: | Buy 10 @ 1.85 | Order D: | Sell 40 @ 2.15 |

→The market center BBO is 1.90 to 2.05 (20 20)

The public order book looks like this:

| Bids | Offers |
| --- | --- |
| 20 @ 1.90 | 20 @ 2.05 |
| 10 @ 1.85 | 40 @ 2.15 |

As shown in the exemplary Routing Table below, the routing rules for four away markets have been configured. Each away market has two routing rules: one for customer orders, and one for non-customer orders. All four away markets accept orders on behalf of customers (Capacity=C) and market makers (Capacity=MM). In addition, in this example, Away Market B also accepts orders on behalf of broker/dealers (Capacity=BD) and market professionals on other market centers (Capacity=FARM), whereas Away Market C also accepts orders on behalf of firms (Capacity=F).

| | | | Routing Table | | | | | | |
| --- | --- | --- | --- | --- | --- | --- | --- | --- | --- |
| Destination | Routing Priority | Capacity | Routing Behavior | Routing Protocol | Route Preference Style | Auto. Time-out | Over-size Weight | Max. Route Size | Max. Route Style |
| Away Market A | 6 | C | 1 | DIRECT | DAY | 3 | | | |
| Away Market A | 6 | MM | 4 | DIRECT | DAY | 3 | | | |
| Away Market B | 3 | C | 1 | DIRECT | DAY | 10 | | | |

-continued

Routing Table

| Destination | Routing Priority | Capacity | Routing Behavior | Routing Protocol | Route Preference Style | Auto. Time-out | Over-size Weight | Max. Route Size | Max. Route Style |
|---|---|---|---|---|---|---|---|---|---|
| Away Market B | 3 | MM, BD, FARM | 4 | DIRECT | DAY | 10 | | 10 | 1 |
| Away Market C | 8 | C | 1 | DIRECT | DAY | 3 | | | |
| Away Market C | 8 | F, MM | 4 | DIRECT | DAY | 3 | 2 | | |
| Away Market D | 5 | C | 1 | DIRECT | DAY | 3 | | | |
| Away Market D | 5 | MM | 4 | DIRECT | DAY | 3 | | 10 | 1 |

Incoming Order H (Capacity=C) is Received

In step 1400, the order matching engine 21 receives the following order on behalf of a customer:

Order H: Sell 170 @ 1.95, Capacity=C

In step 1401, the process retrieves the NBB (1.95). In step 1402, the process checks if incoming Sell Order H is executable. As incoming Sell Order H's price (1.95) is equal to the NBB (1.95), the order is indeed executable. The process continues to step 1404, where it combines the away market BBO book 25a and the internal order book 29a together in a virtual consolidated order and quote list, which it ranks in price/display/time priority but with a preference for resident interest over away market interest at the same price level. As this issue does not have assigned market makers, no market maker quote book 33a exists.

The virtual consolidated order and quote list looks like this:

| Bids | | Offers | |
|---|---|---|---|
| Away Market D: | Bid 50 @ 1.95 | Order C: | Sell 20 @ 2.05 |
| Away Market B: | Bid 90 @ 1.95 | Away Market A: | Offer 70 @ 2.05 |
| Order A: | Buy 20 @ 1.90 | Away Market B: | Offer 60 @ 2.05 |
| Away Market C: | Bid 40 @ 1.90 | Away Market D: | Offer 50 @ 2.10 |
| Order B: | Buy 10 @ 1.85 | Away Market C: | Offer 30 @ 2.10 |
| Away Market A: | Bid 30 @ 1.85 | Order D: | Sell 40 @ 2.15 |

Incoming Order H is Eligible to Route

The process continues to step 1406, where it retrieves the best bid in the virtual consolidated order and quote list, which is Away Market D's bid. In step 1408, the process checks if incoming Sell Order H's price (1.95) is less than or equal to Away Market D's bid price (1.95). As the prices are equal, the process continues to step 1418, where it checks if the bid is on or off the market center 20. As the bid is an away market quote, the process continues to step 1428. In step 1428, the process checks if incoming Sell Order H is an order type that is eligible for routing. As incoming Sell Order H is a regular limit order, it is eligible to route, so the process continues to step 1442, where it initiates the "Determine Away Market Bid Eligibility Process," and proceeds to step 1500 in FIG. 14.

Incoming Order H can Route with Capacity=C Using the Direct Protocol

In step 1501, the process initiates the "Determine Outbound Order Capacity and Protocol Process," and proceeds to step 600 in FIG. 6.

In step 602, the process checks if the Capacity specified on incoming Sell Order H is "C" (customer). As it is, the process continues to step 604, where it checks if this issue has an assigned lead market maker. As this issue does not have an assigned lead market maker, the process continues to step 612, where it sets the OutboundOrderCapacity="C" (customer). The process continues to step 614, where it sets the OutboundRoutingProtocol="DIRECT" (private network connection). The process then terminates in step 616, where it returns to the step where it was originally invoked, back to step 1501 in FIG. 14.

Away Markets at the NBB are Evaluated as Possible Routing Destinations

The process continues to step 1502, where it checks if there is more than one away market quoting at the NBB. As both Away Market D and Away Market B are bidding at 1.95, the NBB, the process continues to step 1504. In step 1504, the process retrieves the "Routing Priority" parameter from the Routing Table for Away Markets D and B:

| Destination | Routing Priority |
|---|---|
| Away Market B | 3 |
| Away Market D | 5 |

Away Market D has the Highest Ranking at the NBB

As shown in the Routing Table, Away Market B has been assigned a Routing Priority=3, while Away Market D has been assigned a Routing Priority=5. Accordingly, in step 1506, the process determines that Away Market D has a higher ranking than Away Market B. As Away Market D's bid already has the highest ranking in the virtual consolidated order and quote list, it does not need to be re-ranked.

As indicated in the routing rules shown above, Away Market D's Routing Behavior for outbound customer orders is '1,' wherein orders are sent only if the quote is not fully satisfied. Accordingly, the process maintains a SatisfiedBidQty and an UnsatisfiedBidQty for Away Market D. As no customer sell orders have been routed to Away Market D's bid yet, its SatisfiedBidQty=0 and its UnsatisfiedBidQty=50, its full disseminated bid size. Similarly, Away Market B's Routing Behavior for customer orders is also '1,' so the process sets its SatisfiedBidQty=0 and its UnsatisfiedBidQty=90, its full disseminated bid size.

The virtual consolidated order and quote list looks like this:

| Bids | | Offers | |
|---|---|---|---|
| Away Market D: | Bid 50 @ 1.95 | Order C: | Sell 20 @ 2.05 |
| SatisfiedBidQty = 0 ← | | | |
| UnsatisfiedBidQty = 50 ← | | | |

-continued

| | Bids | | Offers |
|---|---|---|---|
| Away Market B: SatisfiedBidQty = 0 ← UnsatisfiedBidQty = 90 ← | Bid 90 @ 1.95 | Away Market A: | Offer 70 @ 2.05 |
| Order A: | Buy 20 @ 1.90 | Away Market B: | Offer 60 @ 2.05 |
| Away Market C: | Bid 40 @ 1.90 | Away Market D: | Offer 50 @ 2.10 |
| Order B: | Buy 10 @ 1.85 | Away Market C: | Offer 30 @ 2.10 |
| Away Market A: | Bid 30 @ 1.85 | Order D: | Sell 40 @ 2.15 |

Away Market D is Eligible to Receive a Routed Customer Order Using the Direct Protocol In step 1508, the process retrieves the bid from the highest-ranked away market, Away Market D. In step 1510, the process checks if the Routing Table includes an active rule for Away Market D that accepts Capacity=C orders that are routed using Routing Protocol=DIRECT. As shown below, Away Market D's routing rule does indeed allow Capacity=C orders to be routed using DIRECT.

The process retrieves the routing rule for Away Market D for Capacity=C orders in step 1512:

Routing Table

| Destination | Routing Priority | Capacity | Routing Behavior | Routing Protocol | Route Preference Style | Auto. Time-out | Over-size Weight | Max. Route Size | Max. Route Style |
|---|---|---|---|---|---|---|---|---|---|
| Away Market D | 5 | C | 1 | DIRECT | DAY | 3 | | | |

In step 1514, the process checks if Away Market D's UnsatisfiedBidQty should be evaluated or not. As Routing Behavior '1' specifies that orders are routed to away markets only if their quotes are not completely satisfied, the process continues to step 1516, where it checks if Away Market D's UnsatisfiedBidQty is greater than zero. As Away Market D's UnsatisfiedBidQty=50, the process continues to step 1518.

Outbound Order with Capacity=C is Generated on Behalf of Order H and Routed to Away Market D Using the Direct Protocol In step 1518, the process initiates the "Generate Outbound Routed Sell Order Process," and proceeds to step 1700 in FIG. 15A.

In step 1702, the process retrieves the OutboundOrderCapacity (the value "C" was previously derived in step 612 of FIG. 6) and attaches it to the outbound order that is being generated now. In step 1704, the process retrieves the "Route Preference Style" parameter from Away Market D's routing rule. In step 1706, it checks if Route Preference Style=DAY or IOC. As the Route Preference Style=DAY, the process continues to step 1708, where it sets the OutboundSellOrderTimeInForce="DAY." In step 1710, the process retrieves the "Automatic Timeout" parameter from Away Market D's routing rule. In step 1712, the process computes the OutboundOrderTimeout by adding 3 seconds, the specified Automatic Timeout, to the current time. The process continues to step 1718, where it sets the OutboundSellOrderPrice=1.95, Away Market D's bid price.

The process continues to step 1720, where it retrieves the "Maximum Route Size" parameter from Away Market D's routing rule. In step 1722, it checks if the Maximum Route Size is greater than zero. As this parameter is not set in Away Market D's routing rule, the process continues to step 1726, where it retrieves the "Oversize Weight" parameter from Away Market D's routing rule. In step 1728, it checks if the Oversize Weight is greater than zero. As this parameter is not set in Away Market D's routing rule, the process continues to step 1734.

In step 1734, the process retrieves the "Routing Behavior" parameter for Away Market D (Routing Behavior=1). In step 1736, the process checks whether it should route up to the UnsatisfiedBidQty, or up to the full disseminated bid size. As Routing Behavior '1' specifies that the process should route up to the UnsatisfiedBidQty, the process continues to step 1738, where it sets the OutboundSellOrderQty=50, the lesser of Away Market D's UnsatisfiedBidQty (50 contracts) and incoming Sell Order H's order size (170 contracts).

The process continues to step 1742, where it retrieves the "Routing Protocol" parameter specified for Away Market D on its routing rule. As the Routing Protocol=DIRECT, in step 1744, the process routes the outbound sell order to Away Market D using the private "direct" connection.

Accordingly, the outbound routed order on behalf of underlying Sell Order H looks like this:
→Sell 50 @ 1.95, Capacity=C, Time In Force=DAY, Destination=Away Market D, Routing Protocol=DIRECT If Away Market D does not fill or decline the routed order before the OutboundOrderTimeout elapses, then the Routing Process automatically sends a Cancel message to Away Market D, and reinstates the 50 contracts back to Sell Order H.

As the process has already retrieved the "Routing Behavior" parameter in step 1734, it bypasses step 1745. In step 1746, the process checks if the routed order should decrement Away Market D's bid size or not. As Routing Behavior '1' does indeed decrement the quotes, the process continues to step 1748, where it initiates the "Decrement Away Market Bid Process" and proceeds to step 1900 of FIG. 17.

Away Market D's Bid is Decremented (Quote is Fully Satisfied)

In step 1902, the process retrieves the computed SatisfiedBidQty for Away Market D. As no orders were previously routed to Away Market D's bid, the SatisfiedBidQty=zero. In step 1904, the process increments the SatisfiedBidQty (0) by the number of contracts it just routed (50) to yield an updated SatisfiedBidQty=50. In step 1906, the process retrieves the UnsatisfiedBidQty for Away Market D (currently set to 50 as no Sell orders were previously routed to Away Market D). In step 1908, it decrements the value by the number of contracts it just routed (50) to yield an updated UnsatisfiedBidQty=0. In step 1910, the process returns to the step where it was originally invoked, back to step 1748 of FIG. 15B.

→The NBBO is still 1.95 to 2.05 (140×150)

The virtual consolidated order and quote list now looks like this:

|  | Bids | | Offers |
|---|---|---|---|
| Away Market D: | Bid 50 @ 1.95 | Order C: | Sell 20 @ 2.05 |
| SatisfiedBidQty = 50 ← | | | |
| UnsatisfiedBidQty = 0 ← | | | |
| Away Market B: | Bid 90 @ 1.95 | Away Market A: | Offer 70 @ 2.05 |
| SatisfiedBidQty = 0 | | | |
| UnsatisfiedBidQty = 90 | | | |
| Order A: | Buy 20 @ 1.90 | Away Market B: | Offer 60 @ 2.05 |
| Away Market C: | Bid 40 @ 1.90 | Away Market D: | Offer 50 @ 2.10 |
| Order B: | Buy 10 @ 1.85 | Away Market C: | Offer 30 @ 2.10 |
| Away Market A: | Bid 30 @ 1.85 | Order D: | Sell 40 @ 2.15 |

Away Market B is also Eligible to Receive a Routed Customer Order Using the Direct Protocol The process continues to step 1750, where it checks if incoming Sell Order H has any remaining quantity available to trade. As incoming Sell Order H still has 120 contracts remaining, the process continues to step 1752, where it returns to the step where it was originally invoked, back to step 1518 of FIG. 14. The process then continues to step 1524, where it checks if there are additional away markets at the NBB. As Away Market B is also at the NBB, the process continues to step 1526, where it retrieves Away Market B's bid and returns to step 1510, where it checks if the Routing Table includes an active rule for Away Market B that accepts Capacity=C orders that are routed using Routing Protocol=DIRECT. As shown below, Away Market B's routing rule does indeed allow Capacity=C orders to be routed using DIRECT.

The process retrieves the routing rule for Away Market B in step 1512:

| | | | | | Routing Table | | | | |
|---|---|---|---|---|---|---|---|---|---|
| Destination | Routing Priority | Capacity | Routing Behavior | Routing Protocol | Route Preference Style | Auto. Time-out | Over-size Weight | Max. Route Size | Max. Route Style |
| Away Market B | 3 | C | 1 | DIRECT | DAY | 10 | | | |

The process then continues to step 1514, where it checks if Away Market B's unsatisfied bid size should be evaluated or not. As Routing Behavior '1' specifies that orders are routed to away markets only if their quotes are not completely satisfied, the process continues to step 1516, where it checks if Away Market B's UnsatisfiedBidQty is greater than zero. As Away Market B's UnsatisfiedBidQty=90, the process continues to step 1518

Outbound Order with Capacity=C is Generated on Behalf of Order H and Routed to Away Market B Using the Direct Protocol In step 1518, the process initiates the "Generate Outbound Routed Sell Order Process," and proceeds to step 1700 in FIG. 15A.

In step 1702, the process retrieves the OutboundOrderCapacity (the value "C" was previously derived in step 612 of FIG. 6) and attaches it to the outbound order that is being generated now. In step 1704, the process retrieves the "Route Preference Style" parameter from Away Market B's routing rule. In step 1706, it checks if Route Preference Style=DAY or IOC. As the Route Preference Style=DAY, the process continues to step 1708, where it sets the OutboundSellOrderTimeInForce="DAY." In step 1710, the process retrieves the "Automatic Timeout" parameter from Away Market B's routing rule. In step 1712, the process computes the OutboundOrderTimeout by adding 10 seconds, the specified Automatic Timeout, to the current time. The process continues to step 1718, where it sets the OutboundSellOrderPrice=1.95, Away Market B's bid price.

The process continues to step 1720, where it retrieves the "Maximum Route Size" parameter from Away Market B's routing rule. In step 1722, it checks if the Maximum Route Size is greater than zero. As this parameter is not set in Away Market B's rule, the process continues to step 1726, where it retrieves the "Oversize Weight" parameter from Away Market B's routing rule. In step 1728, it checks if the Oversize Weight is greater than zero. As this parameter is not set in Away Market B's rule, the process continues to step 1734.

In step 1734, the process retrieves the "Routing Behavior" parameter for Away Market B (Routing Behavior=1). In step 1736, the process checks whether it should route up to the UnsatisfiedBidQty, or up to the full disseminated bid size. As Routing Behavior '1' specifies that the process should route up to the UnsatisfiedBidQty, the process continues to step 1738, where it sets the OutboundSellOrderQty=90, the lesser of Away Market D's UnsatisfiedBidQty (90 contracts) and incoming Sell Order H's remaining size (120 contracts).

The process continues to step 1742, where it retrieves the "Routing Protocol" parameter specified for Away Market B on its routing rule. As the Routing Protocol=DIRECT, in step 1744, the process routes the outbound sell order to Away Market B using the private "direct" connection.

Accordingly, the outbound routed order on behalf of underlying Sell Order H looks like this:
→Sell 90 @ 1.95, Capacity=C, Time In Force=DAY, Destination=Away Market B, Routing Protocol=DIRECT If Away Market B does not fill or decline the routed order before the OutboundOrderTimeout elapses, then the Routing Process automatically sends a Cancel message to Away Market B, and reinstates the 90 contracts back to Sell Order H.

As the process already retrieved the "Routing Behavior" for Away Market B in step 1734, it bypasses step 1745. In step 1746, the process checks if the routed order should decrement Away Market B's bid size or not. As Routing Behavior '1' does indeed decrement the quotes, the process continues to step 1748, where it initiates the "Decrement Away Market Bid Process" and proceeds to step 1900 of FIG. 17.

Away Market B's Bid is Decremented (Quote is Fully Satisfied)

In step 1902, the process retrieves the computed SatisfiedBidQty for Away Market B. As no orders were previously routed to Away Market B's bid, the SatisfiedBidQty=zero. In step 1904, the process increments the SatisfiedBidQty (0) by the number of contracts it just routed (90) to yield an updated SatisfiedBidQty=90. In step 1906, the process retrieves the UnsatisfiedBidQty for Away Market B (currently set to 90 as no Sell orders were previously routed to Away Market B's bid). In step 1908, it decrements the value by the number of contracts it just routed (90) to yield an updated Unsatisfied-BidQty=0. In step 1910, the process returns to the step where it was originally invoked, back to step 1748 of FIG. 15B.

The process continues to step 1750, where it checks if incoming Sell Order H has any quantity available to trade. As incoming Sell Order H still has 30 contracts available, the process continues to step 1752, where it returns to the step where it was originally invoked, back to step 1518 of FIG. 14.

The process continues to step 1524, where it checks if there are any additional away markets bidding at the NBB. As there are none, the process continues to step 1528, where it initiates the "Excess Marketable Sell Order Quantity Remains Process" and proceeds to step 2000 in FIG. 18.

Excess Quantity of Order H is Posted As a "Dark" Order to the Internal Order Book Only, and is Not Displayed to the Marketplace In step 2002, the process checks if the remaining quantity of incoming Sell Order H should be canceled or not. As previously described, the exemplary business rules of this embodiment allow the remaining quantity of an order on behalf of a customer to be temporarily hidden as a "dark" order after it has fully satisfied all away markets at the NBBO. As incoming Sell Order H has satisfied all away markets at the NBB and is accordingly not canceled in this embodiment, the process continues to step 2008, where it checks if incoming Sell Order H has a limit price or not. As it does, the process continues to step 2016, where it checks if incoming Sell Order H's price (1.95) is less than the NBB (1.95). As the prices are equal, the process continues to step 2020, where it checks if incoming Sell Order H is allowed to lock the NBB.

As incoming Sell Order H is not allowed to lock the NBB (in this embodiment, only orders routed using the intermarket linkage are allowed to contemporaneously lock the market), the process continues to step 2026, where it inserts incoming Sell Order H as a "dark" order in the internal order book 29a in price/time priority in the Display Order Process. The process does not disseminate the order to the public order book. As described in step 2028, "dark" Sell Order H is allowed to execute against incoming buy orders or market maker bids whose prices are greater than or equal to the NBB, 1.95. Such executions would be priced at "dark" Sell Order H's price of 1.95, just as if the order were displayed publicly. As described in step 2030, if the NBB price changes, then "dark" Sell Order H will be evaluated to see if it can be displayed without locking the NBB. The process then terminates in step 2032 as indicated.

→The NBBO is still 1.95 to 2.05 (140×150)

The virtual consolidated order and quote list now looks like this:

| Bids | | Offers | |
|---|---|---|---|
| Away Market D: | Bid 50 @ 1.95 | Order H: | Sell 30 @ 1.95 ← |
| SatisfiedBidQty = 50 | | | |
| UnsatisfiedBidQty = 0 | | | |
| Away Market B: | Bid 90 @ 1.95 | Order C: | Sell 20 @ 2.05 |
| SatisfiedBidQty = 90 ← | | | |
| UnsatisfiedBidQty = 0 ← | | | |
| Order A: | Buy 20 @ 1.90 | Away Market A: | Offer 70 @ 2.05 |
| Away Market C: | Bid 40 @ 1.90 | Away Market B: | Offer 60 @ 2.05 |
| Order B: | Buy 10 @ 1.85 | Away Market D: | Offer 50 @ 2.10 |
| Away Market A: | Bid 30 @ 1.85 | Away Market C: | Offer 30 @ 2.10 |
| | | Order D: | Sell 40 @ 2.15 |

The internal order book 29a now looks like this:

| Bids | | Offers | |
|---|---|---|---|
| Order A: | Buy 20 @ 1.90 | Order H: | Sell 30 @ 1.95 ← |
| Order B: | Buy 10 @ 1.85 | Order C: | Sell 20 @ 2.05 |
| | | Order D: | Sell 40 @ 2.15 |

→The market center BBO remains unchanged and is still 1.90 to 2.05 (20×20)

The public order book remains unchanged and still looks like this:

| Bids | Offers |
|---|---|
| 20 @ 1.90 | 20 @ 2.05 |
| 10 @ 1.85 | 40 @ 2.15 |

Away Market D Fills Order H

→Away Market D fills the 50 contracts routed to it on behalf of Sell Order H

When the order matching engine 21 receives a fill for a routed sell order, it initiates the "Away Market Fills or Declines Routed Sell Order Process" in step 2100 of FIG. 19. In step 2102, the process checks if Away Market D filled any portion of the order routed on behalf of Sell Order H. As it did, in step 2106, the process adds the Fill quantity (50 contracts) to Sell Order H's previous matched quantity (0 contracts) to derive a cumulative matched quantity of 50 contracts.

In step 2108, the process checks if Sell Order H still has any quantity available to trade. As it still has 30 contracts available, the process continues to step 2110, where it checks if Sell Order H's order type (regular limit order) allows additional contracts to be routed to Away Market D's unchanged bid or not. According to the rules for regular limit orders, additional quantity is not routed in response to a fill. Accordingly, Away Market D is not eligible to receive additional quantity of Sell Order H at the present time.

In step 2126, the process checks if Away Market D declined any portion of the order routed on behalf of Sell Order H. As it did not, the process continues to step 2128, where it terminates as indicated.

Away Market B Fills Order H

→Away Market B fills the 90 contracts routed to it on behalf of Sell Order H

When the order matching engine 21 receives a fill for a routed sell order, it initiates the "Away Market Fills or Declines Routed Sell Order Process" in step 2100 of FIG. 19. The process executes steps 2102 through 2128 as described in the previous step, adding the Fill (90 contracts) to Sell Order H's previous matched quantity (50) to derive a cumulative matched quantity of 140 contracts. As with Away Market D in the previous step, no additional quantity of Sell Order H is routed to Away Market B in response to the fill. The virtual consolidated order and quote list is deleted from local memory.

Incoming Order I (Capacity=BD) is Received

In step 1400, the order matching engine 21 receives the following order on behalf of a broker/dealer:

Order I: Sell 60 @ 1.95, Capacity=BD

In step 1401, the process retrieves the NBB (1.95). In step 1402, it checks if incoming Sell Order I is executable. As incoming Sell Order I's price (1.95) is equal to the NBB (1.95), the order is indeed executable. The process continues to step 1404, where it combines the away market BBO book 25a and the internal order book 29a together in a virtual consolidated order and quote list, which it ranks in price/ display/time priority but with a preference for resident interest over away market interest at the same price level.

As the books have not changed in the interim, the virtual consolidated order and quote list looks as it did in the previous step:

| Bids | | Offers | |
|---|---|---|---|
| Away Market D:<br>SatisfiedBidQty = 50<br>UnsatisfiedBidQty = 0 | Bid 50 @ 1.95 | Order H: | Sell 30 @ 1.95 |
| Away Market B:<br>SatisfiedBidQty = 90<br>UnsatisfiedBidQty = 0 | Bid 90 @ 1.95 | Order C: | Sell 20 @ 2.05 |
| Order A: | Buy 20 @ 1.90 | Away Market A: | Offer 70 @ 2.05 |
| Away Market C: | Bid 40 @ 1.90 | Away Market B: | Offer 60 @ 2.05 |
| Order B: | Buy 10 @ 1.85 | Away Market D: | Offer 50 @ 2.10 |
| Away Market A: | Bid 30 @ 1.85 | Away Market C: | Offer 30 @ 2.10 |
| | | Order D: | Sell 40 @ 2.15 |

Incoming Order I is Eligible to Route

The process continues to step 1406, where it retrieves the best bid in the virtual consolidated order and quote list, which is still Away Market D since it has not updated its quote yet. In step 1408, it checks if incoming Sell Order I's price (1.95) is less than or equal to Away Market D's bid (1.95). As the prices are equal, the process continues to step 1418, where it checks if the best bid is on or off the market center 20. As the best bid is an away market quote, the process continues to step 1428, where the process checks if incoming Sell Order I is an order type that is eligible for routing. As incoming Sell Order I is a regular limit order, it is eligible to route, so the process continues to step 1442, where it initiates the "Determine Away Market Bid Eligibility Process," and proceeds to step 1500 in FIG. 14.

Incoming Order I May Only Route with Capacity=BD Using the Direct Protocol

In step 1501, the process initiates the "Determine Outbound Order Capacity and Protocol Process" and proceeds to step 600 in FIG. 6.

In step 602, the process checks if the Capacity specified on incoming Sell Order I is "C" (customer). As it is not, the process continues to step 618, where it checks if the Capacity specified on incoming Sell Order I is "MM" (market maker). As it is not, the process continues to step 634, where it checks if the Capacity specified on incoming Sell Order I is "BD" (broker/dealer). As it is, the process continues to step 636, where it sets the OutboundOrderCapacity="BD" (broker/dealer). The process continues to step 638, where it sets the OutboundRoutingProtocol="DIRECT" (private "direct" connection). The process then terminates in step 640, where it returns to the step where it was originally invoked, back to step 1501 in FIG. 14.

Away Market D has the Highest Ranking at the NBB

The process continues to step 1502, where it checks if there is more than one away market quoting at the NBB. As Away Markets D and B are both quoting at the NBB, the process continues to step 1504, where it retrieves the Routing Priorities for the two away markets:

| Destination | Routing Priority |
|---|---|
| Away Market B | 3 |
| Away Market D | 5 |

Away Market D has a higher Routing Priority (5) than Away Market B (3). Accordingly the bids for Away Market D and Away Market B do not need to be re-ranked in the virtual consolidated order and quote list.

Away Market D Does Not Accept Orders with Capacity=BD, and is Bypassed

In step 1508, the process retrieves the bid from the highest-ranked away market, Away Market D. In step 1510, the process checks if the Routing Table includes an active rule for Away Market D that accepts Capacity=BD orders that are routed using Routing Protocol=DIRECT. As shown below, Away Market D does NOT have a rule with Capacity=BD:

Routing Table

| Destination | Routing Priority | Capacity | Routing Behavior | Routing Protocol | Route Preference Style | Auto. Time-out | Over-size Weight | Max. Route Size | Max. Route Style |
|---|---|---|---|---|---|---|---|---|---|
| Away Market D | 5 | C | 1 | DIRECT | DAY | 3 | | | |
| Away Market D | 5 | MM | 4 | DIRECT | DAY | 3 | | 10 | 1 |

Accordingly, the process cannot route an order on behalf of incoming Sell Order I to Away Market D. The process therefore continues to step 1524, where it checks if there are additional away markets quoting at the NBB. As Away Market B is also at the NBB, the process continues to step 1526, where it retrieves the bid from the next-highest ranking market, Away Market B.

Away Market B Accepts Orders with Capacity=BD

The process returns to step 1510, where it checks if the Routing Table includes an active rule for Away Market B that accepts Capacity=BD orders that are routed using Routing Protocol=DIRECT. Away Market B has two different "direct" routing rules: one rule for orders with Capacity=C, and one rule for orders with Capacity=MM, BD, or FARM. One of the business reasons for having two different routing rules in this example is because Away Market B guarantees automatic execution of customer orders up to its disseminated quote size, but only guarantees automatic execution of 10 contracts for orders with all other account capacities, and the market center 20 has elected not to send order quantities that exceed Away Market B's guaranteed automatic execution size. Accordingly, Away Market B's non-customer rule has been configured with the "Maximum Route Size" parameter=10, as shown below.

In step 1512, the process retrieves the routing rule for Capacity=BD orders for Away Market B:

Routing Table

| Destination | Routing Priority | Capacity | Routing Behavior | Routing Protocol | Route Preference Style | Auto. Time-out | Over-size Weight | Max. Route Size | Max. Route Style |
|---|---|---|---|---|---|---|---|---|---|
| Away Market B | 3 | MM, BD, FARM | 4 | DIRECT | DAY | 10 | | 10 | 1 |

The process continues to step 1514, where it checks if it should evaluate the SatisfiedBidQty for Away Market B or not. As Routing Behavior '4' specifies that orders route using the direct connection regardless of whether prior orders are routed or not, there is no need to evaluate Away Market B's UnsatisfiedBidQty. The process continues to step 1518.

Outbound Order with Capacity=BD is Generated on Behalf of Order I and Routed to Away Market B Using the Direct Protocol In step 1518, the process initiates the "Generate Outbound Routed Sell Order Process," and proceeds to step 1700 in FIG. 15A.

In step 1702, the process retrieves the OutboundOrderCapacity (the value "BD" was previously derived in step 636 of FIG. 6) and attaches it to the outbound order that is being generated now. In step 1704, the process retrieves the "Route Preference Style" parameter from Away Market B's routing rule. In step 1706, it checks if Route Preference Style=DAY or IOC. As the Route Preference Style=DAY, the process continues to step 1708, where it sets the OutboundSellOrderTimeInForce="DAY." In step 1710, the process retrieves the "Automatic Timeout" parameter from Away Market B's routing rule. In step 1712, the process computes the OutboundOrderTimeout by adding 10 seconds, the specified Automatic Timeout, to the current time. The process continues to step 1718, where it sets the OutboundSellOrderPrice=1.95, Away Market B's bid price.

Order Size Routed to Away Market B is Capped by the Maximum Route Size Parameter Setting The process continues to step 1720, where it retrieves the "Maximum Route Size" parameter from Away Market B's routing rule. In step 1722, the process checks if its value is greater than zero. As shown below, the "Maximum Route Size" parameter is set to "10" for Capacity=BD orders routed to Away Market B:

Routing Table

| Destination | Routing Priority | Capacity | Routing Behavior | Routing Protocol | Route Preference Style | Auto. Time-out | Over-size Weight | Max. Route Size | Max. Route Style |
|---|---|---|---|---|---|---|---|---|---|
| Away Market B | 3 | MM, BD, FARM | 4 | DIRECT | DAY | 10 | | 10 | 1 |

As the "Maximum Route Size" parameter is set to "10," the process continues to step 1724, where it initiates the "Max Route Size Factors in Outbound Sell Order Size Process," and proceeds to step 1800 in FIG. 16.

In step 1802, the process retrieves the value of the "Maximum Route Size" parameter for Away Market B. In step 1804, it retrieves the value of the "Maximum Route Style" parameter for Away Market B. In step 1806, it checks if the Maximum Route Style='1' (i.e., always route up to the Maximum Route Size parameter, regardless of the quote size). As the Maximum Route Style='1,' in step 1808, the process sets the OutboundSellOrderQty=10, the lesser of the Maximum Route Size (10 contracts) and the remaining quantity of incoming Sell Order I (60 contracts). In step 1810, the process returns to the step where it was originally invoked, back to step 1724 in FIG. 15A.

The process continues to step 1742, where it retrieves the "Routing Protocol" parameter specified for Away Market B on its routing rule. As the Routing Protocol=DIRECT, in step 1744, the process routes the outbound sell order to Away Market B using the private "direct" connection.

Accordingly, the outbound routed order on behalf of underlying Sell Order I looks like this:

→Sell 10 @ 1.90, Capacity=BD, Time In Force=DAY, Destination=Away Market B, Routing Protocol=DIRECT If Away Market B does not fill or decline the routed order before the OutboundOrderTimeout elapses, then the Routing Process automatically sends a Cancel message to Away Market B, and cancels the 10 routed contracts of Sell Order I. Away Market B's Bid is Not Decremented In step 1745, the process retrieves the "Routing Behavior" parameter for Away Market B. In step 1746, the process checks if the routed order should decrement Away Market B's bid size or not. As Routing Behavior '4' does not decrement the quotes, the process continues to step 1750, where it checks if incoming Sell Order I has any quantity available to trade. As incoming Sell Order I still has 50 contracts remaining, the process continues to step 1752, where it returns to the step where the procedure was originally invoked, back to step 1518 in FIG. 14.

Remaining Quantity of Order I Cannot Go "Dark" and Must be Canceled

The process then continues to step 1524, where it checks if there are additional away markets at the NBB. As there are none, the process continues to step 1528, where it initiates the "Excess Marketable Sell Order Quantity Remains Process," and proceeds to step 2000 in FIG. 18.

In step 2002, the process checks if the excess quantity of incoming Sell Order I should be canceled or not. According to the rules of Routing Behavior '4,' any quantity that cannot be routed should be canceled instead. As the exemplary business rules in this embodiment dictate that only orders routed on behalf of customers are allowed to go "dark," and whereas incoming Sell Order I is on behalf of a broker/dealer account, the process continues to step 2004, where it cancels the remaining 50 contracts of incoming Sell Order I. The process then terminates in step 2006 as indicated.

Away Market B Fills Order I

→Away Market B fills the 10 contracts routed to it on behalf of Sell Order I

When the order matching engine 21 receives a fill for a routed sell order, it initiates the "Away Market Fills or Declines Routed Sell Order Process" in step 2100 of FIG. 19. The process executes steps 2102 through 2128 as previously described, adding the Fill (10 contracts) to Sell Order I's current matched quantity (0) to yield an updated matched quantity (10 contracts). Sell Order I has no quantity remaining. The virtual consolidated order and quote list is deleted from local memory.

Away Market D Fades its Bid off The NBB

→Away Market D fades its bid to 50 @ 1.90.

The away market BBO book 25a now looks like this:

| Bids | Offers |
|---|---|
| Away Market B: Bid 90 @ 1.95 | Away Market A: Offer 70 @ 2.05 |
| Away Market C: Bid 40 @ 1.90 | Away Market B: Offer 60 @ 2.05 |
| Away Market D: Bid 50 @ 1.90 ← | Away Market D: Offer 50 @ 2.10 |
| Away Market A: Bid 30 @ 1.85 | Away Market C: Offer 30 @ 2.10 |

→The NBBO is now 1.95 to 2.05 (90×150)

The quote engine 23a notifies the order matching engine 21 of the change to Away Market D's bid, and the process initiates the "Away Market Refreshes its Bid Process" in step 2200 of FIG. 20A. In step 2201, the order matching engine 21 creates a new virtual consolidated order and quote list by combining the away market BBO book 25a and the internal order book 29a. The virtual consolidated order and quote list now looks like this:

| Bids | | Offers | |
|---|---|---|---|
| Away Market B: | Bid 90 @ 1.95 | Order H: | Sell 30 @ 1.95 |
| SatisfiedBidQty = 90 | | | |
| UnsatisfiedBidQty = 0 | | | |
| Order A: | Buy 20 @ 1.90 | Order C: | Sell 20 @ 2.05 |
| Away Market C: | Bid 40 @ 1.90 | Away Market A: | Offer 70 @ 2.05 |
| Away Market D: | Bid 50 @ 1.90 ← | Away Market B: | Offer 60 @ 2.05 |
| SatisfiedBidQty = 50 | | | |
| UnsatisfiedBidQty = 0 | | | |
| Order B: | Buy 10 @ 1.85 | Away Market D: | Offer 50 @ 2.10 |
| Away Market A: | Bid 30 @ 1.85 | Away Market C: | Offer 30 @ 2.10 |
| | | Order D: | Sell 40 @ 2.15 |

In step 2202, the process retrieves Away Market D's newly disseminated bid (1.90). In step 2204, it checks if the bid price changed. As Away Market D's previous bid price was 1.95, the process continues to step 2209, where it checks if the SatisfiedBidQty for Away Market D is greater than zero. As it is, the process continues to step 2210, where it resets the SatisfiedBidQty to zero. In step 2212, the process sets the UnsatisfiedBidQty for Away Market D=50, its disseminated bid size. Away Market D's bid is eligible to receive customer orders again, but only after all higher-ranked interest executes first.

The process continues to step 2214, where it checks if there are any "dark" Sell orders that can now be displayed. Although Sell Order H is indeed a "dark" order, it cannot be displayed yet because it would lock the NBB. Accordingly, the process continues to step 2218, where it checks if Away Market D's new bid (1.90) is at the NBB (1.95). As the bid is inferior to the NBB, the process terminates in step 2222 as indicated.

The virtual consolidated order and quote list now looks like this:

| Bids | | Offers | |
|---|---|---|---|
| Away Market B: | Bid 90 @ 1.95 | Order H: | Sell 30 @ 1.95 |
| SatisfiedBidQty = 90 | | | |
| UnsatisfiedBidQty = 0 | | | |
| Order A: | Buy 20 @ 1.90 | Order C: | Sell 20 @ 2.05 |
| Away Market C: | Bid 40 @ 1.90 | Away Market A: | Offer 70 @ 2.05 |
| Away Market D: | Bid 50 @ 1.90 | Away Market B: | Offer 60 @ 2.05 |
| SatisfiedBidQty = 0 ← | | | |
| UnsatisfiedBidQty = 50 ← | | | |
| Order B: | Buy 10 @ 1.85 | Away Market D: | Offer 50 @ 2.10 |
| Away Market A: | Bid 30 @ 1.85 | Away Market C: | Offer 30 @ 2.10 |
| | | Order D: | Sell 40 @ 2.15 |

The virtual consolidated order and quote list is deleted from local memory.

Away Market B also Fades its Bid off the NBB

→Away Market B fades its bid to 90 @ 1.90.

The away market BBO book 25a now looks like this:

| Bids | Offers |
|---|---|
| Away Market C: Bid 40 @ 1.90 | Away Market A: Offer 70 @ 2.05 |
| Away Market D: Bid 50 @ 1.90 | Away Market B: Offer 60 @ 2.05 |
| Away Market B: Bid 90 @ 1.90 ← | Away Market D: Offer 50 @ 2.10 |
| Away Market A: Bid 30 @ 1.85 | Away Market C: Offer 30 @ 2.10 |

→The NBBO is now 1.90 to 2.05 (200×150)

The quote engine 23a notifies the order matching engine 21 of the change to Away Market B's bid and the NBB, and the process initiates the "Away Market Refreshes its Bid Process" in step 2200 of FIG. 20A. In step 2201, the order matching engine 21 creates a new virtual consolidated order and quote list by combining the away market BBO book 25a and the internal order book 29a. The virtual consolidated order and quote list now looks like this:

| Bids | | Offers | |
|---|---|---|---|
| Order A: | Buy 20 @ 1.90 | Order H: | Sell 30 @ 1.95 |
| Away Market C: | Bid 40 @ 1.90 | Order C: | Sell 20 @ 2.05 |
| Away Market D: | Bid 50 @ 1.90 | Away Market A: | Offer 70 @ 2.05 |
| Away Market B: | Bid 90 @ 1.90 ← | Away Market B: | Offer 60 @ 2.05 |
| SatisfiedBidQty = 90 | | | |
| UnsatisfiedBidQty = 0 | | | |
| Order B: | Buy 10 @ 1.85 | Away Market D: | Offer 50 @ 2.10 |
| Away Market A: | Bid 30 @ 1.85 | Away Market C: | Offer 30 @ 2.10 |
| | | Order D: | Sell 40 @ 2.15 |

In step 2202, the process retrieves Away Market B's newly disseminated bid (1.90). In step 2204, it checks if the bid price changed. As Away Market B's previous bid price was 1.95, the process continues to step 2209, where it checks if Away Market B's SatisfiedBidQty is greater than zero. As Away Market B's SatisfiedBidQty is currently=90, the process continues to step 2210, where it resets the SatisfiedBidQty for Away Market B to zero. In step 2212, the process resets the UnsatisfiedBidQty for Away Market B to 90 contracts, its full disseminated bid size. Away Market B's bid is eligible to receive routed customer orders again, but only after all higher-ranked interest has been executed first.

"Dark" Order H No Longer Locks the NBB, and is Now Displayed to the Marketplace

In step 2214, the process checks if there are any "dark" Sell orders that can now be displayed. As Sell Order H is indeed a "dark" order and its price no longer overlaps with the NBB, the process continues to step 2216, where it disseminates Sell Order H to the public order book. Sell Order H is no longer "dark."

→The NBBO is now 1.90 to 1.95 (200×30)

The virtual consolidated order and quote list now looks like this:

| | Bids | | Offers |
|---|---|---|---|
| Order A: | Buy 20 @ 1.90 | Order H: | Sell 30 @ 1.95 ← |
| Away Market C: | Bid 40 @ 1.90 | Order C: | Sell 20 @ 2.05 |
| Away Market D: | Bid 50 @ 1.90 | Away Market A: | Offer 70 @ 2.05 |
| Away Market B: | Bid 90 @ 1.90 | Away Market B: | Offer 60 @ 2.05 |
| SatisfiedBidQty = 0 ← | | | |
| UnsatisfiedBidQty = 90 ← | | | |
| Order B: | Buy 10 @ 1.85 | Away Market D: | Offer 50 @ 2.10 |
| Away Market A: | Bid 30 @ 1.85 | Away Market C: | Offer 30 @ 2.10 |
| | | Order D: | Sell 40 @ 2.15 |

The internal order book 29a now looks like this:

| | Bids | | Offers |
|---|---|---|---|
| Order A: | Buy 20 @ 1.90 | Order H: | Sell 30 @ 1.95 ← |
| Order B: | Buy 10 @ 1.85 | Order C: | Sell 20 @ 2.05 |
| | | Order D: | Sell 40 @ 2.15 |

→The market center BBO is now 1.90 to 1.95 (20×30)

The public order book now looks like this:

| Bids | Offers |
|---|---|
| 20 @ 1.90 | 30 @ 1.95 ← |
| 10 @ 1.85 | 20 @ 2.05 |
| | 40 @ 2.15 |

The process continues to step 2218, where it checks if Away Market B's new bid is at the NBB. As it is at the NBB, the process continues to step 2220, where it checks if there are any queued market sell orders that are waiting to execute. As there are none, the process terminates in step 2222 as indicated. The virtual consolidated order and quote list is deleted from local memory.

Incoming Order J (Capacity=F) is Received, and Matches a Posted Order

In step 1400, the order matching engine 21 receives the following order on behalf of a firm:

Order J: Sell 90 @ Market, Capacity=F

In step 1401, the process retrieves the NBB (1.90). In step 1402, it checks if incoming Sell Order J is executable. As market orders are executable by definition, the process continues to step 1404, where it combines the away market BBO book 25a and the internal order book 29a together in a virtual consolidated order and quote list, which it ranks in price/display/time priority but with a preference for resident interest over away market interest at the same price level. As the books have not changed in the interim, the virtual consolidated order and quote list looks as it did in the prior step:

| | Bids | | Offers |
|---|---|---|---|
| Order A: | Buy 20 @ 1.90 | Order H: | Sell 30 @ 1.95 |
| Away Market C: | Bid 40 @ 1.90 | Order C: | Sell 20 @ 2.05 |
| Away Market D: | Bid 50 @ 1.90 | Away Market A: | Offer 70 @ 2.05 |
| Away Market B: | Bid 90 @ 1.90 | Away Market B: | Offer 60 @ 2.05 |
| Order B: | Buy 10 @ 1.85 | Away Market D: | Offer 50 @ 2.10 |
| Away Market A: | Bid 30 @ 1.85 | Away Market C: | Offer 30 @ 2.10 |
| | | Order D: | Sell 40 @ 2.15 |

The process continues to step 1406, where it retrieves the best bid in the virtual consolidated order and quote list, which is Buy Order A. In step 1408, it checks if incoming Sell Order J's price (Market) is less than or equal to Buy Order A's price (1.90). As market orders are marketable by definition, the process continues to step 1418, where it checks if Buy Order A is on or off the market center 20. As it is a resident order, the process continues to step 1422, where it matches 20 contracts of incoming Sell Order J with posted Buy Order A, at the price of 1.90. Posted Buy Order A is completely depleted and is removed from the virtual consolidated order and quote list and from the books.

→The NBBO is now 1.90 to 1.95 (180×30)

The virtual consolidated order and quote list now looks like this:

| | Bids | | Offers |
|---|---|---|---|
| Away Market C: | Bid 40 @ 1.90 | Order H: | Sell 30 @ 1.95 |
| Away Market D: | Bid 50 @ 1.90 | Order C: | Sell 20 @ 2.05 |
| Away Market B: | Bid 90 @ 1.90 | Away Market A: | Offer 70 @ 2.05 |
| Order B: | Buy 10 @ 1.85 | Away Market B: | Offer 60 @ 2.05 |
| Away Market A: | Bid 30 @ 1.85 | Away Market D: | Offer 50 @ 2.10 |
| | | Away Market C: | Offer 30 @ 2.10 |
| | | Order D: | Sell 40 @ 2.15 |

The internal order book 29a now looks like this:

| | Bids | | Offers |
|---|---|---|---|
| Order B: | Buy 10 @ 1.85 | Order H: | Sell 30 @ 1.95 |
| | | Order C: | Sell 20 @ 2.05 |
| | | Order D: | Sell 40 @ 2.15 |

→The market center BBO is now 1.85 to 1.95 (10×30)

The public order book looks like this:

| Bids | offers |
|---|---|
| 10 @ 1.85 ← | 30 @ 1.95 |
| | 20 @ 2.05 |
| | 40 @ 2.15 |

Incoming Order J is Eligible to Route

In step 1424, the process checks if incoming Sell Order J has any quantity remaining. As it still has 70 contracts available, the process continues to step 1426, where it retrieves the next-best bid in the virtual consolidated order and quote list, which is Away Market C's bid. The process returns to step 1408, where it checks if incoming Sell Order J's price (Market) is still less than or equal to the best bid price (1.90). As market orders are marketable by definition, the process continues to step 1418, where it checks if the best bid is on or off the market center 20. As the best bid is an away market quote, the process continues to step 1428, where the process checks if incoming Sell Order J is an order type that is eligible for routing. As incoming Sell Order J is a market order, it is eligible to route, so the process continues to step 1442, where it initiates the "Determine Away Market Bid Eligibility Process," and proceeds to step 1500 in FIG. 14.

Incoming Order J may Only Route with Capacity=F Using the Direct Protocol

In step 1501, the process initiates the "Determine Outbound Order Capacity and Protocol Process," and proceeds to step 600 in FIG. 6.

In step 602, the process checks if the Capacity specified on incoming Sell Order J is "C" (customer). As it is not, the process continues to step 618, where it checks if the Capacity specified on incoming Sell Order J is "MM" (market maker). As it is not, the process continues to step 634, where it checks if the Capacity specified on incoming Sell Order J is "BD" (broker/dealer). As it is not, the process continues to step 642, where it checks if the Capacity specified on incoming Sell Order J is "F" (firm). As it is, the process continues to step 644, where it sets the OutboundOrderCapacity="F" (firm). The process continues to step 646, where it sets the OutboundRoutingProtocol="DIRECT" (private "direct" connection). The process then terminates in step 648, where it returns to the step where it was originally invoked, back to step 1501 in FIG. 14.

Away Market C has the Highest Ranking at the NBB

The process continues to step 1502, where it checks if there is more than one away market at the NBB. As Away Markets C, D, and B are all at the NBB, the process continues to step 1504, where it retrieves the Routing Priority parameter for each away market:

| Destination | Routing Priority |
|---|---|
| Away Market B | 3 |
| Away Market C | 8 |
| Away Market D | 5 |

Away Market C has the highest Routing Priority (8), Away Market D has the second-highest Routing Priority (5), and Away Market B has the lowest Routing Priority (3). Accordingly, the three away markets are already ranked according to their Routing Priority in the virtual consolidated order and quote list, which does not need to be re-sequenced.

The virtual consolidated order and quote list still looks like this:

| Bids | | Offers | |
|---|---|---|---|
| Away Market C: | Bid 40 @ 1.90 | Order H: | Sell 30 @ 1.95 |
| Away Market D: | Bid 50 @ 1.90 | Order C: | Sell 20 @ 2.05 |
| Away Market B: | Bid 90 @ 1.90 | Away Market A: | Offer 70 @ 2.05 |
| Order B: | Buy 10 @ 1.85 | Away Market B: | Offer 60 @ 2.05 |
| Away Market A: | Bid 30 @ 1.85 | Away Market D: | Offer 50 @ 2.10 |
| | | Away Market C: | Offer 30 @ 2.10 |
| | | Order D: | Sell 40 @ 2.15 |

Away Market C Accepts Orders with Capacity=F

In step 1508, the process retrieves the bid from the highest-ranked away market, Away Market C. In step 1510, the process checks if the Routing Table includes an active rule for Away Market C that accepts Capacity=F orders that are routed using Routing Protocol=DIRECT. As shown below, Away Market C does indeed accept routed orders with Capacity=F. The process retrieves the routing rule in step 1512:

| | | | | | Routing Table | | | | |
|---|---|---|---|---|---|---|---|---|---|
| Destination | Routing Priority | Capacity | Routing Behavior | Routing Protocol | Route Preference Style | Auto. Timeout | Over-size Weight | Max. Route Size | Max. Route Style |
| Away Market C | 8 | F, MM | 4 | DIRECT | DAY | 3 | 2 | | |

The process continues to step 1514, where it checks if Away Market C's UnsatisfiedBidQty must be evaluated. As Routing Behavior '4' specifies that orders route to an eligible away market regardless of whether prior orders have routed order not, Away Market C's UnsatisfiedBidQty does not need to be evaluated. The process continues to step 1518.

Outbound Order with Capacity=F is Generated on Behalf of Order J and Routed to Away Market C Using the Direct Protocol In step 1518, the process initiates the "Generate Outbound Routed Sell Order Process," and proceeds to step 1700 in FIG. 15A.

In step 1702, the process retrieves the OutboundOrderCapacity (the value "F" was previously derived in step 644 of FIG. 6) and attaches it to the outbound order that is being generated now. In step 1704, the process retrieves the "Route Preference Style" parameter from Away Market C's routing rule. In step 1706, it checks if Route Preference Style=DAY or IOC. As the Route Preference Style=DAY, the process continues to step 1708, where it sets the OutboundSellOrderTimeInForce="DAY." In step 1710, the process retrieves the "Automatic Timeout" parameter from Away Market C's routing rule. In step 1712, the process computes the OutboundOrderTimeout by adding 3 seconds, the specified Automatic Timeout, to the current time. The process continues to step 1718, where it sets the OutboundSellOrderPrice=1.90, Away Market C's bid price.

The process continues to step 1720, where it retrieves the "Maximum Route Size" parameter from Away Market C's routing rule. In step 1722, it checks if the Maximum Route Size is greater than zero. As this parameter is not set for Away Market C, the process continues to step 1726, where it retrieves the "Oversize Weight" parameter from Away Market C's routing rule.

Outbound Order is Oversized Prior to Routing to Away Market C

In step 1728, the process checks if Away Market C's Oversize Weight is greater than zero. As shown in the routing rule displayed below, the value of this parameter is set to "2" for Away Market C.

Routing Table

| Destination | Routing Priority | Capacity | Routing Behavior | Routing Protocol | Route Preference Style | Auto. Timeout | Oversize Weight | Max. Route Size | Max. Route Style |
|---|---|---|---|---|---|---|---|---|---|
| Away Market C | 8 | F, MM | 4 | DIRECT | DAY | 3 | 2 | | |

Accordingly, the process continues to step 1730, where it computes the MaxOutboundSellOrderQty as Away Market C's bid Size multiplied by its Oversize Weight. As Away Market C's bid size=40 and its Oversize Weight=2, this means Away Market C is eligible to receive up to 80 contracts (40×2), i.e., the MaxOutboundSellOrderQty=80. The process continues to step 1732, where it sets the OutboundSellOrderQty equal to the lesser of the computed MaxOutboundSellOrderQty (80 contracts) and the Leaves quantity of incoming Sell Order I (70 contracts, its remaining size). Accordingly, the process sets the OutboundSellOrderQty=70.

The process continues to step 1742, where it retrieves the "Routing Protocol" parameter specified for Away Market C on its routing rule. As the Routing Protocol=DIRECT, in step 1744, the process routes the outbound sell order to Away Market C using the private "direct" connection.

Accordingly, the outbound routed order on behalf of underlying Market Sell Order J looks like this:

→Sell 70 @ 1.90, Capacity=F, Time In Force=DAY, Destination=Away Market C, Routing Protocol=DIRECT If Away Market C does not fill or decline the routed order before the OutboundOrderTimeout elapses, then the Routing Process automatically sends a Cancel message to Away Market C, and cancels the 70 routed contracts of Market Sell Order J. Away Market C's Bid Is Not Decremented In step 1746, the process checks if the routed order should decrement Away Market C's bid size or not. As Routing Behavior '4' does not decrement the quotes, the process continues to step 1750 instead, where it checks if incoming Market Sell Order J has any quantity remaining to trade. As it does not, the process terminates in step 1754 as indicated.

→The NBBO is still 1.90 to 1.95 (180×20)

The virtual consolidated order and quote list remains unchanged and still looks like this:

| Bids | | Offers | |
|---|---|---|---|
| Away Market C: | Bid 40 @ 1.90 | Order H: | Sell 20 @ 1.95 |
| Away Market D: | Bid 50 @ 1.90 | Order C: | Sell 20 @ 2.05 |
| Away Market B: | Bid 90 @ 1.90 | Away Market A: | Offer 70 @ 2.05 |
| Order B: | Buy 10 @ 1.85 | Away Market B: | Offer 60 @ 2.05 |
| Away Market A: | Bid 30 @ 1.85 | Away Market D: | Offer 50 @ 2.10 |
| | | Away Market C: | Offer 30 @ 2.10 |
| | | Order D: | Sell 40 @ 2.15 |

Away Market C Fills Order J
→Away Market C fills the 70 contracts routed to it on behalf of Market Sell Order J When the order matching engine 21 receives a fill for a routed sell order, it initiates the "Away Market Fills or Declines Routed Sell Order Process" in step 2100 of FIG. 19. The process executes steps 2102 through 2128 as described above for prior fills, adding the Fill (70 contracts) to Market Sell Order J's previous matched quantity (zero) to derive a cumulative matched quantity of 70 contracts. Market Sell Order J has no remaining quantity to route to Away Market C, as it is completely filled. The virtual consolidated order and quote list is deleted from local memory.

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

What is claimed is:

1. An options market center which lists a plurality of options series and routes orders to away market centers, comprising:

an order book for each option series and a market maker quote book for each option series which are maintained by an order matching engine, intermarket linkages and direct connections to a plurality of away market centers, and at least one configurable routing table including a set of routing rules;

an away market best bid and offer book that is separate from the order book and the market maker quote book and is maintained by an away market quote engine;

an interface for receiving orders, an interface for receiving quotes and an interface for receiving a top-of-book best bid and offer disseminated quotation from a plurality of away market centers for each option series;

a market center memory for storing code for analyzing and processing orders and quotes;

a processor for interacting with the interfaces and the engines and executing the code for analyzing and processing quotes and orders, wherein the code, when executed:

the interface for receiving a top-of-book best bid and offer disseminated quotation receives an away market quote from an away market center for a specified option series on the market center;

the away market quote engine analyzes the received quote to determine whether the away market quote has moved away from the price of an order on the opposite side of the order book that it previously touched;

wherein responsive to determining that the away market quote has moved away from the price of an order on the opposite side of the order book that it previously touched, the quote engine notifies the order matching engine; and the order matching engine then evaluates dark orders on the order book to determine whether any of the dark orders can now be displayed; evaluates whether queued market orders can now be routed; and evaluates whether the disseminated best contra-side quotation is now eligible to receive additional routed orders.

2. The options market center of claim 1, wherein responsive to determining that the away market quote has not moved away from the price of an order on the opposite side of the order book that it previously touched, the quote engine does not notify the order matching engine.

3. A method for options order routing, comprising:
(a) listing by a computing system, on a market center, having at least one processor and at least one memory a plurality of options series, wherein the computing system has an order book for each option series, has direct connections to a plurality of away market centers, receives a top-of-book best bid and offer disseminated quotation from the plurality of away market centers for each option series, and has at least one configurable routing table including a set of routing rules that specify direct connection parameters for each away market;
(b) receiving by the computing system an incoming order;
(c) determining by the computing system whether the order can execute at the NBBO or better;
(d) responsive to determining that the order can execute at the NBBO or better;
  (d)(i) retrieving by the computing system the best bid and offer disseminated quotation from each away market center;
  (d)(ii) determining by the computing system whether a disseminated quotation of any away market center is superior to the orders resident on the market center;
  (d)(iii) responsive to determining that the disseminated quotation of any away market center is not superior;
    (d)(iii)(a) first matching by the computing system the incoming order with any resident trading interest at the NBBO or better and then evaluating by the computing system the remaining portion of the incoming order to determine whether the remaining portion of the incoming order is eligible to route to an away market center at the NBBO, now that the resident trading interest at the NBBO has been cleared;
    (d)(iii)(b) responsive to determining that the remaining portion of the incoming order is eligible to route to the away market center, retrieving by the computing system the set of routing rules from the routing table for the away market center having the superior disseminated quotation;
    (d)(iii)(c) determining by the computing system whether the remaining portion of the incoming order can be routed to the away market center having the superior disseminated quotation;
    (d)(iii)(d) responsive to determining that the remaining portion of the incoming order can be routed to the away market center having the superior disseminated quotation, selecting by the computing system a direct connection protocol and generating an outbound order for the remainder of the incoming order based on the routing rules for the specified away market center; and
    (d)(iii)(e) routing by the computing system the generated outbound order to the away market center having the superior disseminated quotation over the selected direct connection.

* * * * *